(12) United States Patent
Katoh

(10) Patent No.: US 9,625,214 B2
(45) Date of Patent: Apr. 18, 2017

(54) HEAT EXCHANGER

(71) Applicant: DENSO CORPORATION, Kariya, Aichi-pref. (JP)

(72) Inventor: Yoshiki Katoh, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 385 days.

(21) Appl. No.: 14/360,779

(22) PCT Filed: Nov. 28, 2012

(86) PCT No.: PCT/JP2012/007629
§ 371 (c)(1),
(2) Date: May 27, 2014

(87) PCT Pub. No.: WO2013/080535
PCT Pub. Date: Jun. 6, 2013

(65) Prior Publication Data
US 2015/0241131 A1 Aug. 27, 2015

(30) Foreign Application Priority Data

Nov. 30, 2011 (JP) .................................. 2011-262056
Nov. 14, 2012 (JP) .................................. 2012-250503

(51) Int. Cl.
*F28D 1/053* (2006.01)
*F28F 9/02* (2006.01)
(Continued)

(52) U.S. Cl.
CPC ..... *F28D 1/05366* (2013.01); *B60H 1/00328* (2013.01); *B60H 1/00342* (2013.01);
(Continued)

(58) Field of Classification Search
CPC .... F28D 1/0408; F28D 1/0426; F28D 1/0417; F28D 1/0435; F28D 1/0461;
(Continued)

(56) References Cited

U.S. PATENT DOCUMENTS 5,241,839 A * 9/1993 Hughes ................ B60H 1/3227
165/174
7,448,436 B2 * 11/2008 Katoh ..................... F25B 39/02
165/110
(Continued)

FOREIGN PATENT DOCUMENTS

EP 1108575 A1 6/2001
JP H0330068 U 3/1991
(Continued)

OTHER PUBLICATIONS

Office Action dated Jul. 24, 2015 in corresponding Chinese Application No. 201280058805.0 with English translation.
(Continued)

*Primary Examiner* — Ryan J Walters
*Assistant Examiner* — For K Ling
(74) *Attorney, Agent, or Firm* — Harness, Dickey & Pierce, P.L.C.

(57) ABSTRACT

In a heat exchanger, a plate member of a tank portion includes a first fluid communication passage through which a first tank space communicates with first tubes, and a second fluid communication passage through which a second tank space communicates with second tubes. Either an upstream first tube group of the first tubes or a downstream first tube group of the first tubes, whichever is larger in a pressure loss of the first fluid, configures a higher pressure loss first tube group, and the other first tube group smaller in the pressure loss of the first fluid configures a lower pressure loss first tube group. A flow channel resistance (Continued)

between the higher pressure loss first tube group and the first tank space is smaller than a flow channel resistance between the lower pressure loss first tube group and the first tank space.

22 Claims, 41 Drawing Sheets

(51) Int. Cl.
    *F28D 1/04*     (2006.01)
    *B60H 1/00*     (2006.01)

(52) U.S. Cl.
    CPC ....... *F28D 1/0435* (2013.01); *F28D 1/05391* (2013.01); *F28F 9/0214* (2013.01); *F28F 9/0246* (2013.01); *F28F 9/0278* (2013.01); *F28F 2009/0287* (2013.01)

(58) Field of Classification Search
    CPC .. F28D 1/0443; F28D 1/05391; F28F 9/0229; F28F 9/22; F28F 9/028; F28F 9/0278; F28F 2009/222
    USPC .......................................... 165/140, 173–175
    See application file for complete search history.

(56) References Cited

U.S. PATENT DOCUMENTS

| | | | | |
|---|---|---|---|---|
| 7,571,761 B2* | 8/2009 | Katoh | ................. | F28D 1/05391 |
| | | | | 165/174 |
| 2003/0188857 A1* | 10/2003 | Kawakubo | ............ | F28D 1/0476 |
| | | | | 165/174 |
| 2005/0039901 A1* | 2/2005 | Demuth | ................ | F28D 1/0478 |
| | | | | 165/175 |
| 2010/0122793 A1* | 5/2010 | Wolfe, IV | .......... | B60H 1/00321 |
| | | | | 165/58 |
| 2010/0319894 A1* | 12/2010 | Biver | ................... | F25B 39/028 |
| | | | | 165/173 |

FOREIGN PATENT DOCUMENTS

| | | |
|---|---|---|
| JP | H0433860 U | 3/1992 |
| JP | 11157326 A | 6/1999 |
| JP | 2000-062446 A | 2/2000 |
| JP | 2004205056 A | 7/2004 |
| JP | 2008151396 A | 7/2008 |
| WO | WO-2012137487 A1 | 10/2012 |
| WO | WO-2013080532 A1 | 6/2013 |
| WO | WO-2013080534 A1 | 6/2013 |

OTHER PUBLICATIONS

International Search Report and Written Opinion (in Japanese with English Translation) for PCT/JP2012/007629, mailed Jan. 15, 2013; ISA/JP.

* cited by examiner

WASTE HEAT RECOVERING OPERATION

HEAT EXCHANGER

CROSS REFERENCE TO RELATED APPLICATIONS

This application is a U.S. National Phase Application under 35 U.S.C. 371 of International Application No. PCT/JP2012/007629, filed on Nov. 28, 2012 and published in Japanese as WO/2013/080535 A1 on Jun. 6, 2013. This application is based on Japanese Patent Applications No. 2011-262056 filed on Nov. 30, 2011, and No. 2012-250503 filed on Nov. 14, 2012. The disclosures of all of the above applications are incorporated herein by reference.

TECHNICAL FIELD

The present disclosure relates to a combined heat exchanger configured to enable heat exchange among three types of fluids.

BACKGROUND ART

Conventionally, a combined heat exchanger configured to enable heat exchange among three types of fluids has been known. For example, a heat exchanger disclosed in Patent Document 1 is a combined heat exchanger configured to enable both heat exchange between a refrigerant of a refrigeration cycle device and a vehicle exterior air (outside air) and heat exchange between the refrigerant and a coolant that cools an engine.

PRIOR ART DOCUMENT

Patent Document

Patent Document 1: JP-A-11-157326

SUMMARY OF THE INVENTION

According to the present inventors' study, in the combined heat exchanger of this type, since a configuration is liable to be complicated and increased in size, the present applicant has previously proposed a structure in which tubes are arranged in two rows with respect to a flow direction of air (third fluid), and flows of a refrigerant (first fluid) and a coolant (second fluid) are U-turned with the use of the tubes arranged in two rows in Japanese Patent Application No. 2010-145011 and Japanese Patent Application No. 2010-251119.

Further, the present applicant has previously proposed that a part of the U-turn structure is omitted so that a ratio of the number of first tubes in which the first fluid flows to the number of second tubes in which the second fluid flows is different from each other, to thereby adjust a heat exchange quantity among the three type of fluids, in Japanese Patent Application No. 2011-82759 (hereinafter called "prior application example").

However, in the prior application example, a distribution of fluid to the tubes arranged upstream of the third fluid and the tubes arranged downstream of the third fluid is likely to be uneven. The adjustment of the heat exchange quantity among the three types of fluids may be limited.

Specifically, when a pressure loss of an inner fluid in the multiple overall tubes arranged upstream of the third fluid is different from a pressure loss of an inner fluid in the multiple overall tubes arranged downstream of the third fluid, since it is difficult for the fluid to flow into the tubes larger in the pressure loss, the distribution of the fluid is likely to be uneven.

In view of the above, an object of the present disclosure is to provide a heat exchanger that can appropriately adjust the heat exchange quantity among the three types of fluids.

According to a first example of the present disclosure, a heat exchanger includes: a heat exchange portion in which first tubes through which a first fluid flows and second tubes through which a second fluid flows are stacked, the heat exchange portion performing heat exchange among the first fluid, the second fluid and a third fluid; a tank portion including a first tank space that communicates with the first tubes to collect the first fluid from the first tubes or distribute the first fluid to the first tubes, and a second tank space that communicates with the second tubes to collect the second fluid from the second tubes or distribute the second fluid to the second tubes; a third fluid passage formed between adjacent tubes of the first tubes and the second tubes, the third fluid flowing through the third fluid passage; and an outer fin arranged in the third fluid passage, the outer fin facilitating heat exchange between the first fluid and the third fluid and heat exchange between the second fluid and the third fluid and enabling heat transfer between the first fluid flowing in the first tubes and the second fluid flowing in the second tubes. The heat exchange portion includes an upstream heat exchange portion, and a downstream heat exchange portion arranged downstream of the upstream heat exchange portion in a flow direction of the third fluid. The first tubes are arranged in both the upstream heat exchange portion and the downstream heat exchange portion. The second tubes are arranged in at least one of the upstream heat exchange portion or the downstream heat exchange portion. The upstream heat exchange portion and the downstream heat exchange portion are arranged so that both a portion, in which the first tubes overlap with each other in the flow direction of the third fluid, and a portion, in which the first tubes overlap with the second tubes in the flow direction of the third fluid, are present. The tank portion includes a plate member arranged to close the first tank space and the second tank space from a side of the first and second tubes. The plate member is provided with a first fluid communication passage as a through-hole through which the first tank space communicates with the first tubes, and a second fluid communication passage as a through-hole through which the second tank space communicates with the second tubes. The first tubes in the upstream heat exchange portion configure an upstream first tube group, and the first tubes in the downstream heat exchange portion configure a downstream first tube group. Either the upstream first tube group or the downstream first tube group, whichever is larger in pressure loss of the first fluid, configures a higher pressure loss first tube group. Either the upstream first tube group or the downstream first tube group, whichever is smaller in pressure loss of the first fluid, configures a lower pressure loss first tube group. A flow channel resistance between the higher pressure loss first tube group and the first tank space is smaller than a flow channel resistance between the lower pressure loss first tube group and the first tank space.

With the above configuration, since the first fluid can be more likely to flow into the higher pressure loss first tube group than the lower pressure loss first tube group in the flow channel between the first tank space and the first tubes, the distribution of the fluid can be prevented from being uneven, and the heat exchange quantity among three types of fluids can be further appropriately regulated.

Incidentally, a reason why a difference in the pressure loss is produced between the first tubes of the upstream heat exchange portion and the first tubes of the downstream heat exchange portion is that a state of the first fluid flowing in the first tubes of the upstream heat exchange portion is different from a state of the first fluid flowing in the first tubes of the downstream heat exchange portion with respect to the individual first tube. For example, the pressure loss is larger when the first fluid flowing in the first tubes is in a gas-liquid two-phase state than when the first fluid flowing in the first tubes is in a liquid-phase state.

Also, the difference in the pressure loss can be generated by a difference in structure (shape, overall length, flow channel area, etc.) between the first tubes of the upstream heat exchange portion and the first tubes of the downstream heat exchange portion.

Specifically, a difference between a flow channel area of the overall upstream first tube group and a flow channel area of the overall downstream first tube group, that is, a difference between totals of the flow channel areas within the respective first tubes most largely affects the difference in the pressure loss of the first fluid between the upstream and downstream first tube groups. Therefore, if the number of first tubes configuring the upstream first tube group is, for example, smaller than that of the downstream first tube group, the upstream first tube group is the higher pressure loss first tube group, and the downstream first tube group is the lower pressure loss first tube group. Conversely, if the number of first tubes configuring the upstream first tube group is larger than that of the downstream first tube group, the upstream first tube group is the lower pressure loss first tube group, and the downstream first tube group is the higher pressure loss first tube group.

According to a second example of the present disclosure, in the heat exchanger of the above-described first example, the first tank space may include an inlet side first tank space that is connected to an inlet side of the first tubes and distributes the first fluid, and an outlet side first tank space that is connected to an outlet side of the first tubes and collects the first fluid. A flow channel resistance between the higher pressure loss first tube group and the inlet side first tank space may be smaller than a flow channel resistance between the lower pressure loss first tube group and the inlet side first tank space. The inlet side first tank space may be arranged to be nearer to the higher pressure loss first tube group than to the lower pressure loss first tube group in the flow direction of the third fluid. The inlet side first tank space may communicate with the higher pressure loss first tube group through a communication passage in the first fluid communication passage, and at least a part of an opening portion of the communication passage may be opened toward the first tubes and be disposed to overlap with an opening end surface of the first tubes in a direction perpendicular to the opening end surface.

With the above configuration, the first fluid can be allowed to swiftly flow into the first tubes configuring the higher pressure loss first tube group with the use of a dynamic pressure of the first fluid. For that reason, for example, the first fluid can be prevented from largely flowing into the lower pressure loss first tube group disproportionately.

According to a third example of the present disclosure, in the heat exchanger of the above-described second example, the first tubes may be arranged so that the first fluid flowing within the first tubes has a flow rate component in a direction of a gravitational force. The first fluid may be a refrigerant, the first fluid which has been subjected to heat exchange with the third fluid at least once in the heat exchange portion may be introduced into the inlet side first tank space. The inlet side first tank space may be located on the higher pressure loss first tube group.

Even if the heat exchanger functions as any one of the evaporator and the condenser, as described above, if the first fluid conducts heat exchange with the third fluid once by the heat exchanger, the first fluid is put into a state having two phases of gas and liquid. In the first fluid of such gas-liquid two phases, a liquid component included in the first fluid is more likely to be affected by the gravitational force than gas. Therefore, most of the first fluid is likely to flow into the first tubes coupled to the upstream side in a first fluid flow direction within the inlet side first tank space. Therefore, when the inlet side first tank space is arranged above the higher pressure loss first tube group, the first fluid is prevented from largely flowing into the first tubes disproportionately on an upstream side in the first fluid flow within the inlet side first tank space, as compared with a case in which the inlet side first tank space is present above the lower pressure loss first tube group into which the first fluid is likely to flow. As a result, the first fluid can be evenly supplied to the first tubes connected to the inlet side first tank space.

According to a fourth example of the present disclosure, a heat exchanger includes: a heat exchange portion in which first tubes through which a first fluid flows and second tubes through which a second fluid flows are stacked, the heat exchange portion performing heat exchange among the first fluid, the second fluid and a third fluid; a tank portion including a first tank space that communicates with the first tubes to collect the first fluid from the first tubes or distribute the first fluid to the first tubes, and a second tank space that communicates with the second tubes to collect the second fluid from the second tubes or distribute the second fluid to the second tubes; a third fluid passage formed between adjacent tubes of the first tubes and the second tubes, the third fluid flowing through the third fluid passage; and an outer fin arranged in the third fluid passage, the outer fin facilitating heat exchange between the first fluid and the third fluid and heat exchange between the second fluid and the third fluid and enabling heat transfer between the first fluid flowing in the first tubes and the second fluid flowing in the second tubes. The heat exchange portion includes an upstream heat exchange portion, and a downstream heat exchange portion arranged downstream of the upstream heat exchange portion in a flow direction of the third fluid. The first tubes are arranged in both the upstream heat exchange portion and the downstream heat exchange portion. The second tubes are arranged in at least one of the upstream heat exchange portion or the downstream heat exchange portion. The upstream heat exchange portion and the downstream heat exchange portion are arranged so that both a portion, in which the first tubes overlap with each other in the flow direction of the third fluid, and a portion, in which the first tubes overlap with the second tubes in the flow direction of the third fluid, are present. The tank portion includes a plate member arranged to close the first tank space and the second tank space from a side of the first and second tubes. The plate member is provided with a first fluid communication passage as a through-hole through which the first tank space communicates with the first tubes, and a second fluid communication passage as a through-hole through which the second tank space communicates with the second tubes. Either the first tubes of the upstream heat exchange portion or the first tubes of the downstream heat exchange portion, whichever are larger in a pressure loss of the first fluid, configure higher pressure loss first tubes, and the other first tubes smaller in the pressure loss of the first fluid configure lower pressure loss first tubes. A flow channel resistance between the higher pressure loss first tubes and the first tank space is smaller than a flow channel resistance between the lower pressure loss first tubes and the first tank space.

With the above configuration, since the first fluid can be likely to flow in the higher pressure loss first tubes, the distribution of the fluid can be prevented from being uneven, and the heat exchange quantity among three types of fluids can be further appropriately regulated.

According to a fifth example of the present disclosure, in the heat exchanger of the above-described fifth example, a ratio of the number of the first tubes to a total number of the first tubes and the second tubes in the upstream heat exchange portion may be different from a ratio of the number of the first tubes to a total number of the first tubes and the second tubes in the downstream heat exchange portion.

According to a sixth example of the present disclosure, in the heat exchanger of the above-described fifth or sixth example, the first tank space and the second tank space may be provided to extend in a stacking direction of the first tubes and the second tubes, and arranged in the flow direction of the third fluid. The first tank space may be arranged to be nearer to the lower pressure loss first tubes than to the higher pressure loss first tubes in the flow direction of the third fluid. The second tank space may be arranged to be nearer to the higher pressure loss first tubes than to the lower pressure loss first tubes in the flow direction of the third fluid. The plate member may be provided with a higher pressure loss communication passage as the first fluid communication passage through which the higher pressure loss first tubes communicate with the first tank space, and a lower pressure loss communication passage as the first fluid communication passage through which the lower pressure loss first tubes communicate with the first tank space. A flow channel resistance of the higher pressure loss communication passage may be smaller than a flow channel resistance of the lower pressure loss communication passage, so that the flow channel resistance between the higher pressure loss first tubes and the first tank space is smaller than the flow channel resistance between the lower pressure loss first tubes and the first tank space.

According to a seventh example of the present disclosure, in the heat exchanger of the above-described sixth example, in the plate member, the plate member may be provided with a through-hole configuring the higher pressure loss communication passage, and a through-hole configuring the lower pressure loss communication passage. A hole area of the through-hole configuring the higher pressure loss communication passage may be larger than a hole area of the through-hole configuring the lower pressure loss communication passage, so that the flow channel resistance of the higher pressure loss communication passage is smaller than the flow channel resistance of the lower pressure loss communication passage.

According to an eighth example of the present disclosure, in the heat exchanger of the above-described fourth or fifth example, the first tank space and the second tank space may be provided to extend in a stacking direction of the first tubes and the second tubes, and be arranged in the flow direction of the third fluid. The first tank space may be arranged to be nearer to the higher pressure loss first tubes than to the lower pressure loss first tubes in the flow direction of the third fluid, and the second tank space may be arranged to be nearer to the lower pressure loss first tubes than to the higher pressure loss first tubes in the flow direction of the third fluid. Accordingly, the flow channel resistance between the higher pressure loss first tubes and the first tank space can be smaller than the flow channel resistance between the lower pressure loss first tubes and the first tank space.

According to a ninth example of the present disclosure, a heat exchanger includes: a heat exchange portion in which first tubes through which a first fluid flows and second tubes through which a second fluid flows are stacked, the heat exchange portion performing heat exchange between the first fluid, the second fluid and a third fluid; a tank portion including a first tank space that communicates with the first tubes to collect the first fluid from the first tubes or distribute the first fluid to the first tubes, and a second tank space that communicates with the second tubes to collect the second fluid from the second tubes or distribute the second fluid to the second tubes; a third fluid passage formed between adjacent tubes of the first tubes and the second tubes, the third fluid flowing through the third fluid passage; and an outer fin arranged in the third fluid passage, the outer fin facilitating heat exchange between the first fluid and the third fluid and heat exchange between the second fluid and the third fluid and enabling heat transfer between the first fluid flowing in the first tubes and the second fluid flowing in the second tubes. The heat exchange portion includes an upstream heat exchange portion, and a downstream heat exchange portion arranged downstream of the upstream heat exchange portion in a flow direction of the third fluid. The first tubes are arranged in both the upstream heat exchange portion and the downstream heat exchange portion. The second tubes are arranged in at least one of the upstream heat exchange portion or the downstream heat exchange portion. The upstream heat exchange portion and the downstream heat exchange portion are arranged so that both a portion, in which the first tubes overlap with each other in the flow direction of the third fluid, and a portion, in which the first tubes overlap with the second tubes in the flow direction of the third fluid, are present. The first tank space and the second tank space are provided to extend in a stacking direction of the first tubes and the second tubes, and arranged in the flow direction of the third fluid. The first tank space is arranged so that a position thereof in the flow direction of the third fluid matches a position overlapping with a virtual line which is at the same distance from the first tubes of the upstream heat exchange portion and from the first tubes of the downstream heat exchange portion. A ratio of the number of the first tubes of the upstream heat exchange portion to a total number of the first tubes and the second tubes in the upstream heat exchange portion is different from a ratio of the number of the first tubes of the downstream heat exchange portion to a total number of the first tubes and the second tubes in the downstream heat exchange portion.

With the above configuration, since the first fluid can be likely to flow in the higher pressure loss first tubes as compared with a case in which the first tank space is arranged at a position not overlapping with the virtual line, the distribution of the fluid can be prevented from being uneven, and the heat exchange quantity among three types of fluids can be further appropriately regulated.

According to a tenth example of the present disclosure, in the heat exchanger of the above-described tenth example, the first tank space may include an inlet side first tank space that is connected to an inlet side of the first tubes and distributes the first fluid, and an outlet side first tank space that is connected to an outlet side of the first tubes and collects the first fluid. The inlet side first tank space may be arranged so that a position thereof in the flow direction of the third fluid matches a position overlapping with the virtual line which is at the same distance from the first tubes of the upstream heat exchange portion and from the first tubes of the downstream heat exchange portion. The first tubes in the upstream heat exchange portion may configure an upstream first tube group, and the first tubes in the downstream heat exchange portion may configure a downstream first tube group. Either the upstream first tube group or the downstream first tube group, whichever is larger in a pressure loss of the first fluid, may configure a higher pressure loss first tube group. Either the upstream first tube group or the downstream first tube group, whichever is smaller in a pressure loss of the first fluid, may configure a lower pressure loss first tube group. The inlet side first tank space may be arranged to be nearer to the higher pressure loss first tube group than to the lower pressure loss first tube group in the flow direction of the third fluid. The inlet side first tank space may communicate with the higher pressure loss first tube group through a communication passage, and at least a part of an opening portion of the communication passage may be opened toward the first tubes and is disposed to overlap with an opening end surface of the first tubes in a direction perpendicular to the opening end surface. The first tubes may be arranged so that the first fluid flowing within the first tubes has a flow rate component in a direction of a gravitational force. The first fluid may be a refrigerant, and the first fluid which has been subjected to heat exchange with the third fluid at least once in the third fluid passage may be introduced into the inlet side first tank space. The inlet side first tank space may be arranged on the higher pressure loss first tube group.

With the above configuration, the same advantages as those in the above-mentioned second and third examples of the present disclosure can be obtained.

According to an eleventh example of the present disclosure, in the heat exchanger of any one of the above-described second, third and tenth examples, the heat exchanger may be used as an evaporator that evaporates the first fluid. The outlet side first tank space may be arranged to be nearer to the lower pressure loss first tube group side than to the higher pressure loss first tube group side in the flow direction of the third fluid.

With the above configuration, the tank portion is easily configured so that the first fluid is likely to flow into the outlet side first tank space from the lower pressure loss first tube group into which the first fluid is likely to flow as compared with the higher pressure loss first tube group.

For example, if the difference in the pressure loss of the first fluid between the higher pressure loss first tube group and the lower pressure loss first tube group is caused by the difference in the stacking number of first tubes between the respective first tube groups, the flow channel cross-sectional area from the lower pressure loss first tube group larger in the stacking number to the outlet side first tank space is easily increased as a whole. When the flow channel cross-sectional area is increased as a whole, the tank portion can be configured so that the first fluid is likely to flow into the outlet side first tank space. With the tank portion thus configured, the pressure loss of the first fluid can be reduced as the overall heat exchanger, and a heat exchange performance of the heat exchanger can be improved.

According to a twelfth example of the present disclosure, in the heat exchanger of any one of the above-described first, second, third, tenth and eleventh examples, the number of the first tubes included in the higher pressure loss first tube group may be smaller than that in the lower pressure loss first tube group.

According to a thirteenth example of the present disclosure, in the heat exchanger of any one of the above-described first, second, third, tenth, eleventh and twelfth examples, the higher pressure loss first tube group may configure the upstream first tube group, and the lower pressure loss first tube group may configure the downstream first tube group.

With the above configuration, since a temperature difference between the first fluid and the third fluid in the upstream heat exchange portion is likely to be more increased than that in the downstream heat exchange portion, the heat exchange quantity in the upstream heat exchange portion and the heat exchange quantity in the downstream heat exchange portion are appropriately regulated.

According to a fourteenth example of the present disclosure, in the heat exchanger of any one of the above-described first to thirteenth examples, the first tank space may include a pair of first tank spaces. The heat exchange portion may have three or more first fluid paths, and each of the first fluid paths may have one or more of the first tubes interposed between the pair of first tank spaces. The first fluid paths may be coupled to each other in series in a flow pathway of the first fluid, and each of the first fluid paths may allow the first fluid to flow therein oppositely in the direction of the gravitational force to adjacent another of the first fluid paths in the flow pathway. The first fluid paths may include an upward flow first fluid path in which the first fluid flows upward in the direction of the gravitational force. The upward flow first fluid path may be smaller in stack width of the first tubes of the first fluid paths in the stacking direction of the first tubes than any other adjacent first fluid path in the flow pathway of the first fluid.

With the above configuration, in the upward flow first fluid path, the flow channel of the first fluid is more narrowed as the stack width of the first tubes configuring the upward flow first fluid path is smaller. For that reason, a flow rate of the upward flow of the first fluid which flows upward in the direction of the gravitational force within the first tubes becomes high, and, for example, the first fluid can be swiftly moved up against an own weight of a liquid component included in the first fluid. As a result, the first fluid is likely to evenly flow into the respective tubes. In particular, when the heat exchanger functions as, for example, a condenser, since the first fluid within the first tubes is high in pressure, and low in flow rate, the advantages of the fourteenth example are remarkable.

According to a fifteenth example of the present disclosure, in the heat exchanger of the above-described ninth or tenth example, the tank portion may further include a third tank space extending in a stacking direction of the second tubes. The first tank space, the second tank space and the third tank space may be arranged in the flow direction of the third fluid. The tank portion may include therein a tank interior communication passage through which the first tank space communicates with the third tank space.

According to a sixteenth example of the present disclosure, in the heat exchanger of the above-described fifteenth example, the heat exchanger may further include a refrigerant piping connection connector outside the tank portion and on an opposite side of the tank portion to the first tubes and the second tubes. The refrigerant piping connection connector may be provided with a connector communication passage through which an internal space of the refrigerant piping connection connector communicates with the first tank space.

According to a seventeenth example of the present disclosure, in the heat exchanger of the above-described ninth or tenth example, the tank portion may further include a third tank space extending in a stacking direction of the second tubes. The first tank space, the second tank space and the third tank space may be arranged in the flow direction of the third fluid. The heat exchanger may further include a refrigerant piping connection connector outside the tank portion and on an opposite side of the tank portion to the first tubes and the second tubes. The refrigerant piping connection connector may be provided with a first connector communication passage through which an internal space of the connector communicates with the first tank space, and a second connector communication passage through which the internal space communicates with the third tank space.

According to an eighteenth example of the present disclosure, in the heat exchanger of any one of the above-described first to seventeenth examples, the first fluid and the second fluid may be heat media flowing in different fluid circulation circuits.

With the above configuration, the heat exchanger can be shared by multiple fluid circulation circuits, and an installation space of the heat exchanger can be easily reduced.

According to a nineteenth example of the present disclosure, in the heat exchanger of any one of the above-described first to eighteenth examples, the heat exchanger may be used as an evaporator that evaporates a refrigerant in a vapor compression refrigerant cycle. The first fluid may be the refrigerant of the refrigerant cycle, and the second fluid may be a heat medium which absorbs heat of an external heat source. The third fluid may be air.

When the heat exchanger is thus used as the evaporator, in the upstream heat exchange portion, the temperature difference between the refrigerant and air is increased as compared with that in the downstream heat exchange portion to facilitate vaporization of the refrigerant. As a result, the pressure loss becomes large, thereby making it difficult to distribute the refrigerant to the first tubes of the upstream heat exchange portion.

From the above viewpoint, according to the present disclosure, since the refrigerant can be likely to flow into the first tubes of the upstream heat exchange portion in which the pressure loss becomes larger due to the vaporization of the refrigerant, the distribution of the refrigerant can be prevented from being uneven due to the arrangement of the first tubes in the flow direction of the third fluid. The heat exchange quantity among three types of fluids of the refrigerant, the heat medium, and air can be further appropriately regulated.

According to a twentieth example of the present disclosure, in the heat exchanger of any one of the above-described first to eighteenth examples, the heat exchanger may be used as a condenser that condenses a refrigerant in a vapor compression refrigerant cycle. The first fluid may be the refrigerant of the refrigerant cycle, and the second fluid may be a heat medium which absorbs heat of an external heat source. The third fluid may be air.

When the heat exchanger is thus used as the condenser, as the temperature of the heat medium becomes higher, condensation (liquefaction) of the refrigerant in the first tubes is decelerated, and the amount of refrigerant flowing while keeping the gas-phase state is increased. As a result, the pressure loss of the refrigerant becomes large, and the distribution of the refrigerant between the first tubes of the upstream heat exchange portion and the first tubes of the downstream heat exchange portion is likely to be uneven.

From this viewpoint, according to the present disclosure, since the refrigerant can be likely to flow into either the first tubes of the upstream heat exchange portion or the first tubes of the downstream heat exchange portion, whichever are larger in the pressure loss of the refrigerant, the distribution of the refrigerant can be prevented from being uneven due to the arrangement of the first tubes in the flow direction of the third fluid. The heat exchange quantity among three types of fluids of the refrigerant, the heat medium and air can be further appropriately regulated.

According to a twenty-first example of the present disclosure, in the heat exchanger of any one of the above-described first to eighteenth examples, the heat exchanger may be used for a vehicle cooling system. The first fluid may be a heat medium which absorbs heat of a first in-vehicle device associated with a heat generation during actuation, and the second fluid may be a heat medium which absorbs heat of a second in-vehicle device associated with a heat generation during actuation. The third fluid may be air.

According to a twenty-second example of the present disclosure, in the heat exchanger of any one of the above-described first to nineteenth and twenty-first examples, the heat exchanger may be used as an evaporator that evaporates the first fluid. The number of second tubes included in the upstream heat exchange portion may be larger than that in the downstream heat exchange portion. The second fluid having a higher temperature than that of the first fluid may flow within the second tubes and the second tank space, thereby defrosting.

With the above configuration, frost formation on the heat exchanger is suppressed by heat of the second fluid. Since the second fluid more intensively flows on the upstream side in the flow direction of the third fluid likely to be frosted than the downstream side, the frost formation can be further suppressed, and the heat exchange high in the efficiency can be realized, for example, as compared with a configuration in which the second fluid evenly flows on the upstream side and the downstream side.

EMBODIMENTS FOR EXPLOITATION OF THE INVENTION

Multiple embodiments for implementing the present disclosure will be described with reference to the drawings. In the respective embodiments, parts corresponding to items described in preceding embodiments are denoted by the same reference symbols, and a repetitive description thereof may be omitted. In the respective embodiments, when only a part of the configuration is described, another embodiment described precedingly can be applied to the other portions of the configuration. Also, in the subsequent embodiments, parts corresponding to the items described in the preceding embodiment are denoted by reference symbols different in only hundreds or higher digit to express a correspondence relationship, and a repetitive description thereof may be omitted. In the respective embodiments, in addition to the combinations of the respective parts which can be explicitly specifically combined together, the respective embodiments can be partially combined together even if not explicitly described, if no problem particularly occurs in the combination.

First Embodiment

Figure 1:
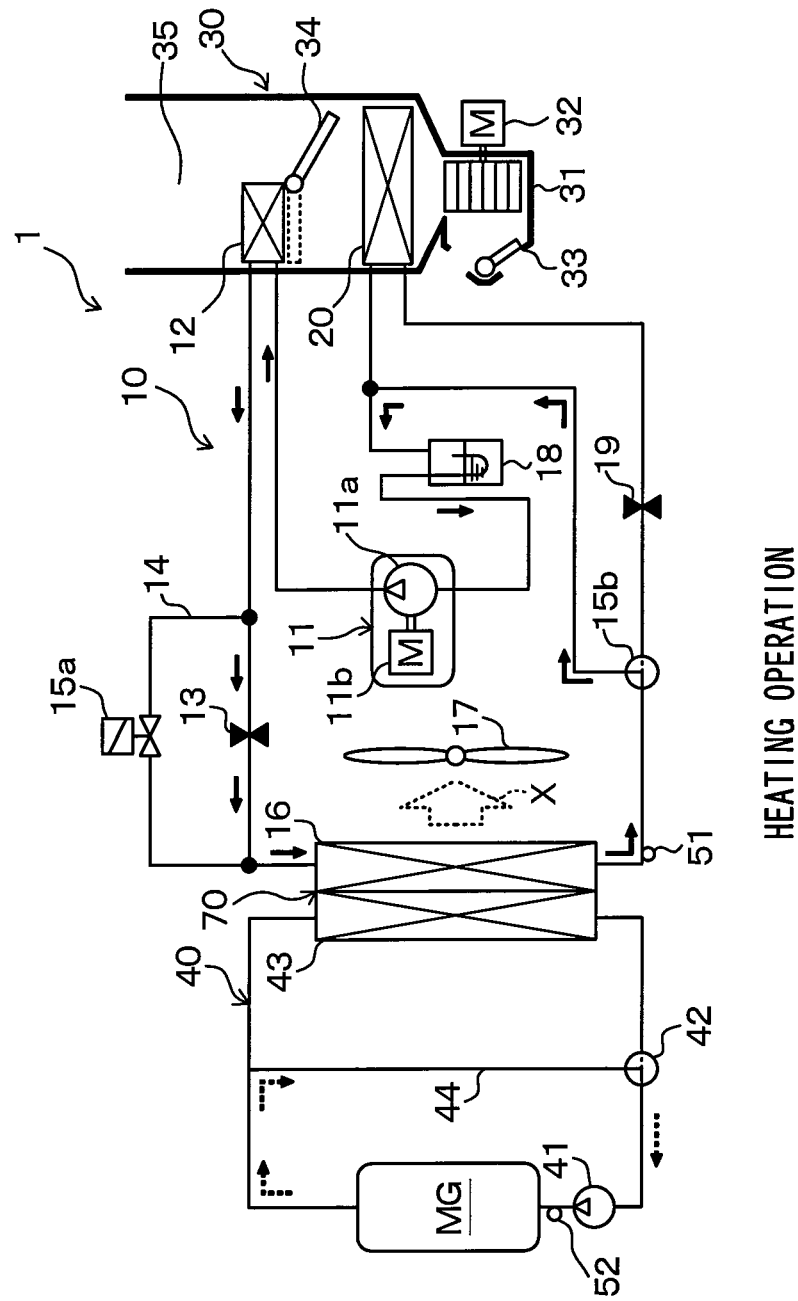
FIG. 1 is a schematic diagram illustrating a heating operation of a vehicle air conditioner including a heat exchanger according to a first embodiment of the present disclosure.
Figure 2:
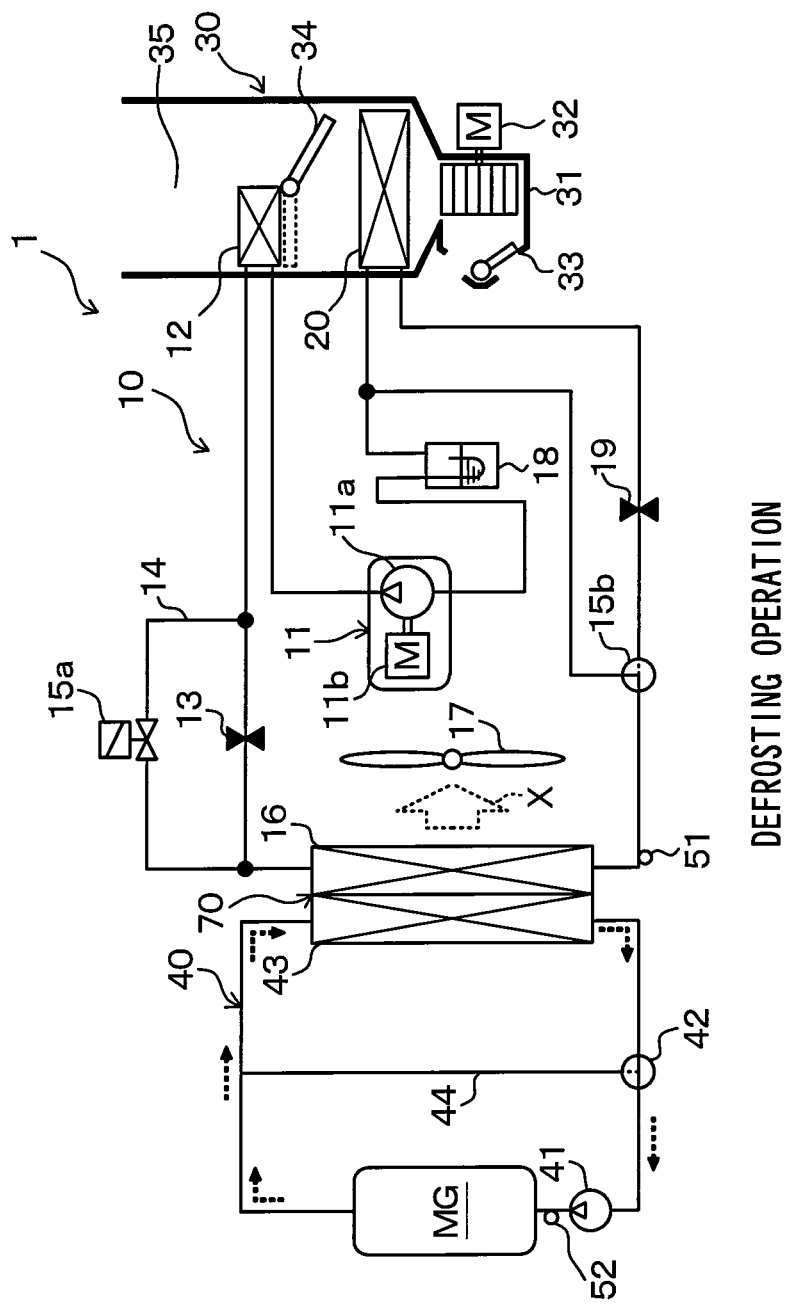
FIG. 2 is a schematic view illustrating a defrosting operation of the vehicle air conditioner including the heat exchanger according to the first embodiment.
Figure 3:
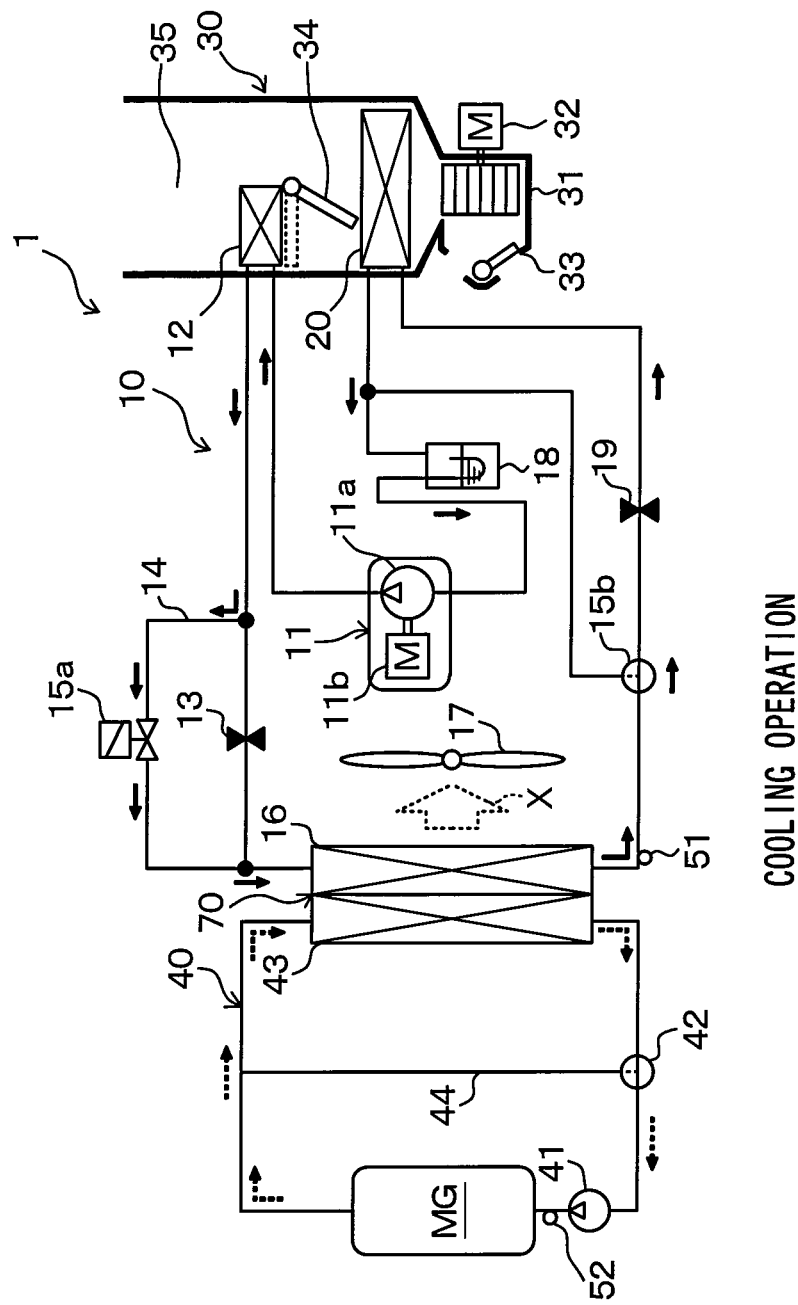
FIG. 3 is a schematic view illustrating a cooling operation of the vehicle air conditioner including the heat exchanger according to the first embodiment.

A first embodiment according to the present disclosure will be described with reference to FIGS. 1 to 9. In the present embodiment, a heat exchanger 70 is applied to a heat pump cycle 10 that regulates a temperature of a vehicle interior blowing air in a vehicle air conditioner 1. FIGS. 1 to 3 are diagrams illustrating an overall configuration of the vehicle air conditioner 1 according to the present embodiment.

The vehicle air conditioner 1 is applied to a so-called hybrid electric vehicle that obtains a drive force for vehicle travel from an internal combustion engine (engine) and a travel electric motor MG.

The hybrid electric vehicle runs or stops the engine according to a travel load of the vehicle, and can switch between a travel state in which the vehicle obtains the drive force from both the engine and the travel electric motor MG, and a travel state in which the vehicle stops the engine and obtains the drive force from only the travel electric motor MG to travel. With the above configuration, the hybrid electric vehicle can improve a vehicle fuel consumption as compared with normal vehicles that obtain the drive force for vehicle travel from only the engine.

The heat pump cycle 10 is a vapor compression refrigeration cycle that performs a function of heating or cooling the vehicle interior blowing air blown into a vehicle interior which is a space to be air-conditioned, in the vehicle air conditioner 1. That is, the heat pump cycle 10 switches a refrigerant passage to another so as to execute the heating operation (heating operation) for heating the vehicle interior blowing air which is a fluid to be subjected to a heat exchange to heat the vehicle interior, and the cooling operation (cooling operation) for cooling the vehicle interior blowing air to cool the vehicle interior.

Further, the heat pump cycle 10 can execute the defrosting operation for melting and removing frost attached to a vehicle exterior heat exchange unit 16 of the heat exchanger 70 during the heating operation. In the overall configuration diagrams of the heat pump cycle 10 illustrated in FIGS. 1 to 3, flows of the refrigerant in the respective operation are indicated by solid arrows.

Also, the heat pump cycle 10 according to the present embodiment applies a general fluorocarbon refrigerant as the refrigerant, and configures a subcritical refrigeration cycle in which a high pressure side refrigerant pressure does not exceed a critical pressure of the refrigerant. Further, a refrigerant oil for lubricating a compressor 11 is mixed in the refrigerant, and a part of the refrigerant oil circulates in the cycle together with the refrigerant.

First, the compressor 11 is an electric compressor which is arranged within an engine room, sucks, compresses, and discharges the refrigerant in the heat pump cycle 10, and drives a fixed displacement compressor 11a having a fixed discharge capacity by an electric motor 11b. As the fixed displacement compressor 11a, various compression mechanisms such as a scroll compression mechanism or a vane compression mechanism can be applied specifically.

The electric motor 11b is controlled in the operation (rotating speed) according to a control signal output from an air conditioning control device which will be described later, and may be applied with any type of an AC motor and a DC motor. By this control of the rotating speed, a refrigerant discharge capability of the compressor 11 is changed. Therefore, in the present embodiment, the electric motor 11b configures a discharge capability changing device of the compressor 11.

A refrigerant discharge port of the compressor 11 is connected with a refrigerant inlet side of a vehicle interior condenser 12 as a use side heat exchanger. The vehicle interior condenser 12 is a heat exchanger for heating which is arranged within a casing 31 of a vehicle interior air conditioning unit 30 in the vehicle air conditioner 1, and exchange a heat between a high-temperature and high-pressure refrigerant flowing in the vehicle interior condenser 12 and the vehicle interior blowing air that has passed through a vehicle interior evaporator 20 which will be described later. A detailed configuration of the vehicle interior air conditioning unit 30 will be described later.

A refrigerant output side of the vehicle interior condenser 12 is connected with a heating fixed aperture 13 as a decompressing device for heating operation for decompressing and expanding the refrigerant flowing out of the vehicle interior condenser 12 during the heating operation. As the heating fixed aperture 13, an orifice or a capillary tube can be applied. An output side of the heating fixed aperture 13 is connected with a refrigerant inlet side of the vehicle exterior heat exchange unit 16 in the combined heat exchanger 70.

Further, a refrigerant outlet side of the vehicle interior condenser 12 is connected with a fixed aperture bypass passage 14 that allows the refrigerant flowing out of the vehicle interior condenser 12 to bypass the heating fixed aperture 13, and guides the refrigerant toward the vehicle exterior heat exchange unit 16. An on-off valve 15a that opens and closes the fixed aperture bypass passage 14 is arranged in the fixed aperture bypass passage 14. The on-off valve 15a is an electromagnetic valve whose open/close operation is controlled by a control voltage output from the air conditioning control device.

Also, a pressure loss generated when the refrigerant passes through the on-off valve 15a is extremely smaller than a pressure loss generated when the refrigerant passes through the fixed aperture 13. Therefore, the refrigerant flowing out of the vehicle interior condenser 12 flows into the vehicle exterior heat exchange unit 16 through the fixed aperture bypass passage 14 when the on-off valve 15a is opened. The refrigerant flows into the vehicle exterior heat exchange unit 16 through the heating fixed aperture 13 when the on-off valve 15a is closed.

With the above operation, the on-off valve 15a can switch the refrigerant passage of the heat pump cycle 10 to another. Therefore, the on-off valve 15a according to the present embodiment functions as a refrigerant passage switching device. As the refrigerant passage switching device, there may be applied an electric three-way valve that switches between a refrigerant circuit that connects the vehicle interior condenser 12 outlet side and the heating fixed aperture 13 inlet side, and a refrigerant circuit that connects between the vehicle interior condenser 12 outlet side and the fixed aperture bypass passage 14 inlet side.

The vehicle exterior heat exchange unit 16 is a heat exchange unit that performs heat exchange between the refrigerant flowing in the heat exchanger 70 and the outside air blown by an air blowing fan 17. The vehicle exterior heat exchange unit 16 is arranged within the engine room and functions as an evaporation heat exchange unit that evaporates a low pressure refrigerant to exercise a heat absorption action during the heating operation, and functions as a radiation heat exchange unit that radiates a high pressure refrigerant during the cooling operation.

Also, the air blowing fan 17 is an electric blower whose operating rate, that is, rotating speed (blowing air volume) is controlled by the control voltage output from the air conditioning control device.

Further, in the heat exchanger 70 according to the present embodiment, the above-mentioned vehicle exterior heat exchange unit 16 is configured integrally with a radiator unit 43 to be described later, which conducts heat exchange between a coolant for cooling the travel electric motor MG and an outside air blown by the air blowing fan 17.

For that reason, the air blowing fan 17 according to the present embodiment configures a vehicle exterior air blowing device for blowing an outside air toward both the vehicle exterior heat exchange unit 16 and the radiator unit 43. A detailed configuration of the combined heat exchanger 70 in which the vehicle exterior heat exchange unit 16 and the radiator unit 43 are configured integrally with each other will be described later.

An outlet side of the vehicle exterior heat exchange unit 16 is connected with an electric three-way valve 15b. The electric three-way valve 15b is controlled in operation by the control voltage output from the air conditioning control device, and configures the refrigerant passage switching device together with the above-mentioned on-off valve 15a.

More specifically, the three-way valve 15b switches the passage to a refrigerant passage that connects an outlet side of the vehicle exterior heat exchange unit 16 and an inlet side of an accumulator 18 during the heating operation. The three-way valve 15b switches the passage to a refrigerant passage that connects the outlet side of the vehicle exterior heat exchange unit 16 and an inlet side of a cooling fixed aperture 19 during the cooling operation.

The cooling fixed aperture 19 is a decompressing device for the cooling operation for decompressing and expanding the refrigerant flowing from the vehicle exterior heat exchange unit 16 during the cooling operation, and a basic configuration thereof is identical with that of the heating fixed aperture 13. An outlet side of the cooling fixed aperture 19 is connected with a refrigerant inlet side of the vehicle interior evaporator 20.

The vehicle interior evaporator 20 is a cooling heat exchanger that is arranged upstream of the vehicle interior condenser 12 along an air flow within the casing 31 of the vehicle interior air conditioning unit 30, and exchanges the heat between the refrigerant flowing therein and an vehicle interior blowing air to cool the vehicle interior blowing air. A refrigerant outlet side of the vehicle interior evaporator 20 is connected with an inlet side of the accumulator 18.

The accumulator 18 is a gas-liquid separator for a low pressure side refrigerant, which separates gas and liquid of the refrigerant flowing into the accumulator 18 from each other to store an excess refrigerant within the cycle therein. A gas-liquid refrigerant outlet of the accumulator 18 is connected with a suction side of the compressor 11. Therefore, the accumulator 18 performs a function of preventing a liquid-phase refrigerant from being sucked into the compressor 11, and preventing a liquid compression of the compressor 11.

In the heat pump cycle 10 according to the present embodiment, a temperature of the coolant flowing out of the radiator unit 43 of the heat exchanger 70 is lower than a temperature of the refrigerant flowing out of the vehicle exterior heat exchange unit 16 of the heat exchanger 70 during the cooling operation. As a result, the degree of supercooling of the refrigerant flowing out of the vehicle exterior heat exchange unit 16 can be increased in cooling operation where the vehicle exterior heat exchange unit 16 functions as a radiation heat exchange unit that radiates heat from a high-pressure refrigerant. Therefore, the cycle efficiency can be improved.

On the other hand, in the heat pump cycle 10 according to the present embodiment, a temperature of the coolant within the radiator unit 43 of the heat exchanger 70 is higher than a temperature of the refrigerant flowing out of the vehicle exterior heat exchange unit 16 of the heat exchanger 70 in the heating operation. As a result, the refrigerant is heated with the absorption of a heat quantity of the coolant, and the evaporation of the refrigerant is facilitated in the heating operation where the vehicle exterior heat exchange unit 16 functions as an evaporation heat exchange unit that evaporates a low-pressure refrigerant to exert the heat absorbing operation.

Subsequently, the vehicle interior air conditioning unit 30 will be described. The vehicle interior air conditioning unit 30 is arranged inside of a dashboard (instrument panel) in a vehicle interior frontmost portion, and houses a blower 32, the above-mentioned vehicle interior condenser 12, and the vehicle interior evaporator 20 within the casing 31 forming an outer envelope thereof.

The casing 31 forms an air passage of the vehicle interior blowing air blown into the vehicle interior, and is molded in resin (for example, polypropylene) having a certain level of elasticity, and excellent in strength. An inside/outside air switching device 33 that selectively introduces the vehicle interior air (inside air) and the outside air is arranged most upstream of the vehicle interior blowing air flow within the casing 31.

The inside/outside air switching device 33 is formed with an inside air introduction port for introducing the inside air into the casing 31, and an outside air introduction port for introducing the outside air. Further, an inside/outside air switching door that continuously regulates opening areas of the inside air introduction port and the outside air introduction port to change an air volume ratio of an air volume of the inside air to an air volume of the outside air is arranged within the inside/outside air switching device 33.

The blower 32 that blows the air sucked through the inside/outside air switching device 33 toward the vehicle interior through the inside/outside air switching device 33 is arranged downstream of the inside/outside air switching device 33 along the air flow. The blower 32 is an electric blower that drives a centrifugal multi-blade fan (sirocco fan) by an electric motor, whose rotating speed (blowing quantity) is controlled by the control voltage output from the air conditioning control device.

The vehicle interior evaporator 20 and the vehicle interior condenser 12 are arranged downstream of the blower 32 in the air flow in this order with respect to a flow of the vehicle interior blowing air. In other words, the vehicle interior evaporator 20 is arranged upstream of the vehicle interior condenser 12 along the air flow of the vehicle interior blowing air.

Further, an air mix door 34 that regulates a volume ratio of the air that passes through the vehicle interior condenser 12 to the blowing air that has passed through the vehicle interior evaporator 20 is disposed downstream of the vehicle interior evaporator 20 along the air flow and upstream of the vehicle interior condenser 12 along the air flow. Also, a mixture space 35 that mixes the blowing air which is heat-exchanged with the refrigerant and heated by the vehicle interior condenser 12 with the blowing air that bypasses the vehicle interior condenser 12 and is not heated is disposed downstream of the vehicle interior condenser 12 along the air flow.

A wind outlet that blasts out air-conditioned wind mixed in the mixture space 35 toward the vehicle interior which is a space to be cooled is arranged most downstream of the casing 31 along the air flow. Specifically, as the wind outlet, there are provided a face wind outlet that blows out the air-conditioned wind toward an upper body of a passenger within the vehicle interior, a foot wind outlet that blows out the air-conditioned wind toward feet of the passenger, and a defroster wind outlet that blows out the air-conditioned wind toward an inside surface of a vehicle front window glass (all not shown).

Therefore, the rate of air volume allowed to pass through the vehicle interior condenser 12 is regulated by the air mix door 34 to regulate a temperature of the air-conditioned wind mixed in the mixture space 35, and the temperature of the air-conditioned wind blown from the respective wind outlets is regulated. That is, the air mix door 34 configures a temperature regulating device for regulating the temperature of the air-conditioned wind to be blown into the vehicle interior.

In other words, the air mix door 34 performs a function as a heat exchange quantity regulating device for regulating a heat exchange quantity between the compressor 11 discharge refrigerant and the vehicle interior blowing air in the vehicle interior condenser 12 configuring the use side heat exchanger. The air mix door 34 is driven by a servo motor not shown whose operation is controlled according to the control signal output from the air conditioning control device.

Further, a face door that regulates an opening area of the face wind outlet, a foot door that regulates an opening area of the face wind outlet, and a defroster door (all not shown) that regulates an opening area of the defroster wind outlet are arranged upstream of the face wind outlet, the foot wind outlet, and the defroster wind outlet along the air flow, respectively.

The face door, the foot door, and the defroster door configure a wind outlet mode switching device for switching a wind outlet mode to another. The face door, the foot door, and the defroster door are driven by a servo motor not shown which is controlled in operation according to the control signal output from the air conditioning control device through a link mechanism, etc.

Subsequently, a description will be given of the coolant circulation circuit 40 that circulates the coolant as a second fluid which is a material different in type from the refrigerant used in the heat pump cycle 10. As illustrated in FIGS. 1 to 3, the coolant circulation circuit 40 is a fluid circulation circuit different from the heat pump cycle 10. Specifically, the coolant circulation circuit 40 is a cooling medium circulation circuit that circulates a coolant (for example, ethylene glycol aqueous solution) as the cooling medium (heating medium) in a coolant passage formed within the above-described travel electric motor MG (external heat source) which is one of in-vehicle devices that generate heat during operation to cool the travel electric motor MG.

A coolant pump 41, an electric three-way valve 42, the radiator unit 43 of the combined heat exchanger 70, and a bypass passage 44 that bypasses the radiator unit 43 and allows the coolant to flow therein are arranged in the coolant circulation circuit 40.

The coolant pump 41 is an electric pump that pumps the coolant into a coolant passage formed within the travel electric motor MG in the coolant circulation circuit 40, whose rotating speed (flow rate) is controlled according to the control signal output from the air conditioning control device. Therefore, the coolant pump 41 functions as a cooling capability regulating device that changes a flow rate of the coolant that cools the travel electric motor MG to regulate a cooling capability.

The three-way valve 42 switches between a coolant circuit that connects an inlet side of the coolant pump 41 and an outlet side of the radiator unit 43 to allow the coolant to flow into the radiator unit 43, and a coolant circuit that connects the inlet side of the coolant pump 41 and an outlet side of the bypass passage 44 to allow the coolant to bypass the radiator unit 43. The three-way valve 42 is controlled in the operation according to the control voltage output from the air conditioning control device, and configures a circuit switching device of the coolant circuit. The three-way valve 42 switches the coolant circuit to perform a function as a coolant flow-rate control device that controls a flow rate of the coolant into the radiator unit 43.

That is, the coolant circulation circuit 40 according to the present embodiment can switch, as indicated by dashed arrows in FIG. 1, etc., between a coolant circuit in which the coolant circulates in the following order: the coolant pump 41; the travel electric motor MG; the radiator unit 43; and the coolant pump 41, and a coolant circuit in which the coolant circulates in the following order: the coolant pump 41; the travel electric motor MG; the bypass passage 44; and the coolant pump 41.

Therefore, when the three-way valve 42 switches to the coolant circuit that allows the coolant to flow while bypassing the radiator unit 43 during the actuation of the travel electric motor MG, the coolant increases a temperature thereof without radiating the heat by the radiator unit 43. That is, when the three-way valve 42 switches to the coolant circuit that allows the coolant to flow while bypassing the radiator unit 43, the heat quantity (the amount of heat generation) of the travel electric motor MG is stored in the coolant.

In the coolant circulation circuit 40 according to the present embodiment, the temperature of the coolant flowing out of the radiator unit 43 in the heat exchanger 70 is set to a predetermined reference temperature (65° C. in the present embodiment) or lower. With this configuration, an inverter of the travel electric motor MG can be protected from a high temperature.

The radiator unit 43 is arranged within an engine room, and functions as a radiation heat exchange unit that conducts heat exchange between the coolant and the outside air blown by the air blowing fan 17. As described above, the radiator unit 43 configures the combined heat exchanger 70 in cooperation with the vehicle exterior heat exchange unit 16.

Figure 4:
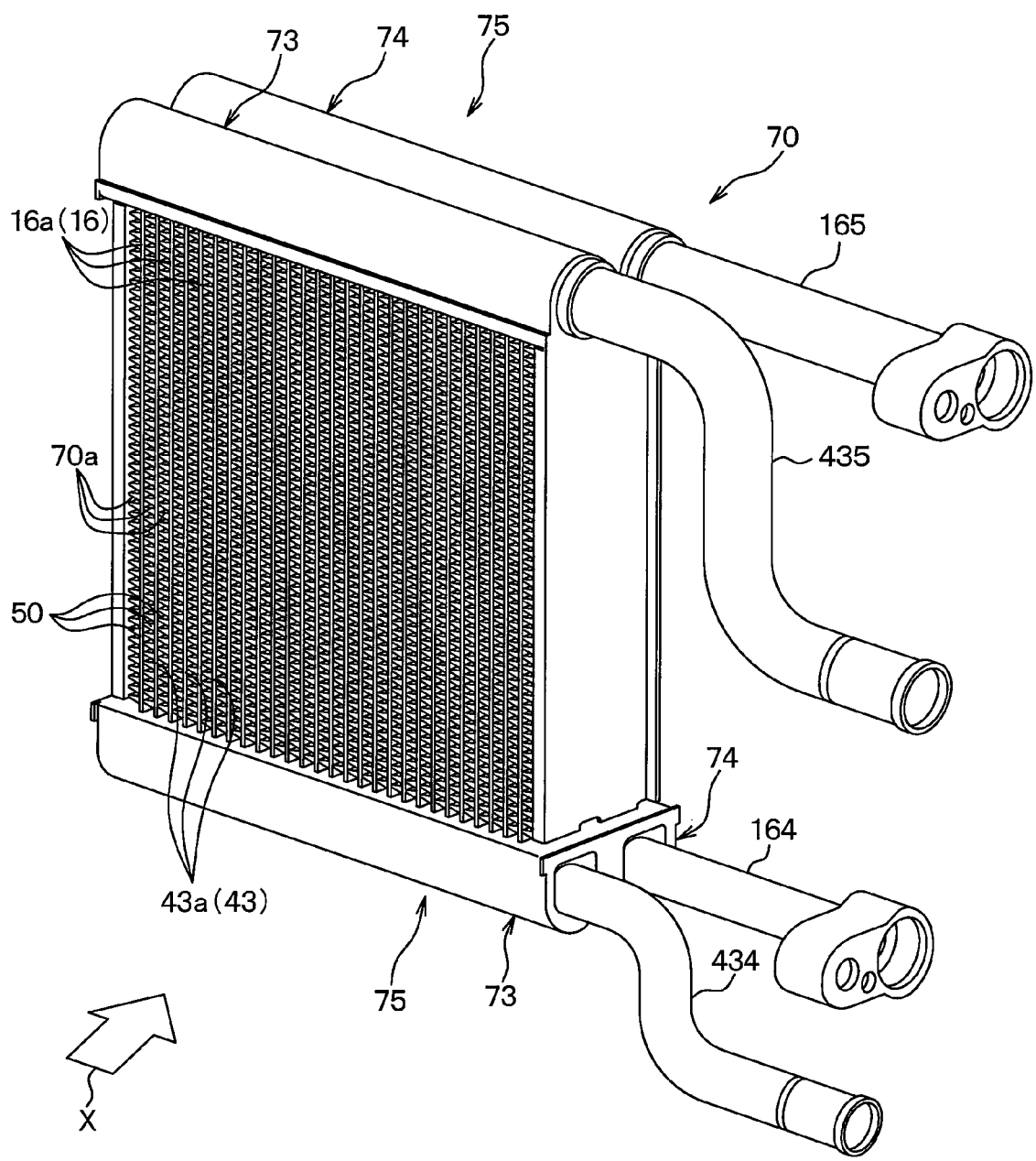
FIG. 4 is a perspective view of the heat exchanger according to the first embodiment.

Now, a detailed configuration of the combined heat exchanger 70 according to the present embodiment will be described with reference to FIGS. 4 to 9. FIG. 4 is a perspective view of the heat exchanger 70, and FIG. 5 is an exploded view of the heat exchanger 70 according to the first embodiment.

Figure 6:
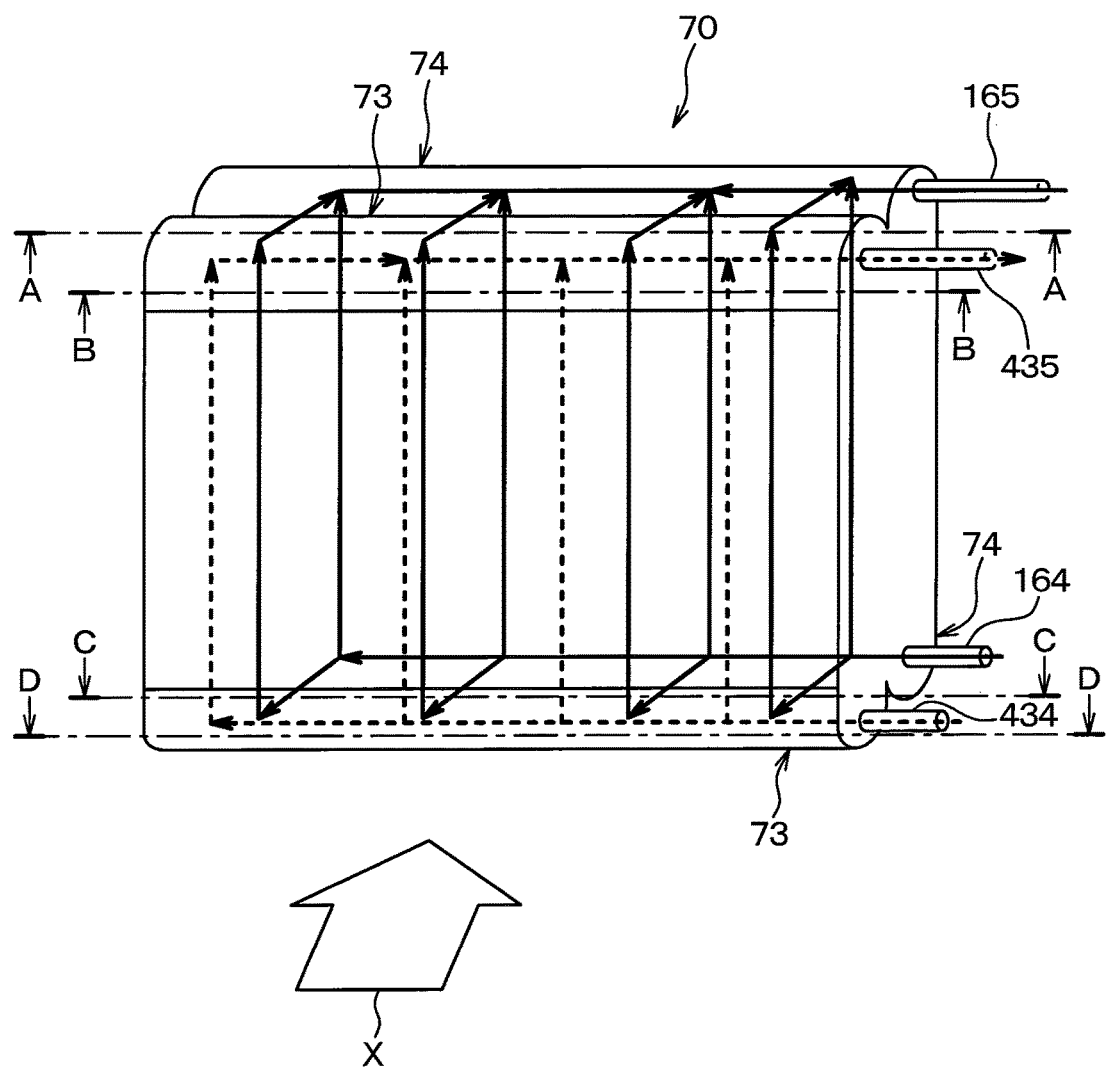
FIG. 6 is a schematic view illustrating flows of a refrigerant and a coolant in the heat exchanger according to the first embodiment.

FIG. 6 is a schematic perspective view illustrating a refrigerant flow and a coolant flow in the heat exchanger 70. In FIG. 6, the flow of refrigerant in the heat pump cycle 10 is indicated by solid lines, and the flow of coolant in the coolant circulation circuit 40 is indicated by dashed arrows.

Figure 7:
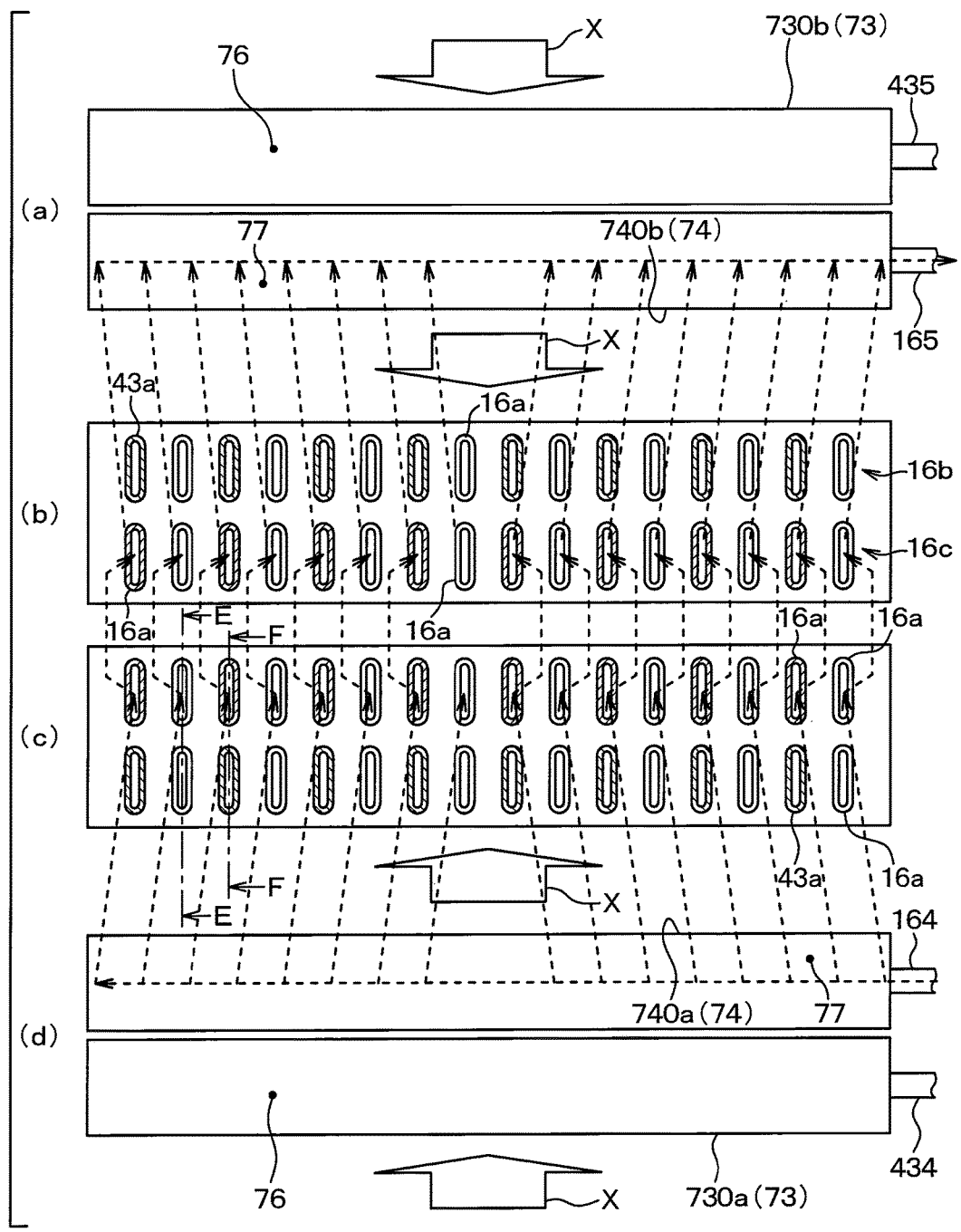
FIG. 7 is schematic view illustrating flows of a refrigerant and so on in the heat exchanger according to the first embodiment.
Figure 8:
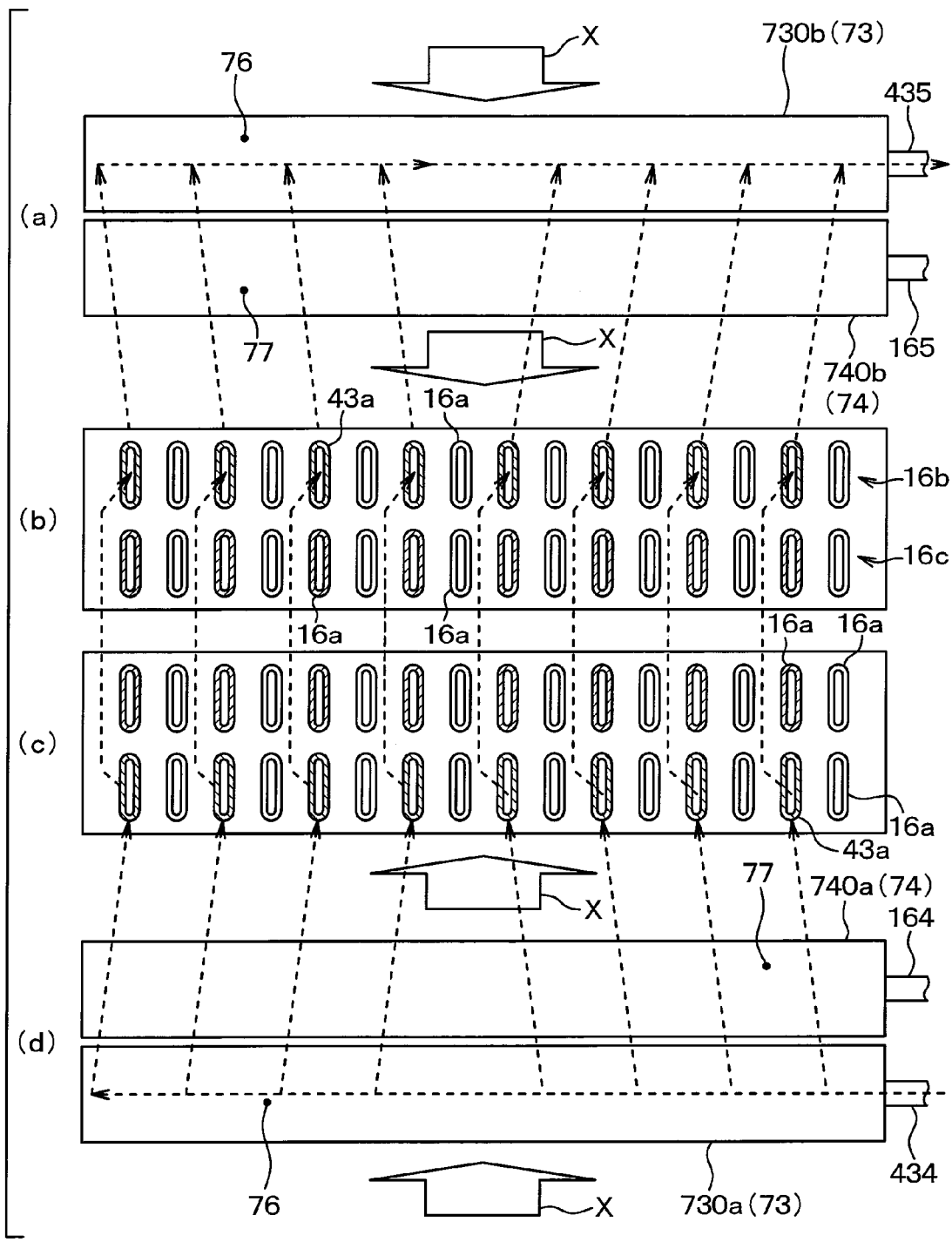
FIG. 8 is cross-sectional view illustrating the coolant flow in the heat exchanger according to the first embodiment.

FIGS. 7(a) and 8(a) are cross-sectional views taken along a line A-A of FIG. 6, FIGS. 7(b) and 8(b) are cross-sectional views taken along a line B-B of FIG. 6, FIGS. 7(c) and 8(c) are cross-sectional views taken along a line C-C of FIG. 6, and FIGS. 7(d) and 8(d) are cross-sectional views taken along a line D-D of FIG. 6. Dashed arrows in FIG. 7 indicate the refrigerant flow, and dashed lines in FIG. 8 indicate the coolant flow. Also, FIG. 9(a) is a cross-sectional view taken along a line E-E in FIG. 7, and FIG. 9(b) is a cross-sectional view taken along a line F-F in FIG. 7.

Figure 5:
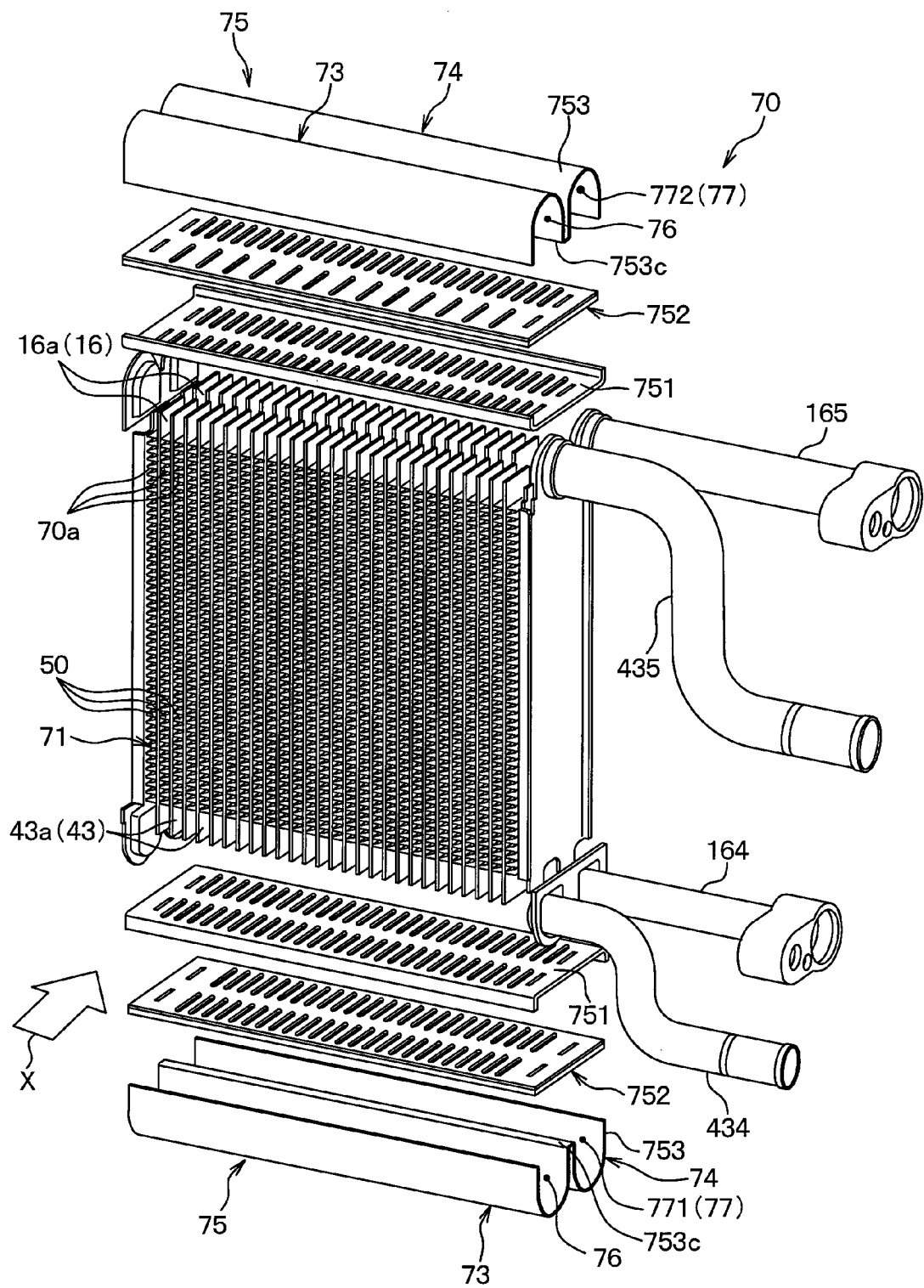
FIG. 5 is an exploded view of the heat exchanger according to the first embodiment.

First, as illustrated in FIGS. 4 and 5, the combined heat exchanger 70 has a so-called tank and tube type heat exchanger structure having multiple tubes in which the refrigerant or the coolant flows, and a pair of collection and distribution tanks that is arranged on both end sides of the multiple tubes, and collects or distributes the refrigerant or the coolant which flows in the respective tubes. An installation direction of the heat exchanger 70 is not particularly restricted. For example, a lower side of a page of FIG. 4 represents a lower side in the direction of the gravitational force.

More specifically, the combined heat exchanger 70 includes refrigerant tubes 16a (first tubes) within which the refrigerant flows as a first fluid, and coolant tubes 43a (second tubes) within which the coolant is circuited as a second fluid.

Also, the combined heat exchanger 70 includes an upstream heat exchange portion 71 configured so that the refrigerant tubes 16a and the coolant tubes 43a are alternately stacked on each other. The upstream heat exchange portion 71 conducts heat exchange between the refrigerant flowing in the refrigerant tubes 16a and air (outside air blown by the air blowing fan 17) as a third fluid flowing around the refrigerant tubes 16a. The upstream heat exchange portion 71 also conducts heat exchange between the coolant flowing in the coolant tubes 43a and the air (outside air blown by the air blowing fan 17) flowing around the coolant tubes 43a.

A downstream heat exchange portion 72 configured so that the refrigerant tubes 16a are stacked on each other is disposed downstream of the upstream heat exchange portion 71 in the outside air flow. The downstream heat exchange portion 72 conducts heat exchange between the refrigerant flowing in the refrigerant tubes 16a and the air (outside air blown by the air blowing fan 17) flowing around the refrigerant tubes 16a.

Flattened tubes flat in a cross-section perpendicular to the longitudinal direction of the tubes are employed as the refrigerant tubes 16a and the coolant tubes 43a. More specifically, tubes having a flat porous cross-sectional shape molded through an extrusion machining are applied as the refrigerant tubes 16a. Also, tubes having a flat two-hole cross-sectional shape formed by folding a single plate material are applied as the coolant tubes 43a.

The refrigerant tubes 16a and the coolant tubes 43a configuring the upstream heat exchange portion 71 are arranged to be alternately stacked on each other at given intervals so that respective flat surfaces of their outer surfaces are parallel to each other, and face each other. Likewise, the refrigerant tubes 16a configuring the downstream heat exchange portion 72 are stacked on each other at given intervals. The given intervals are equal to each other in any one of the upstream heat exchange portion 71 and the downstream heat exchange portion 72.

The refrigerant tubes 16a configuring the upstream heat exchange portion 71 are arranged between the respective coolant tubes 43a, and the coolant tubes 43a are arranged between the respective refrigerant tubes 16a. Also, the refrigerant tubes 16a configuring the downstream heat exchange portion 72, and the refrigerant tubes 16a or the coolant tubes 43a configuring the upstream heat exchange portion 71 are arranged to overlap with each other in the flow direction of the outside air blown by the air blowing fan 17.

In this example, in the upstream heat exchange portion 71, since the refrigerant tubes 16a and the coolant tubes 43a are alternately arranged one by one, the total number of refrigerant tubes 16a is identical with the total number of coolant tubes 43a. For that reason, a ratio (hereinafter referred to as "upstream number ratio") of the number of refrigerant tubes 16a in the upstream heat exchange portion 71 to the total number of refrigerant tubes 16a and coolant tubes 43a configuring the upstream heat exchange portion 71 is 0.5. In short, the total number of coolant tubes 43a included in the upstream heat exchange portion 71 is larger than that in the downstream heat exchange portion 72.

On the other hand, the downstream heat exchange portion 72 is configured by only the refrigerant tubes 16a. For that reason, a ratio (hereinafter referred to as "downstream number ratio") of the number of refrigerant tubes 16a in the downstream heat exchange portion 72 to the total number of refrigerant tubes 16a and coolant tubes 43a configuring the downstream heat exchange portion 72 is 1.

Therefore, in the combined heat exchanger 70 according to the present embodiment, the upstream number ratio is smaller than the downstream number ratio.

In the heat exchanger 70, spaces formed between the refrigerant tubes 16a and the coolant tubes 43a configuring the upstream heat exchange portion 71, and spaces formed between the respective adjacent refrigerant tubes 16a configuring the downstream heat exchange portion 72 form outside air passages 70a (third fluid passages) in which the outside air blown by the air blowing fan 17 flows.

Outer fins 50 are arranged in the outside air passages 70a, which facilitate heat exchange between the refrigerant and the outside air, and heat exchange between the coolant and the outside air, and also enable heat transfer between the refrigerant flowing in the refrigerant tubes 16a, and the coolant flowing in the coolant tubes 43a configuring the upstream heat exchange portion 71, and heat transfer between the coolants flowing in the respective adjacent refrigerant tubes 16a configuring the downstream heat exchange portion 72.

Corrugated fins formed by bending a metal thin plate excellent in heat conductivity into a corrugated shape are applied as the outer fins 50, and in the present embodiment, the outer fins 50 are joined to both the refrigerant tubes 16a and the coolant tubes 43a configuring the upstream heat exchange portion 71, to thereby enable heat transfer between the refrigerant tubes 16a and the coolant tubes 43a. Further, the outer fins 50 are joined to the respective adjacent refrigerant tubes 16a configuring the downstream heat exchange portion 72, to thereby enable heat transfer between the respective adjacent refrigerant tubes 16a.

Subsequently, upstream tank units 73 and downstream tank units 74 will be described. The stack type heat exchanger 70 includes the upstream tank units 73 each extending in a stacking direction of the refrigerant tubes 16a and the coolant tubes 43a configuring the upstream heat exchange portion 71, and the downstream tank units 74 each extending in a stacking direction of the refrigerant tubes 16a configuring the downstream heat exchange portion 72.

The upstream tank units 73 are arranged on both end sides of the refrigerant tubes 16a and the coolant tubes 43a in the upstream heat exchange portion 71 in a longitudinal direction thereof, and the downstream tank units 74 are arranged on both end sides of the refrigerant tubes 16a of the downstream heat exchange portion 72 in the longitudinal direction thereof.

The upstream tank units 73 are each formed with a coolant space 76 (second tank space) that collects or distributes the coolant flowing in the coolant tubes 43a configuring the upstream heat exchange portion 71. Also, the downstream tank units 74 are each formed with a refrigerant space 77 (first tank space) that collects or distributes the refrigerant flowing in the refrigerant tubes 16a configuring the downstream heat exchange portion 72.

In detail, the refrigerant space 77 connected to one ends (tube inlet side, lower side of FIG. 5) of the refrigerant tubes 16a represent a refrigerant space 771 (inlet side first tank space) on a refrigerant tube inlet side for distributing the refrigerant. On the other hand, the refrigerant space 77 connected to the other ends (tube outlet side, upper side of FIG. 5) of the refrigerant tubes 16a represent a refrigerant space 772 (outlet side first tank space on a first tube outlet side) on a refrigerant tube outlet side for collecting the refrigerant.

The upstream tank units 73 and the downstream tank units 74 are integrated with each other. Hereinafter, the upstream tank units 73 and the downstream tank units 74 integrated with each other are called "header tank 75 (tank portion)".

The header tank 75 includes a header plate 751 to which both the refrigerant tubes 16a and the coolant tubes 43a arranged in two rows with respect to the flow direction of the outside air are fixed, an intermediate plate member 752 (plate member) fixed to the header plate 751, and a tank formation member 753.

The tank formation member 753 is fixed to the header plate 751 and the intermediate plate member 752, to thereby form the coolant space 76 and the refrigerant space 77 described above therein. Specifically, the tank formation member 753 is formed into a two-peak shape (W-shape) when viewed from the longitudinal direction thereof, by subjecting a plate metal to pressing.

A center portion 753c of the two-peak shape of the tank formation member 753 is joined to the intermediate plate member 752 to section the coolant space 76 and the refrigerant space 77.

Figure 9:
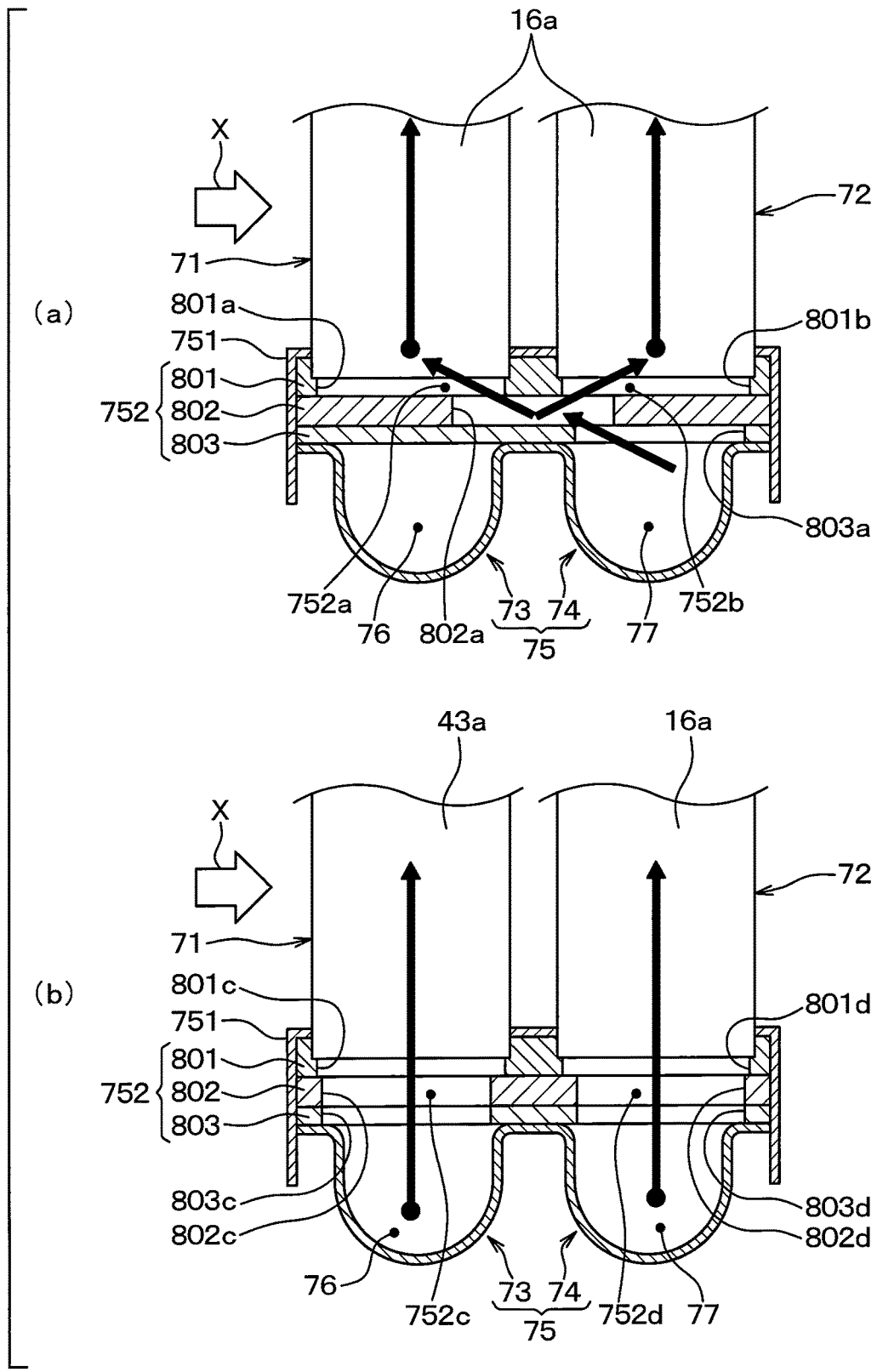
FIG. 9(a) is a cross-sectional view taken along a line E-E in FIG. 7.
FIG. 9(b) is a cross-sectional view taken along a line F-F in FIG. 7.

FIG. 9 is cross-sectional view of the header tank 75 arranged on one end side (lower side in FIG. 4) of the refrigerant tubes 16a and the coolant tubes 43a in the longitudinal direction thereof. A configuration of the header tank 75 arranged on the other end side (upper side in FIG. 4) of the refrigerant tubes 16a and the coolant tubes 43a in the longitudinal direction thereof is identical with that in FIG. 9, and therefore will be omitted from the drawing.

FIG. 9(a) illustrates a cross section in which the refrigerant tubes 16a of the upstream heat exchange portion 71 and the refrigerant tubes 16a of the downstream heat exchange portion 72 overlap with each other in the flow direction X of the outside air.

FIG. 9(b) illustrates a cross section in which the coolant tubes 43a of the upstream heat exchange portion 71 and the refrigerant tubes 16a of the downstream heat exchange portion 72 overlap with each other in the flow direction X of the outside air.

The intermediate plate member 752 is arranged within the header tank 75 so as to close the coolant space 76 and the refrigerant space 77 from the sides of the refrigerant tubes 16a and the coolant tubes 43a.

As illustrated in FIG. 9(a), in the cross-section where the respective refrigerant tubes 16a overlap with each other in the flow direction X of the outside air, the intermediate plate member 752 is formed with an upstream refrigerant communication passage 752a (first fluid communication passage) that communicates the refrigerant tubes 16a of the upstream heat exchange portion 71 with the refrigerant space 77, and a downstream refrigerant communication passage 752b (first fluid communication passage) that communicates the refrigerant tubes 16a of the downstream heat exchange portion 72 with the refrigerant space 77.

For example, in the present embodiment, when an upstream refrigerant tube group 16b (upstream first tube group) configured by the multiple refrigerant tubes 16a in the upstream heat exchange portion 71 is compared with a downstream refrigerant tube group 16c configured by the multiple refrigerant tubes 16a in the downstream heat exchange portion 72, the stacking number of the refrigerant tubes 16*a* configuring the upstream refrigerant tube group 16*b* is smaller than that of the downstream refrigerant tube group 16*c*. For that reason, since a total flow channel area of the refrigerant in the upstream refrigerant tube group 16*b* is smaller than that the downstream refrigerant tube group 16*c*, a pressure loss of the refrigerant flowing in the upstream refrigerant tube group 16*b* is larger than that in the downstream refrigerant tube group 16*c*.

Therefore, it is assumed that either the upstream refrigerant tube group 16*b* or the downstream refrigerant tube group 16*c*, whichever is larger in the pressure loss of the refrigerant, is called "higher pressure loss refrigerant tube group (higher pressure loss first tube group)", and the other refrigerant tube group smaller in the pressure loss of the refrigerant is called "lower pressure loss refrigerant tube group (lower pressure loss first tube group)". Then, the upstream refrigerant tube group 16*b* corresponds to the higher pressure loss refrigerant tube group, and the downstream refrigerant tube group 16*c* corresponds to the lower pressure loss refrigerant tube group.

Also, as described above, the upstream refrigerant tube group 16*b* is present at the high pressure loss side with respect to the downstream refrigerant tube group 16*c* when a stacking number of refrigerant tubes 16*a* configuring the upstream refrigerant tube group 16*b* is smaller than that in the downstream refrigerant tube group 16*c*. Therefore, the upstream refrigerant tube group 16*b* may be called "smaller stacking number side refrigerant tube group (smaller stacking number side first tube group)" which is a side where the stacking number of refrigerant tubes 16*a* is smaller. The downstream refrigerant tube group 16*c* may be called "larger stacking number side refrigerant tube group (larger stacking number side first tube group)" which is a side where the stacking number of refrigerant tubes 16*a* is larger. Also, in the present embodiment, the respective refrigerant tube groups 16*b* and 16*c* have the refrigerant tubes 16*a* aligned in a line, and therefore can be called "refrigerant tube line (first tube line)".

For example, when the refrigerant is evaporated in the vehicle exterior heat exchange unit 16, a temperature difference between the refrigerant and air in the upstream heat exchange portion 71 is larger than that in the downstream heat exchange portion 72, to facilitate the vaporization of the refrigerant. Therefore, the pressure loss of the refrigerant becomes larger in the respective refrigerant tubes 16*a*. The difference in the flow channel area of the refrigerant far more affects the pressure loss of the refrigerant than the difference in the state of the refrigerant flowing in the refrigerant tubes 16*a*.

Also, when attention is paid to the respective refrigerant tubes 16*a*, when the refrigerant is evaporated, for example, in the vehicle exterior heat exchange unit 16, the temperature difference between the refrigerant and air in the upstream heat exchange portion 71 becomes larger than that in the downstream heat exchange portion 72, to facilitate the vaporization of the refrigerant. As a result, the pressure loss becomes larger. Therefore, in this case, the refrigerant tubes 16*a* of the upstream heat exchange portion 71 can be expressed as the higher pressure loss first tubes, and the refrigerant tubes 16*a* of the downstream heat exchange portion 72 can be expressed as the lower pressure loss first tubes. Also, the upstream refrigerant communication passage 752*a* can be expressed as a higher pressure loss communication passage, and the downstream refrigerant communication passage 752*b* can be expressed as a lower pressure loss communication passage.

The upstream refrigerant communication passage 752*a* is linearly formed between the refrigerant tubes 16*a* of the upstream heat exchange portion 71 and the refrigerant space 77. Specifically, the upstream refrigerant communication passage 752*a* is formed obliquely linearly with respect to a thickness direction (vertical direction in FIG. 9(*a*)) of the intermediate plate member 752. On the contrary, the downstream refrigerant communication passage 752*b* is formed to be bent between the refrigerant tubes 16*a* of the downstream heat exchange portion 72 and the refrigerant space 77. Therefore, a flow channel resistance of the upstream refrigerant communication passage 752*a* is smaller than a flow channel resistance of the downstream refrigerant communication passage 752*b*.

As illustrated in FIG. 9(*b*), in the cross-section where the coolant tubes 43*a* and the refrigerant tubes 16*a* overlap with each other in the flow direction X of the outside air, the intermediate plate member 752 is formed with a coolant communication passage 752*c* (second fluid communication passage) that communicates the coolant tubes 43*a* of the upstream heat exchange portion 71 with the refrigerant space 77, and a refrigerant communication passage 752*d* that communicates the refrigerant tubes 16*a* of the downstream heat exchange portion 72 with the refrigerant space 77.

A specific configuration example of those communication passages 752*a* to 752*d* will be described. In this example, as illustrated in FIG. 9, the intermediate plate member 752 is configured by stacking three plate members of a first plate member 801, a second plate member 802, and a third plate member 803 on each other from a side (upper side of FIG. 9) closer to the refrigerant tubes 16*a* and the coolant tubes 43*a* toward a side (lower side of FIG. 9) closer to the coolant space 76 and the refrigerant space 77.

In FIG. 9(*a*), the first plate member 801 is formed with two through-holes 801*a* and 801*b* that penetrate through both sides thereof. The second plate member 802 is formed with one through-hole 802*a* that penetrates through both sides thereof. The third plate member 803 is formed with one through-hole 803*a* that penetrates through both sides thereof.

One through-hole 801*a* of the two through-holes 801*a* and 801*b* in the first plate member 801 is communicated with the refrigerant tubes 16*a* of the upstream heat exchange portion 71, and the other through-hole 801*b* is communicated with the refrigerant tubes 16*a* of the downstream heat exchange portion 72.

The through-hole 802*a* of the second plate member 802 is communicated with both the through-holes 801*a* and 801*b* in the first plate member 801.

The through-hole 803*a* of the third plate member 803 is communicated with the through-hole 802*a* of the second plate member 802, and also communicated with the refrigerant space 77.

Therefore, the upstream refrigerant communication passage 752*a* is configured by one through-hole 801*a* of the first plate member 801, and the through-holes 802*a* and 803*a* of the second and third plate members 802 and 803. The downstream refrigerant communication passage 752*b* is configured by the other through-hole 801*b* of the first plate member 801, and the through-holes 802*a* and 803*a* of the second and third plate members 802 and 803.

In FIG. 9(*b*), the first plate member 801 is formed with two through-holes 801*c* and 801*d* that penetrate through both sides thereof. The second plate member 802 is formed with two through-holes 802*c* and 802*d* that penetrate through both sides thereof. The third plate member 803 is formed with two through-holes 803c and 803d that penetrate through both sides thereof.

One through-hole 801c among the two through-holes 801c and 801d in the first plate member 801 is communicated with the coolant tubes 43a of the upstream heat exchange portion 71, and the other through-hole 801d is communicated with the refrigerant tubes 16a of the downstream heat exchange portion 72.

One through-hole 802c among the two through-holes 802c and 802d in the second plate member 802 is communicated with one through-hole 801c of the first plate member 801, and the other through-hole 802d is communicated with the other through-hole 801d of the first plate member 801.

One through-hole 803c among the through-holes 803c and 803d in the third plate member 803 is communicated with one through-hole 802c of the second plate member 802 and the coolant space 76, and the other through-hole 803d is communicated with the other through-hole 802d of the second plate member 802, and the refrigerant space 77.

Therefore, the upstream coolant communication passage 752c is configured by the through-holes 801c, 802c, and 803c of the first to third plate members 801 to 803. The downstream refrigerant communication passage 752d is configured by the through-holes 801d, 802d, and 803d of the first to third plate members 801 to 803.

Also, as illustrated in FIG. 4, one end side (right side of FIG. 4) of the upstream tank unit 73 in the longitudinal direction thereof, which is arranged on one end side (lower side of FIG. 4) of the coolant tubes 43a in the longitudinal direction thereof, is connected with a coolant inflow pipe 434 that allows the coolant to flow into the coolant space 76. The other end side (left side of FIG. 4) of the upstream tank unit 73 in the longitudinal direction thereof, which is arranged on one end side of the coolant tubes 43a in the longitudinal direction thereof, is closed by a closing member.

Also, one end side (right side of FIG. 4) of the upstream tank unit 73 in the longitudinal direction thereof, which is arranged on the other end side (upper side of FIG. 4) of the coolant tubes 43a in the longitudinal direction thereof, is connected with a coolant outflow pipe 435 that allows the coolant to flow out of the coolant space 76. The other end side (left side of FIG. 4) of the upstream tank unit 73 in the longitudinal direction thereof, which is arranged on the other end side of the coolant tubes 43a in the longitudinal direction thereof, is closed by a closing member.

Also, one end side (right side of FIG. 4) of the downstream tank unit 74 in the longitudinal direction thereof, which is arranged on one end side (lower side of FIG. 4) of the refrigerant tubes 16a in the longitudinal direction thereof, is connected with a refrigerant inflow pipe 164 that allows the refrigerant to flow into the refrigerant space 77. The other end side (left side of FIG. 4) of the downstream tank unit 74 in the longitudinal direction thereof, which is arranged on one end side of the refrigerant tubes 16a in the longitudinal direction thereof, is closed by a closing member.

Also, one end side (right side of FIG. 4) of the downstream tank unit 74 in the longitudinal direction thereof, which is arranged on the other end side (upper side of FIG. 4) of the refrigerant tubes 16a in the longitudinal direction thereof, is connected with a refrigerant outflow pipe 165 that allows the refrigerant to flow out of the refrigerant space 77. The other end side (left side of FIG. 4) of the downstream tank units 74 in the longitudinal direction thereof, which is arranged on the other end side of the refrigerant tubes 16a in the longitudinal direction thereof, is closed by a closing member.

Hereinafter, the upstream tank units 73 arranged one end side (lower side of FIG. 4) of the coolant tubes 43a in the longitudinal direction thereof is called "first upstream tank unit 730a", and the upstream tank units 73 arranged on the other end side (upper side of FIG. 4) of the coolant tubes 43a in the longitudinal direction thereof is called "second upstream tank unit 730b".

Also, the downstream tank units 74 arranged one end side (lower side of FIG. 4) of the refrigerant tubes 16a in the longitudinal direction thereof is called "first downstream tank unit 740a", and the downstream tank units 74 arranged on the other end side (upper side of FIG. 4) of the refrigerant tubes 16a in the longitudinal direction thereof is called "second downstream tank unit 740b".

Therefore, in the heat exchanger 70 according to the present embodiment, as illustrated in FIGS. 6, 7, and 9, a part of the refrigerant that flows into the refrigerant space 77 of the first downstream tank unit 740a through the refrigerant inflow pipe 164 flows into the refrigerant tubes 16a of the downstream heat exchange portion 72 through the refrigerant communication passages 752b and 752d formed in the intermediate plate member 752, and flows within the refrigerant tubes 16a from a lower side of FIG. 6 toward an upper side thereof. Also, another part of the refrigerant that flows into the refrigerant space 77 of the first downstream tank unit 740a flows into the refrigerant tubes 16a of the upstream heat exchange portion 71 through the upstream refrigerant communication passage 752a formed in the intermediate plate member 752, and flows within the refrigerant tubes 16a from the lower side of FIG. 6 toward the upper side thereof.

The refrigerant that flows out of the refrigerant tubes 16a of the downstream heat exchange portion 72 is collected into the refrigerant space 77 of the second downstream tank unit 740b through the refrigerant communication passages 752b and 752d formed in the intermediate plate member 752. Also, the refrigerant that flows out of the refrigerant tubes 16a of the upstream heat exchange portion 71 is collected into the refrigerant space 77 of the second downstream tank unit 740b through the refrigerant communication passage 752a formed in the intermediate plate member 752.

The refrigerant collected into the refrigerant space 77 of the second downstream tank unit 740b flows from the left side toward the right side in FIG. 6, and flows out of the refrigerant outflow pipe 165.

On the other hand, in the heat exchanger 70 according to the present embodiment, as illustrated in FIGS. 6, 8, and 9, the coolant that flows into the coolant space 76 of the first upstream tank unit 730a through the coolant inflow pipe 434 flows into the coolant tubes 43a of the upstream heat exchange portion 71 through the coolant communication passage 752c formed in the intermediate plate member 752, and flows within the coolant tubes 43a from the lower side of FIG. 6 toward the upper side thereof.

The coolant that flows out of the coolant tubes 43a of the upstream heat exchange portion 71 is collected into the coolant space 76 of the second upstream tank unit 730b through the coolant communication passage 752c formed in the intermediate plate member 752. Also, the coolant that is collected into the coolant space 76 of the second upstream tank unit 730b flows from the left side toward the right side in FIG. 6, and flows out of the coolant outflow pipe 435.

In the above-mentioned heat exchanger 70, the vehicle exterior heat exchange unit 16 is configured by both the refrigerant tubes 16a of the upstream heat exchange portion 71 and the refrigerant tubes 16a of the downstream heat exchange portion 72. The radiator unit 43 is configured by the coolant tubes 43a of the upstream heat exchange portion 71.

The refrigerant tubes 16a, the coolant tubes 43a, the respective components of the header tank 75, and the outer fins 50 in the above-mentioned heat exchanger 70 are made of the same metal material (aluminum alloy in the present embodiment). The header plate 751 and the tank formation member 753 are fixed by clamping in a state where the intermediate plate member 752 is sandwiched therebetween.

Further, the overall heat exchanger 70 which is fixed by clamping is carried into a heating furnace, and heated. A brazing filler metal cladded in advance is melted on a surface of the respective components, and the heat exchanger 70 is cooled until the brazing filler metal is again solidified so that the respective components are brazed integrally. As a result, the vehicle exterior heat exchange unit 16 and the radiator unit 43 are integrated together.

Subsequently, an electric control unit according to the present embodiment will be described. The air conditioning control device includes a known microcomputer having a CPU, a ROM, and a RAM, and peripheral circuits thereof, conducts various calculations and processing on the basis of an air conditioning control program stored in the ROM, and controls the actuation of the various air conditioning control equipments 11, 15a, 15b, 17, 41, and 42, etc. connected to an output side.

Also, an input side of the air conditioning control device is connected with a sensor group for various air conditioning controls such as an inside air sensor for detecting an vehicle interior temperature, an outside air sensor for detecting an outside air temperature, an insolation sensor for detecting the amount of insolation within the vehicle interior, an evaporator temperature sensor for detecting a blowing air temperature (evaporator temperature) of the vehicle interior evaporator 20, a blow refrigerant temperature sensor for detecting a blow refrigerant temperature of the compressor 11, an outlet refrigerant temperature sensor 51 for detecting an outlet side refrigerant temperature Te of the vehicle exterior heat exchange unit 16, and a coolant temperature sensor 52 as a coolant temperature detecting device for detecting a coolant temperature Tw flowing into the travel electric motor MG.

In the present embodiment, the coolant temperature Tw pumped from the coolant pump 41 is detected by the coolant temperature sensor 52. Alternatively, the coolant temperature Tw sucked into the coolant pump 41 may be detected by the coolant temperature sensor 52.

Further, the input side of the air conditioning control device is connected with an operating panel not shown which is arranged in the vicinity of an instrument panel in a front portion of the vehicle interior, and receives operation signals from various air conditioning operation switches disposed in the instrument panel. As the various air conditioning operation switches disposed in the operating panel, there are provided an operation switch of the vehicle air conditioner, a vehicle interior temperature setting switch for setting the vehicle interior temperature, and a select switch for operation modes.

Also, the air conditioning control device is integrated with the control device for controlling the electric motor 11b of the compressor 11, and the on-off valve 15a, etc., and controls the operation thereof. In the present embodiment, in the air conditioning control device, a configuration (hardware and software) that controls the actuation of the compressor 11 configures a refrigerant blow capability control device, a configuration that controls the actuations of the various devices 15a and 15b configuring the refrigerant passage switching device configures a refrigerant passage control device, and a configuration that controls the actuation of the three-way valve 42 configuring the circuit switching device for the coolant configures a refrigerant medium circuit control device.

Further, the air conditioning control device according to the present embodiment has a configuration (frost formation determining device) for determining whether frost is formed in the vehicle exterior heat exchange unit 16, or not, on the basis of detection signals of the sensor group for the air conditioning control described above. Specifically, in the frost formation determining device, when a velocity of the vehicle is equal to or lower than a predetermined reference vehicle velocity (20 km/h in the present embodiment), and the outlet side refrigerant temperature Te of the vehicle exterior heat exchange unit 16 is equal to or lower than 0° C., it is determined that the frost is formed in the vehicle exterior heat exchange unit 16.

Subsequently, the actuation of the vehicle air conditioner 1 according to the present embodiment in the above configuration will be described. The vehicle air conditioner 1 according to the present embodiment can execute the heating operation for heating the vehicle interior, and the cooling operation for cooling the vehicle interior, and can also execute the defrosting operation during the heating operation. Hereinafter, the actuation in the respective operation will be described.

(a) Heating Operation

The heating operation starts when the heating operation mode is selected by the select switch in a state where the actuation switch of the operating panel is on. Then, in the heating operation, if it is determined by the frost formation determining device that the frost is formed in the vehicle exterior heat exchange unit 16, the defrosting operation is executed.

First, in the normal heating operation, the air conditioning control device closes the on-off valve 15a, and switches the three-way valve 15b to the refrigerant passage that connects the outlet side of the vehicle exterior heat exchange unit 16 and the inlet side of the accumulator 18. Further, the air conditioning control device actuates the coolant pump 41 so as to pump a predetermined given flow rate of coolant, and also switches the three-way valve 42 of the coolant circulation circuit 40 to the coolant circuit that allows the coolant to flow while bypassing the radiator unit 43.

With the above configuration, the heat pump cycle 10 is switched to the refrigerant passage in which the refrigerant flows as indicated by the solid arrows in FIG. 1, and the coolant circulation circuit 40 is switched to the coolant circuit in which the coolant flows as indicated by dashed arrows in FIG. 1.

With the above configuration of the refrigerant passage and the coolant circuit, the air conditioning control device reads the detection signals of the sensor group for the air conditioning control, and the operation signals of the operation panel described above. Then, the air conditioning control device calculates a target blowing temperature TAO which is a target temperature of the air blown into the vehicle interior on the basis of values of the detection signals and the operation signals.

Further, the air conditioning control device determines the actuation states of the various air conditioning control equipments connected to the output side of the air conditioning control device on the basis of the calculated target blowing temperature TAO and the detection signals of the sensor group.

For example, the refrigerant discharge capability of the compressor 11, that is, the control signal output to the electric motor of the compressor 11 is determined as follows. First, a target evaporator blowing temperature TEO of the vehicle interior evaporator 20 is determined with reference to a control map stored in the air conditioning control device in advance, on the basis of the target blowing temperature TAO.

Then, the control signal output to the electric motor in the compressor 11 is determined so that the blowing air temperature from the vehicle interior evaporator 20 approaches the target evaporator blowing temperature TEO with the use of a feedback control technique, on the basis of a deviation between the target evaporator blowing temperature TEO and the blowing air temperature from the vehicle interior evaporator 20 which is detected by the evaporator temperature sensor.

Also, the control signal output to a servo motor of the air mix door 34 is determined so that the temperature of air blown into the vehicle interior reaches a temperature desired by a passenger which is set by the vehicle interior temperature setting switch, with the use of the target blowing temperature TAO, the blowing air temperature from the vehicle interior evaporator 20, and the compressor 11 discharge refrigerant temperature detected by the discharge refrigerant temperature sensor, etc.

In the normal heating operation and the defrosting operation, the opening degree of the air mix door 34 may be controlled so that a total air volume of the vehicle interior blowing air blown by the blower 32 passes through the vehicle interior condenser 12.

Then, the control signal determined as described above is output to the various air conditioning control equipments. Thereafter, a control routine is repeated every given control cycle in the following order: reading the above-mentioned detection signals and operation signals; calculating the target blowing temperature TAO; determining the actuation state of the various air conditioning control equipments; and outputting the control voltage and the control signal, until an actuation stop of the vehicle air conditioner is required by the operation panel.

The repetition of this control routine is also basically conducted in other operation.

In the heat pump cycle 10 during the normal heating operation, a high pressure refrigerant discharged from the compressor 11 flows into the vehicle interior condenser 12. The refrigerant that has flowed into the vehicle interior condenser 12 is blown by the blower 32 conducts the heat exchange with the vehicle interior blowing air that has been blown by the blower 32, and passed through the vehicle interior evaporator 20, to radiate the heat. With this operation, the vehicle interior blowing air is heated.

Since the on-off valve 15a is closed, the high pressure refrigerant flowing from the vehicle interior condenser 12 flows into the heating fixed aperture 13, and is decompressed and expanded. Then, the low pressure refrigerant decompressed and expanded by the heating fixed aperture 13 flows into the vehicle exterior heat exchange unit 16. The low pressure refrigerant that has flowed into the vehicle exterior heat exchange unit 16 is heat-absorbed from the outside air blown by the air blowing fan 17, and evaporated.

In this situation, since the coolant circulation circuit 40 is switched to the coolant circuit in which the coolant flows while bypassing the radiator unit 43, there is no case in which the coolant is radiated to the refrigerant flowing in the vehicle exterior heat exchange unit 16, or the coolant absorbs heat from the refrigerant flowing in the vehicle exterior heat exchange unit 16. That is, the coolant does not thermally affect the refrigerant flowing in the vehicle exterior heat exchange unit 16.

The refrigerant flowing out of the vehicle exterior heat exchange unit 16 flows into the accumulator 18, and is separated into vapor and liquid since the three-way valve 15b is switched to the refrigerant passage that connects the outlet side of the vehicle exterior heat exchange unit 16 and the input side of the accumulator 18. Then, a gas phase refrigerant separated by the accumulator 18 is sucked into the compressor 11, and again compressed.

As described above, in the normal heating operation, the vehicle interior blowing air is heated by the heat quantity of the refrigerant discharged from the compressor 11 through the vehicle interior condenser 12 so that the vehicle interior can be heated.

(b) Defrosting Operation

Subsequently, the defrosting operation will be described. As in the heat pump cycle 10 according to the present embodiment, in the refrigeration cycle device where the heat exchange is conducted between the refrigerant and the outside air to evaporate the refrigerant by the vehicle exterior heat exchange unit 16, frost could be formed in the vehicle exterior heat exchange unit 16 if a refrigerant evaporation temperature in the vehicle exterior heat exchange unit 16 becomes equal to or lower than the frost formation temperature (specifically 0° C.).

When the frost is thus formed, since an outdoor air passages 70a of the heat exchanger 70 is blocked by frost, the heat exchange capability of the vehicle exterior heat exchange unit 16 could be remarkably degraded. Under the circumstances, in the heat pump cycle 10 according to the present embodiment, in the heating operation, the defrosting operation is executed when it is determined by the frost formation determining device that the frost is formed in the vehicle exterior heat exchange unit 16.

In the defrosting operation, the air conditioning control device stops the actuation of the compressor 11, and also stops the actuation of the air blowing fan 17. Therefore, in the defrosting operation, the refrigerant flow rate flowing in the vehicle exterior heat exchange unit 16 is reduced, and the air volume of the outside air flowing into the outdoor air passages 70a is reduced as compared with the normal heating operation.

Further, the air conditioning control device switches the three-way valve 42 of the coolant circulation circuit 40 to the refrigerant medium circuit that allows the coolant to flow into the radiator unit 43 as indicated by dashed arrows in FIG. 2. As a result, the refrigerant is not circulated in the heat pump cycle 10, and the coolant circulation circuit 40 is switched to the refrigerant medium circuit in which the refrigerant flows as indicated by dashed arrows in FIG. 2.

Therefore, the heat quantity of the coolant flowing in the coolant tubes 43a of the radiator unit 43 is transferred to the vehicle exterior heat exchange unit 16 through the outer fins 50, to defrost the vehicle exterior heat exchange unit 16. That is, defrost is realized with effectively using waste heat of the travel electric motor MG.

(c) Cooling Operation

The cooling operation starts when a cooling operation mode is selected by the select switch in a state where the actuation switch of the operation panel is on. In the cooling operation, the air conditioning control device opens the on-off valve 15a, and switches the three-way valve 15b to the refrigerant passage that connects the outlet side of the vehicle exterior heat exchange unit 16 and the inlet side of the cooling fixed aperture 19. As a result, the heat pump cycle 10 is switched to the refrigerant passage in which the refrigerant flows as indicated by the solid arrows in FIG. 3.

In this situation, the three-way valve 42 of the coolant circulation circuit 40 is switched to the coolant circuit that allows the coolant to flow into the radiator unit 43 when the coolant temperature Tw becomes equal to or higher than the reference temperature, and switched to the coolant circuit in which the coolant flows while bypassing the radiator unit 43 when the coolant temperature Tw becomes lower than the predetermined reference temperature. In FIG. 3, a flow of the coolant when the coolant temperature Tw becomes equal to or higher than the reference temperature is indicated by the dashed arrows.

In the heat pump cycle 10 during the cooling operation, the high pressure refrigerant discharged from the compressor 11 flows into the vehicle interior condenser 12, and conducts the heat exchange with the vehicle interior blowing air that has been blown by the blower 32 and passed through the vehicle interior evaporator 20 to radiate the heat. Since the on-off valve 15a is opened, the high pressure refrigerant flowing out of the vehicle interior condenser 12 flows into the vehicle exterior heat exchange unit 16 through the fixed aperture bypass passage 14. The high pressure refrigerant that has flowed into the vehicle exterior heat exchange unit 16 further radiates the heat to the outside air blown by the air blowing fan 17.

Since the three-way valve 15b is switched to the refrigerant passage that connects the outlet side of the vehicle exterior heat exchange unit 16 and the inlet side of the cooling fixed aperture 19, the refrigerant flowing out of the vehicle exterior heat exchange unit 16 is decompressed and expanded by the cooling fixed aperture 19. The refrigerant flowing out of the cooling fixed aperture 19 flows into the vehicle interior evaporator 20, absorbs heat from the vehicle interior blowing air blown by the blower 32, and is evaporated. As a result, the vehicle interior blowing air is cooled.

The refrigerant flowing from the vehicle interior evaporator 20 flows into the accumulator 18, and is separated into gas and liquid. Then, a gas phase refrigerant separated by the accumulator 18 is sucked into the compressor 11, and again compressed. As described above, in the cooling operation, the low pressure refrigerant absorbs the heat from the vehicle interior blowing air, and is evaporated by the vehicle interior evaporator 20 so that the vehicle interior blowing air can be cooled to cool the vehicle interior.

In the vehicle air conditioner 1 according to the present embodiment, as described above, various operation can be executed by switching between the refrigerant passage of the heat pump cycle 10 and the coolant circuit of the coolant circulation circuit 40. Further, in the present embodiment, since the above-mentioned characteristic heat exchanger 70 is applied, an appropriate heat exchange can be conducted among three types of fluids including the refrigerant, the coolant, and the outside air in the respective operation.

In more detail, in the heat exchanger 70 according to the present embodiment, the upstream number ratio which is the ratio of the number of refrigerant tubes 16a in the upstream heat exchange portion 71 to the total number of tubes configuring the upstream heat exchange portion 71 is smaller than the downstream number ratio which is the ratio of number of refrigerant tubes 16a in the downstream heat exchange portion 72 to the total number of tubes configuring the downstream heat exchange portion 72.

Specifically, the upstream heat exchange portion 71 is configured by alternately arranging the refrigerant tubes 16a and the coolant tubes 43a. In the defrosting operation, the coolant higher in temperature than the refrigerant flows within the coolant tubes 43a and the coolant space 76 to conduct defrosting. Therefore, the coolant that functions as a heat source for conducting defrosting is allowed to more intensively flow upstream of the heat exchanger 70 in the flow direction X of the outside air which is likely to be frosted than downstream thereof. As a result, for example, as compared with a configuration in which the coolant is allowed to flow evenly upstream and downstream of the heat exchanger 70, the frost formation can be further suppressed, and the heat exchange high in the efficiency can be realized.

Further, in the defrosting operation, since the heat quantity of the coolant can be transferred to the refrigerant tubes 16a through the outer fins 50, a waste heat of the travel electric motor MG can be effectively used for the purpose of defrosting the refrigerant tubes 16a.

On the other hand, the downstream heat exchange portion 72 is configured by only the refrigerant tubes 16a. For that reason, in the downstream heat exchange portion 72, the heat exchange quantity between the refrigerant and the outside air can be sufficiently ensured. Therefore, the heat exchange quantity between the refrigerant and the outside air as the overall heat exchanger 70 can be appropriately ensured.

In this case, since the refrigerant tubes 16a are likely to be frosted in the upstream heat exchange portion 71, only the upstream heat exchange portion 71 among the upstream heat exchange portion 71 and the downstream heat exchange portion 72 is configured by alternately arranging the refrigerant tubes 16a and the coolant tubes 43a. As a result, the heat exchange quantity between the refrigerant and the outside air can be appropriately ensured as the overall heat exchanger 70, while the refrigerant tubes 16a can be efficiently defrosted.

Further, in the heat exchanger 70 according to the present embodiment, the outer fins 50 are arranged in the outside air passages 70a formed between the refrigerant tubes 16a of the vehicle exterior heat exchange unit 16 and the coolant tubes 43a of the radiator unit 43. Heat transfer between the refrigerant tubes 16a and the coolant tubes 43a can be conducted by the outer fins 50.

With the above configuration, in the defrosting operation, since the heat quantity of the coolant can be surely transferred by the refrigerant tubes 16a through the outer fins 50, the waste heat of the travel electric motor MG can be more effectively used for the purpose of defrosting the refrigerant tubes 16a.

Further, in the heat exchanger 70 according to the present embodiment, since the flow channel resistance of the upstream refrigerant communication passage 752a is smaller than the flow channel resistance of the downstream refrigerant communication passage 752b in the header tank 75, the distributivity of the refrigerant to the refrigerant tubes 16a of the upstream heat exchange portion 71 and the refrigerant tubes 16a of the downstream heat exchange portion 72 can be appropriately regulated.

That is, when the refrigerant is evaporated in the vehicle exterior heat exchange unit 16, for example, in the heating operation, if attention is paid to the respective refrigerant tubes 16a, the temperature difference between the refrigerant and air in the upstream heat exchange portion 71 becomes larger than that in the downstream heat exchange portion 72, to facilitate the vaporization of the refrigerant. As a result, the pressure loss becomes larger. For that reason, the refrigerant is less likely to flow into the refrigerant tubes 16a of the upstream heat exchange portion 71 than the refrigerant tubes 16a of the downstream heat exchange portion 72.

In view of the above, in the present embodiment, the flow channel resistance of the upstream refrigerant communication passage 752a is set to be smaller than the flow channel resistance of the downstream refrigerant communication passage 752b so that the flow channel resistance between the first tubes 16a of the upstream heat exchange portion 71 and the refrigerant space 77 is made smaller than the flow channel resistance between the first tubes 16a of the downstream heat exchange portion 72 and the refrigerant space 77. As a result, the refrigerant is likely to flow into the refrigerant tubes 16a of the upstream heat exchange portion 71 larger in the pressure loss, and the distributivity of the refrigerant can be further appropriately regulated.

Further, in the heat exchanger 70 according to the present embodiment, in the header tank 75, the flow channel resistance between the refrigerant tube group 16b and one refrigerant space 77 is smaller than the flow channel resistance between the downstream refrigerant tube group 16c and one refrigerant space 77 thereof. That is, the flow channel resistance of the multiple overall upstream refrigerant communication passages 752a that connects the upstream refrigerant tube group 16b to one refrigerant space 77 thereof is smaller than the flow channel resistance of the multiple overall downstream refrigerant communication passages 752b and 752d that connects the downstream refrigerant tube group 16c to one refrigerant space 77 thereof. Therefore, the distributivity of the refrigerant to the refrigerant tubes 16a of the upstream heat exchange portion 71 and the refrigerant tubes 16a of the downstream heat exchange portion 72 can be further appropriately regulated. For example, the refrigerant communication passage 752d becomes smaller in the flow channel cross-sectional area with the narrowed width in the tube stacking direction (depth direction of a page of FIG. 9), and the flow channel resistance of the downstream refrigerant communication passage 752d is larger than that of the upstream refrigerant communication passage 752a.

That is, in the refrigerant flow channel between the refrigerant space 77 and the refrigerant tubes 16a, since the refrigerant can be more likely to flow into the upstream refrigerant tube group 16b than the downstream refrigerant tube group 16c, the distribution of the refrigerant can be prevented from being uneven, and the heat exchange quantity among three types of fluids can be further appropriately regulated.

Also, the refrigerant which is the first fluid and the coolant which is the second fluid are heat media circulated in fluid circulation circuits different from each other, and the heat exchanger 70 is shared by the multiple fluid circulation circuits 10 and 40. Therefore, an installation space of the heat exchanger 70 can be easily reduced as compared with a case in which the heat exchanger is disposed for each of the fluid circulation circuits, individually.

Also, the upstream refrigerant tube group 16b corresponds to the above-mentioned higher pressure loss refrigerant tube group, and the downstream refrigerant tube group 16c corresponds to the above-mentioned lower pressure loss refrigerant tube group. The number (stacking number) of the refrigerant tubes 16a included in the upstream refrigerant tube group 16b is smaller than that of the downstream refrigerant tube group 16c. Therefore, since the temperature difference between the outside air and the refrigerant in the upstream heat exchange portion 71 is likely to be larger than that in the downstream heat exchange portion 72, the heat exchange quantity in the upstream heat exchange portion 71 and the heat exchange quantity in the downstream heat exchange portion 72 are appropriately regulated.

Second Embodiment

In the above first embodiment, the upstream refrigerant communication passage 752a is linearly formed as compared with the downstream refrigerant communication passage 752b with the result that the flow channel resistance of the upstream refrigerant communication passage 752a is made smaller than the flow channel resistance of the downstream refrigerant communication passage 752b. On the other hand, in a second embodiment, as illustrated in FIG. 10, a flow channel area of the upstream refrigerant communication passage 752a is set to be larger than a flow channel area of the downstream refrigerant communication passage 752b whereby the flow channel resistance of the upstream refrigerant communication passage 752a is made smaller than the flow channel resistance of the downstream refrigerant communication passage 752b.

Further, in the second embodiment, the flow channel area of the multiple overall upstream refrigerant communication passages 752a is set to be larger than the flow channel area of the multiple overall downstream refrigerant communication passages 752b and 752d with the result that the flow channel resistance of the multiple overall upstream refrigerant communication passages 752a is made smaller than the flow channel resistance of the overall downstream refrigerant communication passages 752b and 752d.

Figure 10:
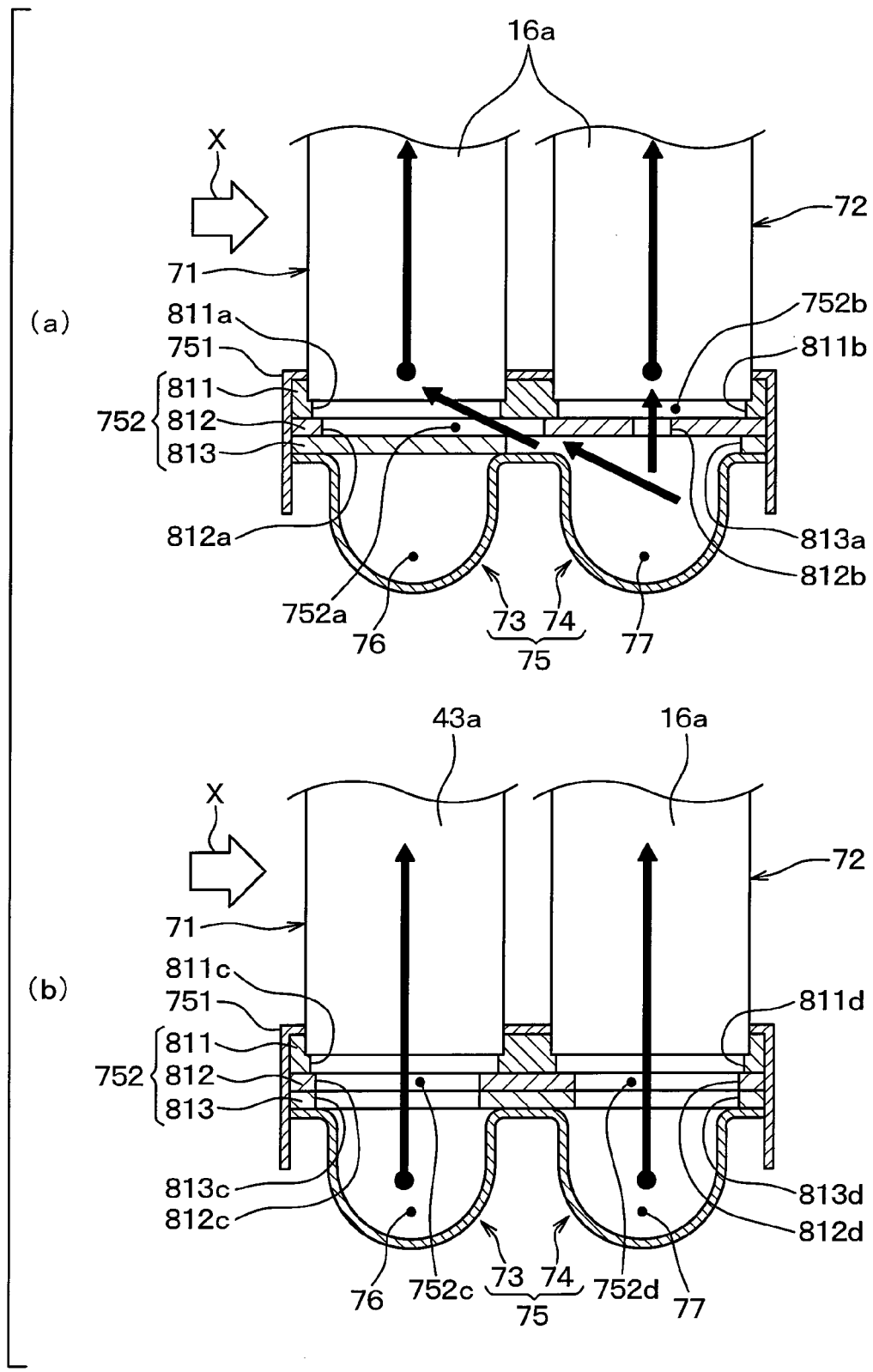
FIG. 10(a) is a cross-sectional view of a portion in which refrigerant tubes overlap with each other in an air flow direction in a header tank of a heat exchanger according to a second embodiment of the present disclosure.
FIG. 10(b) is a cross-sectional view of a portion in which the refrigerant tubes overlap with coolant tubes in the air flow direction in the header tank of the heat exchanger according to the second embodiment.

FIG. 10(a) is a diagram corresponding to FIG. 9(a), and FIG. 10(b) is a diagram corresponding to FIG. 9(b). In FIG. 10, the same or equivalent parts as those in the first embodiment are denoted by identical symbols. The same is applied to the following drawings.

As illustrated in FIG. 10, the intermediate plate member 752 is configured by stacking three plate members of a first plate member 811, a second plate member 812, and a third plate member 813 on each other from a side (upper side of FIG. 10) closer to the refrigerant tubes 16a and the coolant tubes 43a toward a side (lower side of FIG. 10) closer to the coolant space 76 and the refrigerant space 77.

In FIG. 10(a), the first plate member 811 is formed with two through-holes 811a and 811b, the second plate member 812 is formed with two through-holes 812a and 812b, and the third plate member 813 is formed with one through-hole 813a.

One through-hole 811a of the two through-holes 811a and 811b in the first plate member 811 is communicated with the refrigerant tubes 16a of the upstream heat exchange portion 71, and the other through-hole 811b is communicated with the refrigerant tubes 16a of the downstream heat exchange portion 72.

One through-hole 812a of the two through-holes 812a and 812b in the second plate member 812 is communicated with one through-hole 811a of the first plate member 811, and the other through-hole 812b is communicated with the other through-hole 811b of the first plate member 811.

A hole area of one through-hole 812a in the second plate member 812 is larger than a hole area of the other through-hole 812b in the second plate member 812.

The through-hole 813a of the third plate member 813 is communicated with both of the two through-holes 812a and 812b of the second plate member 812, and also communicated with the refrigerant space 77.

Therefore, the upstream refrigerant communication passage 752a is configured by one through-hole 811a of the first plate member 811, one through-hole 812a of the second plate member 812, and the through-hole 813a of the third plate member 813. The downstream refrigerant communication passage 752b is configured by the other through-hole 811b of the first plate member 811, the other through-hole 812b of the second plate member 812, and the through-hole 813a of the third plate member 813.

A hole area of one through-hole 812a in the second plate member 812 is larger than a hole area of the other through-hole 812b in the second plate member 812. Therefore, the flow channel resistance of the upstream refrigerant communication passage 752a is smaller than the flow channel resistance of the downstream refrigerant communication passage 752b.

In FIG. 10(b), as in FIG. 9(b) of the above first embodiment, the first plate member 811 is formed with two through-holes 811c and 811d, the second plate member 812 is formed with two through-holes 812c and 812d, and the third plate member 813 is formed with two through-holes 813c and 813d.

One through-hole 811c of the two through-holes 811c and 811d in the first plate member 811 is communicated with the coolant tubes 43a of the upstream heat exchange portion 71, and the other through-hole 811d is communicated with the refrigerant tubes 16a of the downstream heat exchange portion 72.

One through-hole 812c of the two through-holes 812c and 812d in the second plate member 812 is communicated with one through-hole 811c of the first plate member 811, and the other through-hole 812d is communicated with the other through-hole 811d of the first plate member 811.

One through-hole 813c of the through-holes 813c and 813d in the third plate member 813 is communicated with one through-hole 812c of the second plate member 812, and the coolant space 76. The other through-hole 813d is communicated with the other through-hole 812d of the second plate member 812, and the refrigerant space 77.

Therefore, the upstream coolant communication passage 752c is configured by the through-holes 811c, 812c, and 813c of the first to third plate members 811 to 813, and the downstream refrigerant communication passage 752d is configured by the through-holes 811d, 812d, and 813d of the first to third plate members 811 to 813.

An opening area of the upstream refrigerant communication passage 752a is set to be larger than an opening area of the downstream refrigerant communication passage 752b whereby the flow channel resistance of the upstream refrigerant communication passage 752a may be made smaller than the flow channel resistance of the downstream refrigerant communication passage 752b.

Also, a resistor supplying a resistance to the refrigerant flowing in the downstream refrigerant communication passage 752b is arranged in the downstream refrigerant communication passage 752b whereby the flow channel resistance of the upstream refrigerant communication passage 752a may be made smaller than the flow channel resistance of the downstream refrigerant communication passage 752b.

Third Embodiment

In the above first and second embodiments, the flow channel resistance of the upstream refrigerant communication passage 752a is set to be smaller than the flow channel resistance of the downstream refrigerant communication passage 752b whereby the flow channel resistance between the first tubes 16a of the upstream heat exchange portion 71 and the refrigerant space 77 is made smaller than the flow channel resistance between the first tubes 16a of the downstream heat exchange portion 72 and the refrigerant space 77. On the other hand, in a third embodiment, as illustrated in FIG. 11, the arrangement of the coolant space 76 and the refrigerant space 77 in the first and second embodiments is reversed whereby the flow channel resistance between the first tubes 16a of the upstream heat exchange portion 71 and the refrigerant space 77 is made smaller than the flow channel resistance between the first tubes 16a of the downstream heat exchange portion 72, and the refrigerant space 77.

Figure 11:
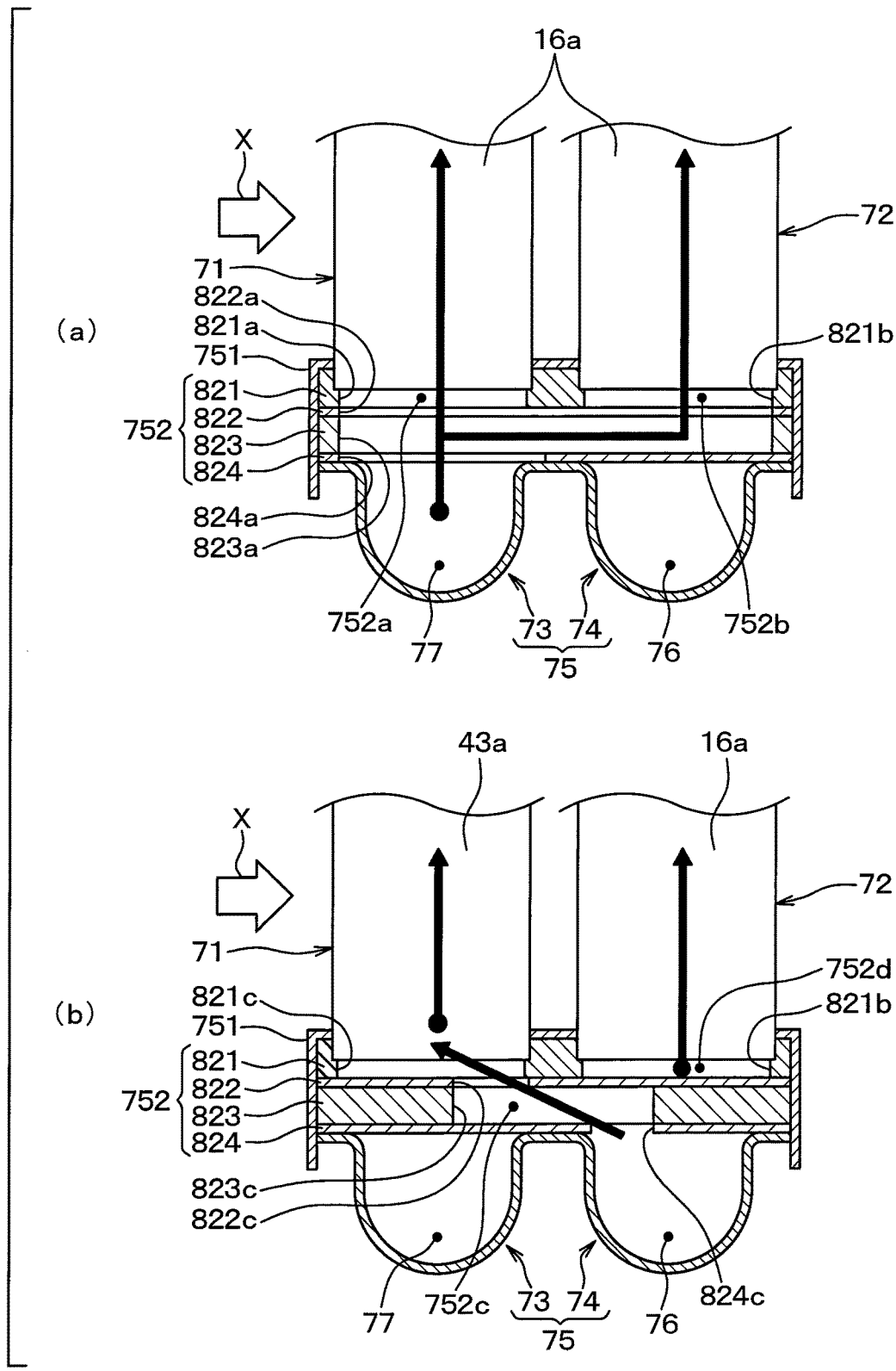
FIG. 11(a) is a cross-sectional view of a portion in which the refrigerant tubes overlap with each other in an air flow direction in a header tank of a heat exchanger according to a third embodiment of the present disclosure.
FIG. 11(b) is a cross-sectional view of a portion in which the refrigerant tubes overlap with the coolant tubes in the air flow direction in the header tank of the heat exchanger according to the third embodiment.

Further, in the third embodiment, as illustrated in FIG. 11, the arrangement of the coolant space 76 and the refrigerant space 77 in the first and second embodiments is reversed whereby the flow channel resistance between the upstream refrigerant tube group 16b and the refrigerant space 77 is made smaller than the flow channel resistance between the downstream refrigerant tube group 16c and the refrigerant space 77.

That is, in the present embodiment, the refrigerant space 77 is arranged upstream (left side in FIG. 11) of the coolant space 76 in the flow direction X of the outside air. In other words, the refrigerant space 77 is arranged at a side closer to the refrigerant tubes 16a of the upstream heat exchange portion 71 than the coolant space 76 in the flow direction X of the outside air. The coolant space 76 is arranged at a side closer to the refrigerant tubes 16a of the downstream heat exchange portion 72 than the refrigerant space 77 in the flow direction X of the outside air.

A specific configuration example of the communication passages 752a to 752d according to the present embodiment will be described. FIG. 11(a) illustrates a cross-section of a portion in which the refrigerant tubes 16a of the upstream heat exchange portion 71 overlap with the refrigerant tubes 16a of the downstream heat exchange portion 72 in the flow direction X of the outside air.

FIG. 11(b) illustrates a cross-section of a portion in which the coolant tubes 43a of the upstream heat exchange portion 71 overlap with the refrigerant tubes 16a of the downstream heat exchange portion 72 in the flow direction X of the outside air.

As illustrated in FIG. 11, the intermediate plate member 752 is configured by stacking four plate members of a first plate member 821, a second plate member 822, a third plate member 823, and a fourth plate member 824 on each other from a side (upper side of FIG. 11) closer to the refrigerant tubes 16a and the coolant tubes 43a toward a side (lower side of FIG. 11) closer to the coolant space 76 and the refrigerant space 77.

In FIG. 11(a), the first plate member 821 is formed with two through-holes 821a and 821b, the second plate member 822 is formed with one through-hole 822a, the third plate member 823 is formed with one through-hole 823a, and the fourth plate member 824 is formed with one through-hole 824a.

One through-hole 821a of the two through-holes 821a and 821b in the first plate member 821 is communicated with the refrigerant tubes 16a of the upstream heat exchange portion 71, and the other through-hole 821b is communicated with the refrigerant tubes 16a of the downstream heat exchange portion 72.

The through-hole 822a of the second plate member 822 is communicated with both of the two through-holes 821a and 821b of the first plate member 821.

The through-hole 823a of the third plate member 823 is communicated with the through-hole 822a of the second plate member 822.

The through-hole 824a of the fourth plate member 824 is communicated with the through-hole 823a of the third plate member 823, and also communicated with the refrigerant space 77.

Therefore, the upstream refrigerant communication passage 752a is configured by one through-hole 821a of the first plate member 821, and the through-holes 822a, 823a, and 824a of the second to fourth plate members 822 to 824. The downstream refrigerant communication passage 752b is configured by the other through-hole 821b of the first plate member 821, and the through-holes 822a, 823a, and 824a of the second to fourth plate members 822 to 824.

In FIG. 11(b), the first plate member 821 is formed with two through-holes 821c and 821b, the second plate member 822 is formed with one through-hole 822c, the third plate member 823 is formed with one through-hole 823c, and the fourth plate member 824 is formed with one through-hole 824c.

Figure 12:
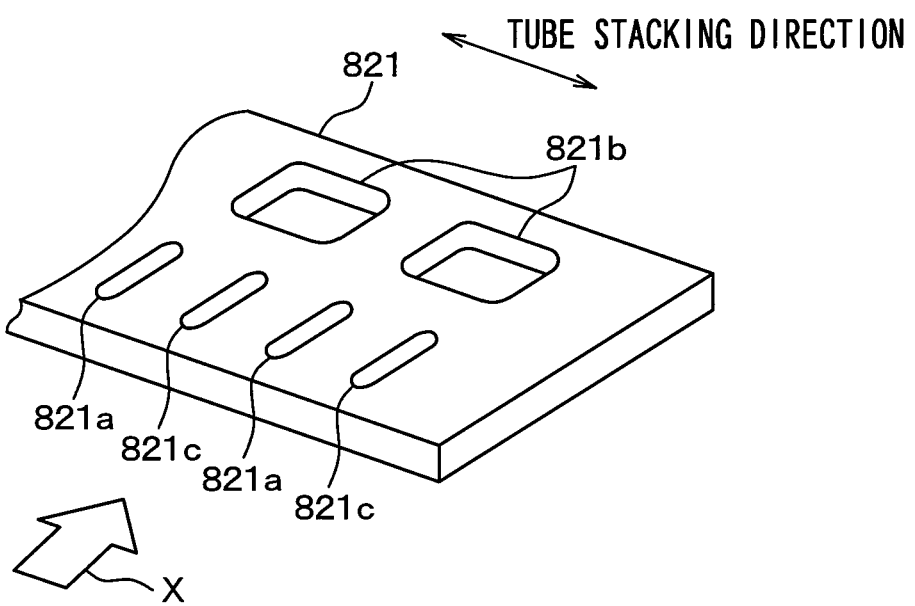
FIG. 12 is a perspective view of a first plate member in the heat exchanger according to the third embodiment.

One through-hole 821c of the two through-holes 821c and 821b in the first plate member 821 is communicated with the coolant tubes 43a of the upstream heat exchange portion 71, and the other through-hole 821b is communicated with the refrigerant tubes 16a of the downstream heat exchange portion 72. The other through-hole 821b is identical with the through-hole 821b described above in FIG. 11(a), and formed to extend in the tube stacking direction as illustrated in FIG. 12.

The through-hole 822c of the second plate member 822 is communicated with one through-hole 821c of the first plate member 821.

The through-hole 823c of the third plate member 823 is communicated with the through-hole 822c of the second plate member 822.

The through-hole 824c of the fourth plate member 824 is communicated with the through-hole 823c of the third plate member 823, and also communicated with the coolant space 76.

Therefore, the upstream coolant communication passage 752c is configured by the through-holes 821c, 822c, 823c, and 824c of the first to fourth plate members 821 to 824. The downstream refrigerant communication passage 752d is configured by the through-hole 821b of the first plate member 821, and the through-holes 822a, 823a, and 824a of the second to fourth plate members 822 to 824 shown in FIG. 11(a).

Fourth Embodiment

In the above third embodiment, the intermediate plate member 752 is configured by stacking the four plate members 821 to 824. On the other hand, in a fourth embodiment, as illustrated in FIG. 13, the intermediate plate member 752 is configured by two plate members 831 and 832.

FIG. 13(a) is a diagram corresponding to FIG. 11(a), and FIG. 13(b) is a diagram corresponding to FIG. 11(b).

Figure 13:
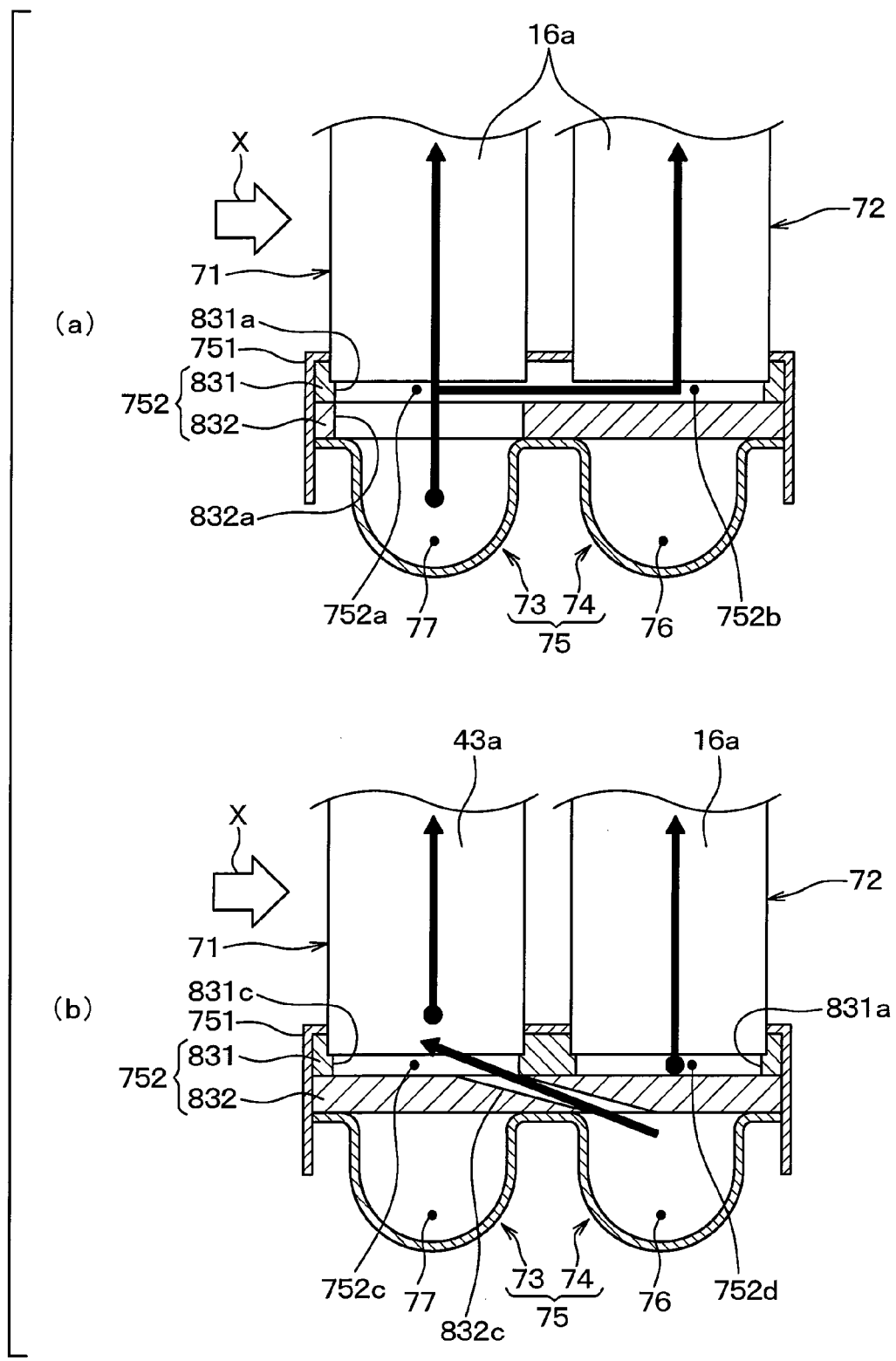
FIG. 13(a) is a cross-sectional view of a portion in which the refrigerant tubes overlap with each other in an air flow direction in a header tank of a heat exchanger according to a fourth embodiment of the present disclosure.
FIG. 13(b) is a cross-sectional view of a portion in which the refrigerant tubes overlap with the coolant tubes in the air flow direction in the header tank of the heat exchanger according to the fourth embodiment.

As illustrated in FIG. 13, the intermediate plate member 752 is configured by the first plate member 831 at a side (upper side of FIG. 13) closer to the refrigerant tubes 16a and the coolant tubes 43a, and the second plate member 832 on a side (lower side of FIG. 13) closer to the coolant space 76 and the refrigerant space 77.

In FIG. 13(a), the first plate member 831 is formed with one through-hole 831a, and the second plate member 832 is formed with one through-hole 832a.

The through-hole 831a of the first plate member 831 is communicated with both the refrigerant tubes 16a of the upstream heat exchange portion 71 and the refrigerant tubes 16a of the downstream heat exchange portion 72.

The through-hole 832a of the second plate member 832 is communicated with the through-hole 831a of the first plate member 831, and also communicated with the refrigerant space 77.

Therefore, the upstream refrigerant communication passage 752a and the downstream refrigerant communication passage 752b are configured by the through-hole 831a of the first plate member 831, and the through-hole 832a of the second plate member 832.

In FIG. 13(b), the first plate member 831 is formed with two through-holes 831c and 831a, and the second plate member 832 is formed with one through-hole 832c.

Figure 14:
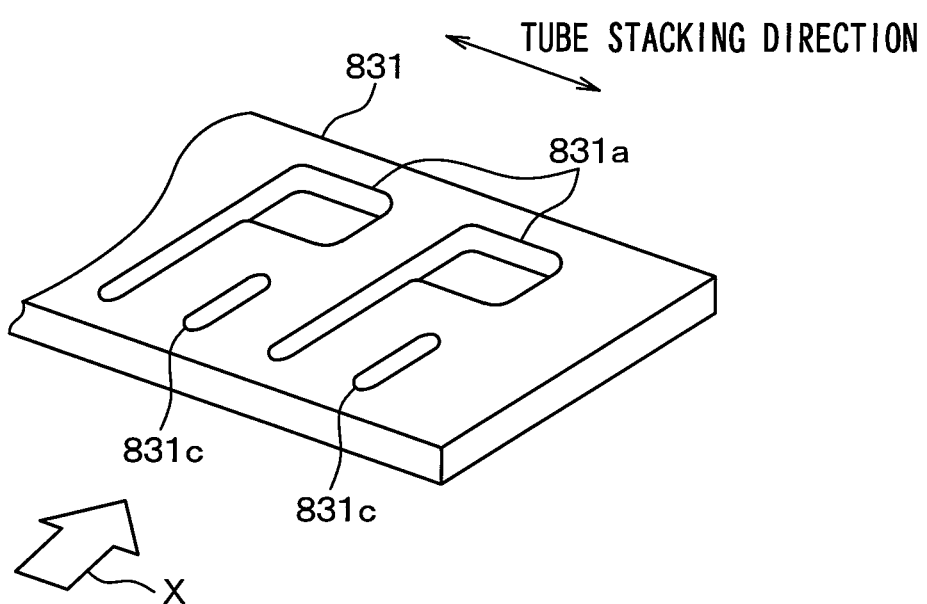
FIG. 14 is a perspective view of a first plate member in the heat exchanger according to the fourth embodiment.

One through-hole 831c of the two through-holes 831c and 831a in the first plate member 831 is communicated with the coolant tubes 43a of the upstream heat exchange portion 71, and the other through-hole 831a is communicated with the refrigerant tubes 16a of the downstream heat exchange portion 72. The other through-hole 831a is identical with the through-hole 831a described above in FIG. 13(a), and a portion of the through-hole 813a on the downstream side in the flow direction X of the outside air is formed to extend in the tube stacking direction as illustrated in FIG. 14.

The through-hole 832c of the second plate member 832 is formed to extend obliquely to the thickness direction of the second plate member 832 so that one through-hole 831c of the first plate member 821 is communicated with the coolant space 76.

Therefore, the upstream coolant communication passage 752c is configured by the through-holes 831c and 832c of the first and second plate members 831 and 832, and the downstream refrigerant communication passage 752d is configured by the through-hole 831a of the first plate member 831, and the through-hole 832a of the second plate member 832 illustrated in FIG. 13(a).

Fifth Embodiment

In the fourth embodiment, the intermediate plate member 752 is configured by stacking two plate members 831 and 832. On the other hand, in a fifth embodiment, as illustrated in FIG. 15, the intermediate plate member 752 is configured by stacking three plate members 841, 842, and 843.

FIG. 15(a) is a diagram corresponding to FIG. 13(a), and FIG. 15(b) is a diagram corresponding to FIG. 13(b).

Figure 15:
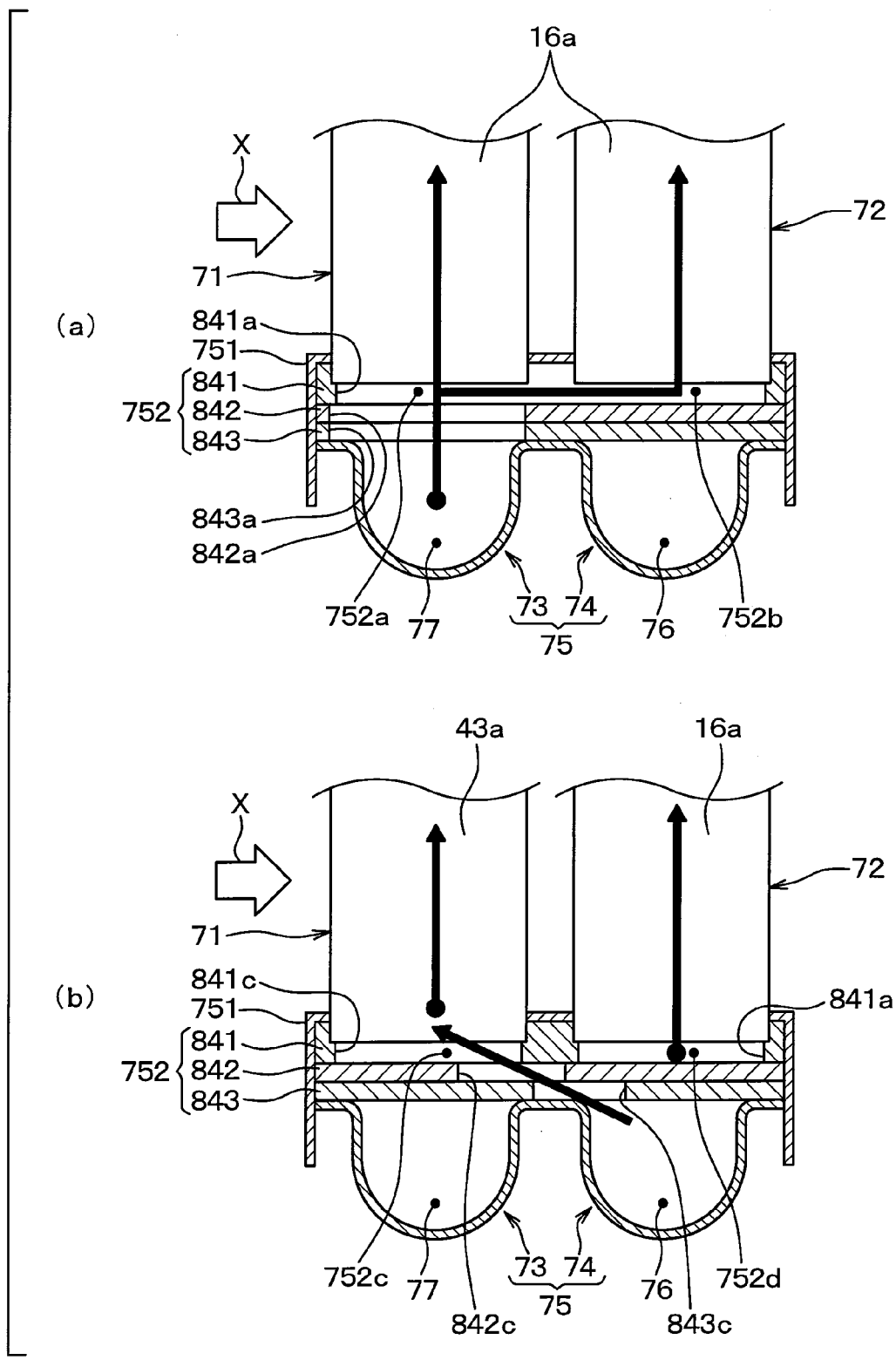
FIG. 15(a) is a cross-sectional view of a portion in which the refrigerant tubes overlap with each other in an air flow direction in a header tank of a heat exchanger according to a fifth embodiment of the present disclosure.
FIG. 15(b) is a cross-sectional view of a portion in which the refrigerant tubes overlap with the coolant tubes in the air flow direction in the header tank of the heat exchanger according to the fifth embodiment.

As illustrated in FIG. 15, the intermediate plate member 752 is configured by stacking three plate members of the first plate member 841, the second plate member 842, and the third plate member 843 on each other from a side (upper side of FIG. 15) closer to the refrigerant tubes 16a and the coolant tubes 43a toward a side (lower side of FIG. 15) closer to the coolant space 76 and the refrigerant space 77.

In FIG. 15(a), the first plate member 841 is formed with one through-hole 841a, the second plate member 842 is formed with one through-hole 842a, and the third plate member 843 is formed with one through-hole 843a.

The through-hole 841a of the first plate member 841 is communicated with both the refrigerant tubes 16a of the upstream heat exchange portion 71 and the refrigerant tubes 16a of the downstream heat exchange portion 72.

The through-hole 842a of the second plate member 842 is communicated with the through-hole 841a of the first plate member 841.

The through-hole 843a of the third plate member 843 is communicated with the through-hole 842a of the second plate member 842, and also communicated with the refrigerant space 77.

Therefore, the upstream refrigerant communication passage 752a and the downstream refrigerant communication passage 752b are configured by the through-hole 841a of the first plate member 841, the through-hole 842a of the second plate member 842, and the through-hole 843a of the third plate member 843.

In FIG. 15(b), the first plate member 841 is formed with two through-holes 841c and 841a, the second plate member 842 is formed with one through-hole 842c, and the third plate member 843 is formed with one through-hole 843c.

One through-hole 841c of the two through-holes 841c and 841a of the first plate member 841 is communicated with the coolant tubes 43a of the upstream heat exchange portion 71, and the other through-hole 841a is communicated with the refrigerant tubes 16a of the downstream heat exchange portion 72. The other through-hole 841a is identical with the through-hole 841a described above in FIG. 15(a), and as with the above-mentioned through-hole 831a illustrated in FIG. 14, a portion of the through-hole 841a on the downstream side in the flow direction X of the outside air is formed to extend in the tube stacking direction.

The through-hole 842c of the second plate member 842 is communicated with one through-hole 841c of the first plate member 841.

The through-hole 843c of the third plate member 843 is communicated with one through-hole 842c of the second plate member 842, and also communicated with the coolant space 76.

Therefore, the upstream coolant communication passage 752c is configured by the through-holes 841c, 842c, and 843c of the first to third plate members 841 to 843, and the downstream refrigerant communication passage 752d is configured by the through-hole 841a of the first plate member 841, and the through-holes 842a and 843a of the second and third plate members 842 and 843 illustrated in FIG. 15(a).

Sixth Embodiment

Figure 16:
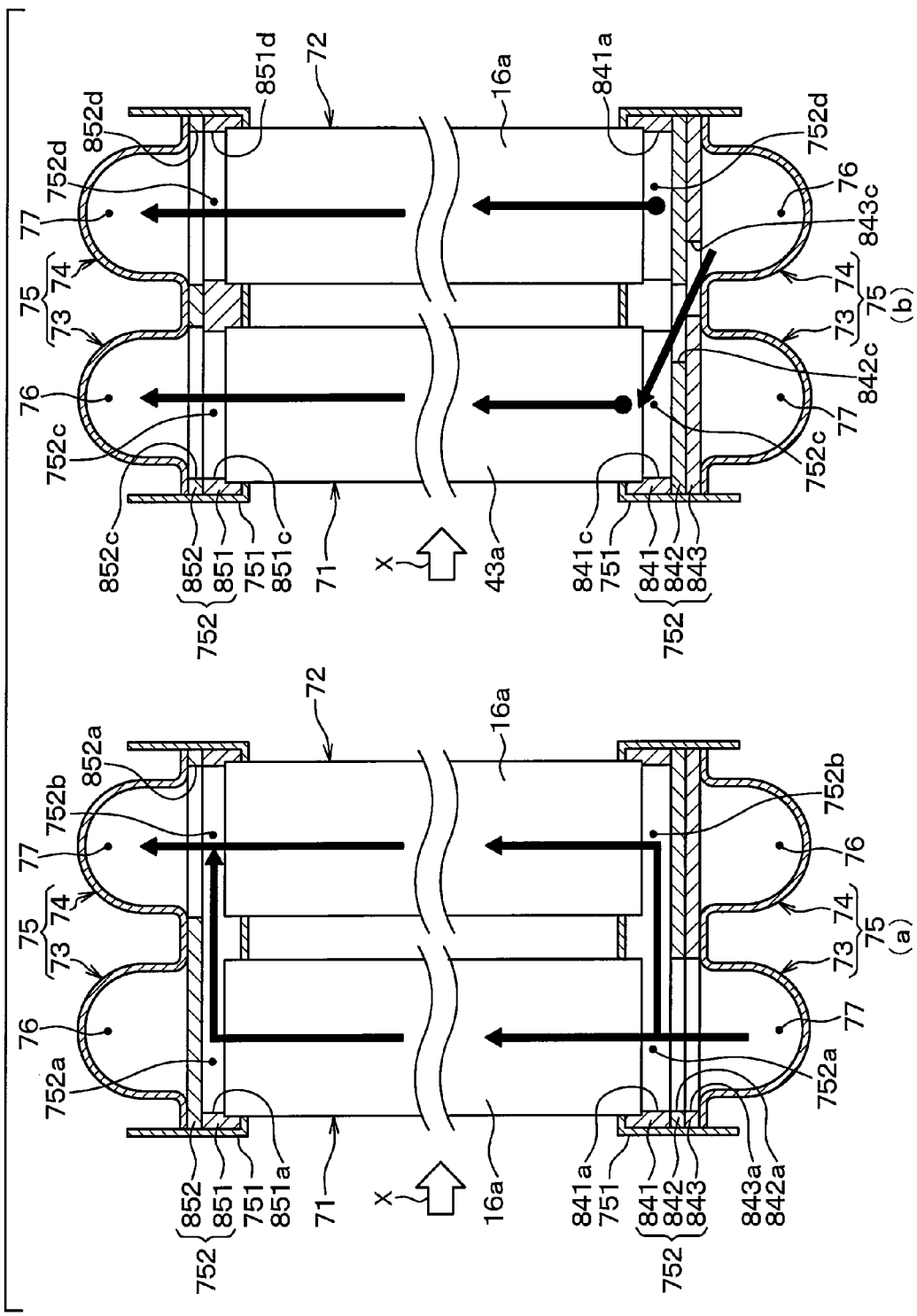
FIG. 16(a) is a cross-sectional view of a portion in which the refrigerant tubes overlap with each other in an air flow direction in a header tank of a heat exchanger according to a sixth embodiment of the present disclosure.
FIG. 16(b) is a cross-sectional view of a portion in which the refrigerant tubes overlap with the coolant tubes in the air flow direction in the header tank of the heat exchanger according to the sixth embodiment.

In a sixth embodiment, as illustrated in FIG. 16, the refrigerant space 77 is arranged upstream of the coolant space 76 in the flow direction X of the outside air on one end side (lower side in FIG. 16) of the refrigerant tubes 16a and the coolant tubes 43a in the longitudinal direction thereof. The refrigerant space 77 is arranged downstream of the coolant space 76 in the flow direction X of the outside air on the other end side (upper side in FIG. 16) of the refrigerant tubes 16a and the coolant tubes 43a in the longitudinal direction thereof. In other words, two refrigerant spaces 77 are diagonally arranged.

In FIG. 16(a), the refrigerant tubes 16a of the upstream heat exchange portion 71 and the refrigerant tubes 16a of the downstream heat exchange portion 72 overlap with each other in the flow direction X of the outside air.

In FIG. 16(b), the coolant tubes 43a of the upstream heat exchange portion 71 and the refrigerant tubes 16a of the downstream heat exchange portion 72 overlap with each other in the flow direction X of the outside air.

A configuration of the header tank 75 on one end side (lower side in FIG. 16) of the refrigerant tubes 16a and the coolant tubes 43a in the longitudinal direction thereof is identical with that in the fifth embodiment, and therefore its description will be omitted.

Hereinafter, a configuration of the header tank 75 on the other end side (lower side in FIG. 16) of the refrigerant tubes 16a and the coolant tubes 43a in the longitudinal direction thereof will be described.

As illustrated in FIG. 16, the intermediate plate member 752 is configured by stacking two plate members of a first plate member 851 and a second plate member 852 on each other from a side (lower side of FIG. 16) closer to the refrigerant tubes 16a and the coolant tubes 43a toward a side (upper side of FIG. 16) closer to the coolant space 76 and the refrigerant space 77.

In FIG. 16(a), the first plate member 851 is formed with one through-hole 851a, and the second plate member 852 is formed with one through-hole 852a.

The through-hole 851a of the first plate member 851 is communicated with both the refrigerant tubes 16a of the upstream heat exchange portion 71 and the refrigerant tubes 16a of the downstream heat exchange portion 72.

The through-hole 852a of the second plate member 852 is communicated with the through-hole 851a of the first plate member 851, and also communicated with the refrigerant space 77.

Therefore, the upstream refrigerant communication passage 752a and the downstream refrigerant communication passage 752b are configured by the through-hole 851a of the first plate member 851, and the through-hole 852a of the second plate member 852.

In FIG. 16(b), the first plate member 851 is formed with two through-holes 851c and 851d, and the second plate member 852 is formed with two through-holes 852c and 852d.

One through-hole 851c of the two through-holes 851c and 851d of the first plate member 851 is communicated with the coolant tubes 43a of the upstream heat exchange portion 71, and the other through-hole 851d is communicated with the refrigerant tubes 16a of the downstream heat exchange portion 72.

One through-hole 852c of the two through-holes 852c and 852d of the second plate member 852 is communicated with one through-hole 851c of the first plate member 851, and also communicated with the coolant space 76. The other through-hole 852d is communicated with the other through-hole 851d of the first plate member 851, and also communicated with the refrigerant space 77.

Therefore, the upstream coolant communication passage 752c is configured by one through-holes 851c and 852c of the first and second plate members 851 and 852, and the downstream refrigerant communication passage 752d is configured by the other through-holes 851d and 852d of the first and second plate members 851 and 852.

Seventh Embodiment

Figure 17:
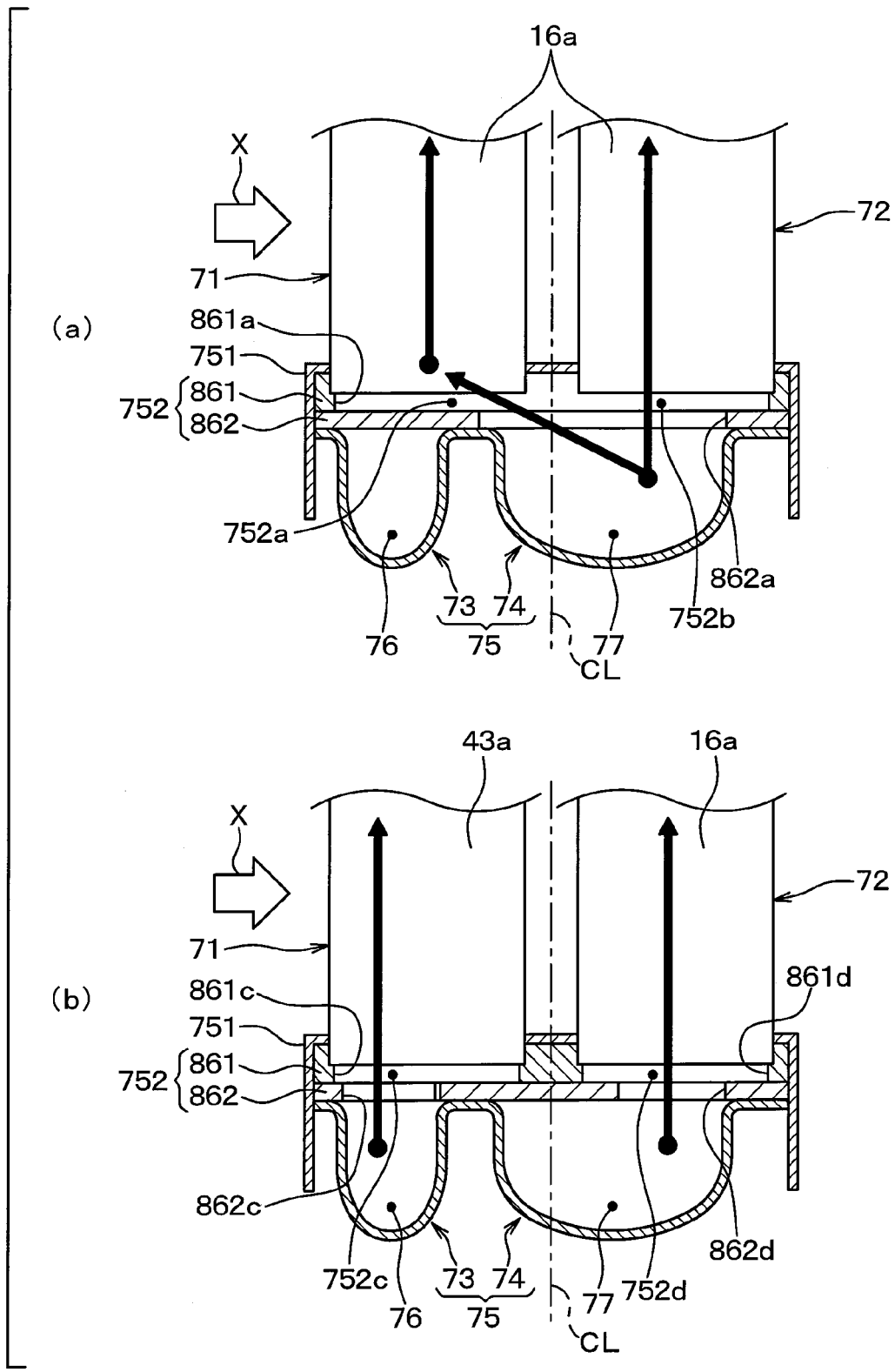
FIG. 17(a) is a cross-sectional view of a portion in which the refrigerant tubes overlap with each other in an air flow direction in a header tank of a heat exchanger according to a seventh embodiment of the present disclosure.
FIG. 17(b) is a cross-sectional view of a portion in which the refrigerant tubes overlap with the coolant tubes in the air flow direction in the header tank of the heat exchanger according to the seventh embodiment.

In the seventh embodiment, as illustrated in FIG. 17, the refrigerant space 77 is arranged at a position overlapping with a virtual line CL which is present at the same distance from the refrigerant tubes 16a of the upstream heat exchange portion 71, and the refrigerant tubes 16a of the downstream heat exchange portion 72, to thereby appropriate regulate the distributivity of the refrigerant to the refrigerant tubes 16a of the upstream heat exchange portion 71 and the refrigerant tubes 16a of the downstream heat exchange portion 72.

In an example of FIG. 17, the refrigerant space 77 is formed to be larger in a width dimension in the flow direction X of the outside air than the coolant space 76. The refrigerant space 77 is arranged downstream of the coolant space 76 in the flow direction X of the outside air, and overlaps with both the refrigerant tubes 16*a* of the upstream heat exchange portion 71 and the refrigerant tubes 16*a* of the downstream heat exchange portion 72 in the longitudinal direction of the refrigerant tubes 16*a*.

According to the present embodiment, since the refrigerant space 77 is arranged at the position overlapping with the virtual line CL, the distribution of the refrigerant to the refrigerant tubes 16*a* of the upstream heat exchange portion 71 and the refrigerant tubes 16*a* of the downstream heat exchange portion 72 can be preventing from being uneven as compared with a case in which the refrigerant space 77 does not overlap with the virtual line CL, and is arranged at any side of the refrigerant tubes 16*a* of the upstream heat exchange portion 71 and the refrigerant tubes 16*a* of the downstream heat exchange portion 72. For that reason, the distributivity of the refrigerant to the refrigerant tubes 16*a* of the upstream heat exchange portion 71 and the refrigerant tubes 16*a* of the downstream heat exchange portion 72 can be appropriately regulated.

Hereinafter, a specific configuration example of the communication passages 752*a* to 752*d* according to the present embodiment will be described. In FIG. 17(*a*), the refrigerant tubes 16*a* of the upstream heat exchange portion 71 overlaps with the refrigerant tubes 16*a* of the downstream heat exchange portion 72 in the flow direction X of the outside air.

In FIG. 17(*b*), the coolant tubes 43*a* of the upstream heat exchange portion 71 overlaps with the refrigerant tubes 16*a* of the downstream heat exchange portion 72 in the flow direction X of the outside air.

As illustrated in FIG. 17, the intermediate plate member 752 is configured by stacking two plate members of a first plate member 861 and a second plate member 862 on each other from a side (upper side of FIG. 17) closer to the refrigerant tubes 16*a* and the coolant tubes 43*a* toward a side (lower side of FIG. 17) closer to the coolant space 76 and the refrigerant space 77.

In FIG. 17(*a*), the first plate member 861 is formed with one through-hole 861*a*, and the second plate member 862 is formed with one through-hole 862*a*.

The through-hole 861*a* of the first plate member 861 is communicated with both the refrigerant tubes 16*a* of the upstream heat exchange portion 71 and the refrigerant tubes 16*a* of the downstream heat exchange portion 72.

The through-hole 862*a* of the second plate member 862 is communicated with the through-hole 861*a* of the first plate member 861, and also communicated with the refrigerant space 77.

Therefore, the upstream refrigerant communication passage 752*a* and the downstream refrigerant communication passage 752*b* are configured by the through-hole 861*a* of the first plate member 861, and the through-hole 862*a* of the second plate member 862.

In FIG. 17(*b*), the first plate member 861 is formed with two through-holes 861*c* and 861*d*, and the second plate member 862 is formed with two through-holes 862*c* and 862*d*.

One through-hole 861*c* of the two through-holes 861*c* and 861*d* of the first plate member 861 is communicated with the coolant tubes 43*a* of the upstream heat exchange portion 71, and the other through-hole 861*d* is communicated with the refrigerant tubes 16*a* of the downstream heat exchange portion 72.

One through-hole 862*c* of the two through-holes 862*c* and 862*d* of the second plate member 862 is communicated with one through-hole 861*c* of the first plate member 861, and also communicated with the coolant space 76. The other through-hole 862*d* is communicated with the other through-hole 861*d* of the first plate member 861, and also communicated with the refrigerant space 77.

Therefore, the upstream coolant communication passage 752*c* is configured by one through-holes 861*c* and 862*c* of the first and second plate members 861 and 862, and the downstream refrigerant communication passage 752*d* is configured by the other through-holes 861*d* and 862*d* of the first and second plate members 861 and 862.

Eighth Embodiment

In the seventh embodiment, the refrigerant space 77 is formed to be larger than the coolant space 76 in the width dimension in the flow direction X of the outside air. On the other hand, in an eighth embodiment, as illustrated in FIG. 18, the refrigerant space 77 is formed to be equal to the coolant space 76 in the width dimension in the flow direction X of the outside air.

With the above configuration, a space S can be formed downstream of the refrigerant space 77 in the flow direction X of the outside air. The space S can be effectively used as a space for arranging a device such as a connector or a modulator therein.

Hereinafter, a specific configuration example of the communication passages 752*a* to 752*d* according to the present embodiment will be described. FIG. 18(*a*) is a diagram corresponding to FIG. 17(*a*), and FIG. 18(*b*) is a diagram corresponding to FIG. 17(*b*).

Figure 18:
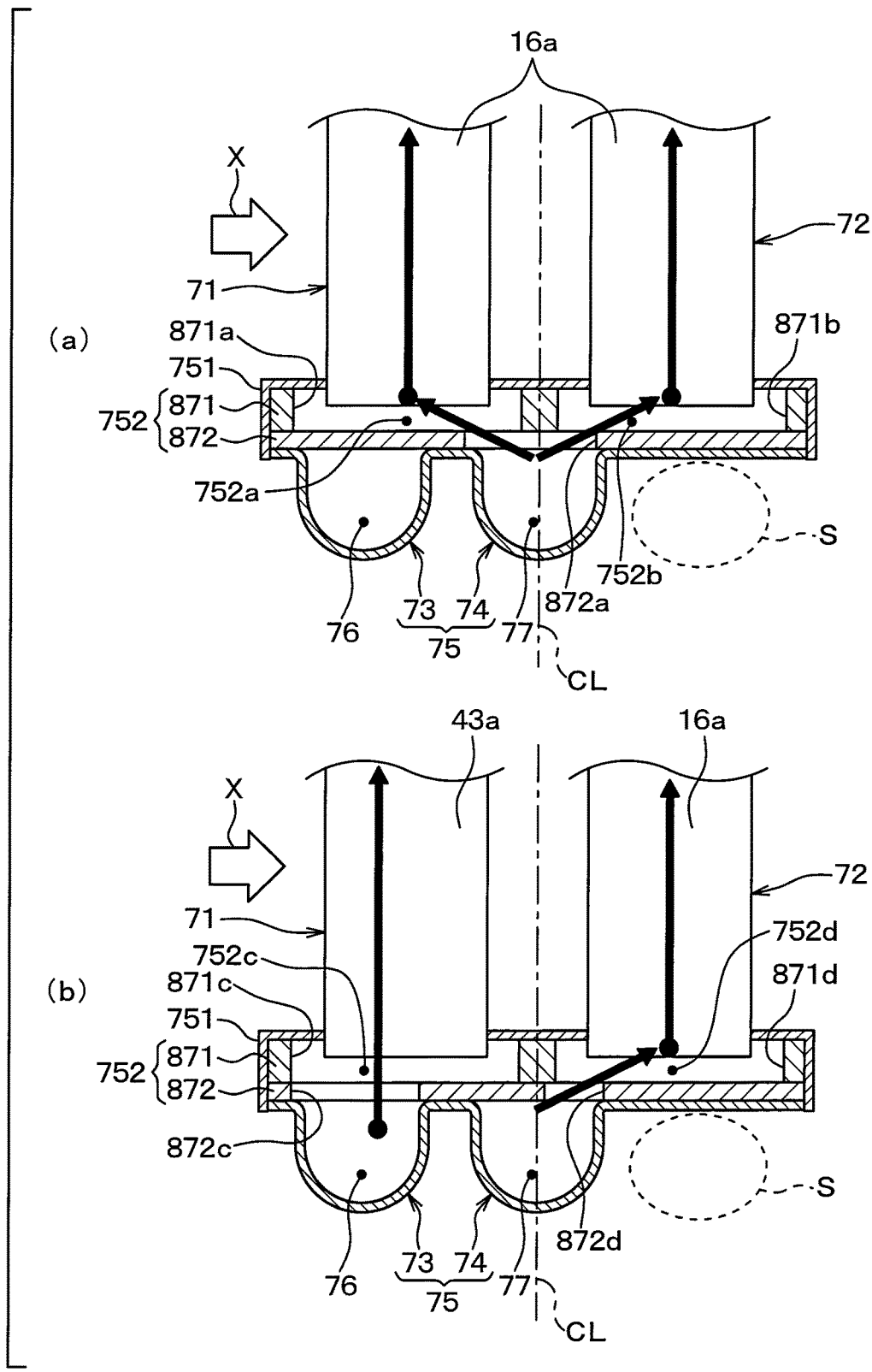
FIG. 18(a) is a cross-sectional view of a portion in which the refrigerant tubes overlap with each other in an air flow direction in a header tank of a heat exchanger according to an eighth embodiment of the present disclosure.
FIG. 18(b) is a cross-sectional view of a portion in which the refrigerant tubes overlap with the coolant tubes in the air flow direction in the header tank of the heat exchanger according to the eighth embodiment.

As illustrated in FIG. 18, the intermediate plate member 752 is configured by stacking two plate members of a first plate member 871 and a second plate member 872 on each other from a side (upper side of FIG. 18) closer to the refrigerant tubes 16*a* and the coolant tubes 43*a* toward a side (lower side of FIG. 18) closer to the coolant space 76 and the refrigerant space 77.

In FIG. 18(*a*), the first plate member 871 is formed with two through-holes 871*a* and 871*b*, and the second plate member 872 is formed with one through-hole 872*a*.

The through-hole 871*a* of the two through-holes 871*a* and 871*b* of the first plate member 871 is communicated with the refrigerant tube 16*a* of the upstream heat exchange portion 71, and the other through-hole 871*b* is communicated with the refrigerant tubes 16*a* of the downstream heat exchange portion 72.

The through-hole 872*a* of the second plate member 872 is communicated with both of the two through-holes 871*a* and 871*b* of the first plate member 871, and also communicated with the refrigerant space 77.

Therefore, the upstream refrigerant communication passage 752*a* is configured by one through-hole 871*a* of the first plate member 871, and the through-hole 872*a* of the second plate member 872. The downstream refrigerant communication passage 752*b* is configured by the other through-hole 871*b* of the first plate member 871, and the through-hole 872*a* of the second plate member 872.

In FIG. 18(*b*), the first plate member 871 is formed with two through-holes 871*c* and 871*d*, and the second plate member 872 is formed with two through-holes 872*c* and 872*d*.

One through-hole 871*c* of the two through-holes 871*c* and 871*d* of the first plate member 871 is communicated with the coolant tubes 43*a* of the upstream heat exchange portion 71, and the other through-hole 871*d* is communicated with the refrigerant tubes 16*a* of the downstream heat exchange portion 72.

One through-hole 872c of the two through-holes 872c and 872d of the second plate member 872 is communicated with one through-hole 871c of the first plate member 871, and also communicated with the coolant space 76. The other through-hole 872d is communicated with the other through-hole 871d of the first plate member 871, and also communicated with the refrigerant space 77.

Therefore, the upstream coolant communication passage 752c is configured by one through-holes 871c and 872c of the first and second plate members 871 and 872, and the downstream refrigerant communication passage 752d is configured by the other through-holes 871d and 872d of the first and second plate members 871 and 872.

Ninth Embodiment

In the eighth embodiment, the refrigerant space 77 is arranged downstream of the coolant space 76 in the flow direction X of the outside air, and at the position overlapping with the virtual line CL. On the other hand, in a ninth embodiment, as illustrated in FIG. 19, the refrigerant space 77 is arranged upstream of the coolant space 76 in the flow direction X of the outside air, and arranged at a position where the coolant space 76 overlaps with the virtual line CL.

With the above configuration, a space S can be formed downstream of the coolant space 76 in the flow direction X of the outside air. The space S can be effectively used as a space for arranging a device such as a connector or a modulator therein.

Hereinafter, a specific configuration example of the communication passages 752a to 752d according to the present embodiment will be described. FIG. 19(a) is a diagram corresponding to FIG. 18(a), and FIG. 19(b) is a diagram corresponding to FIG. 18(b).

Figure 19:
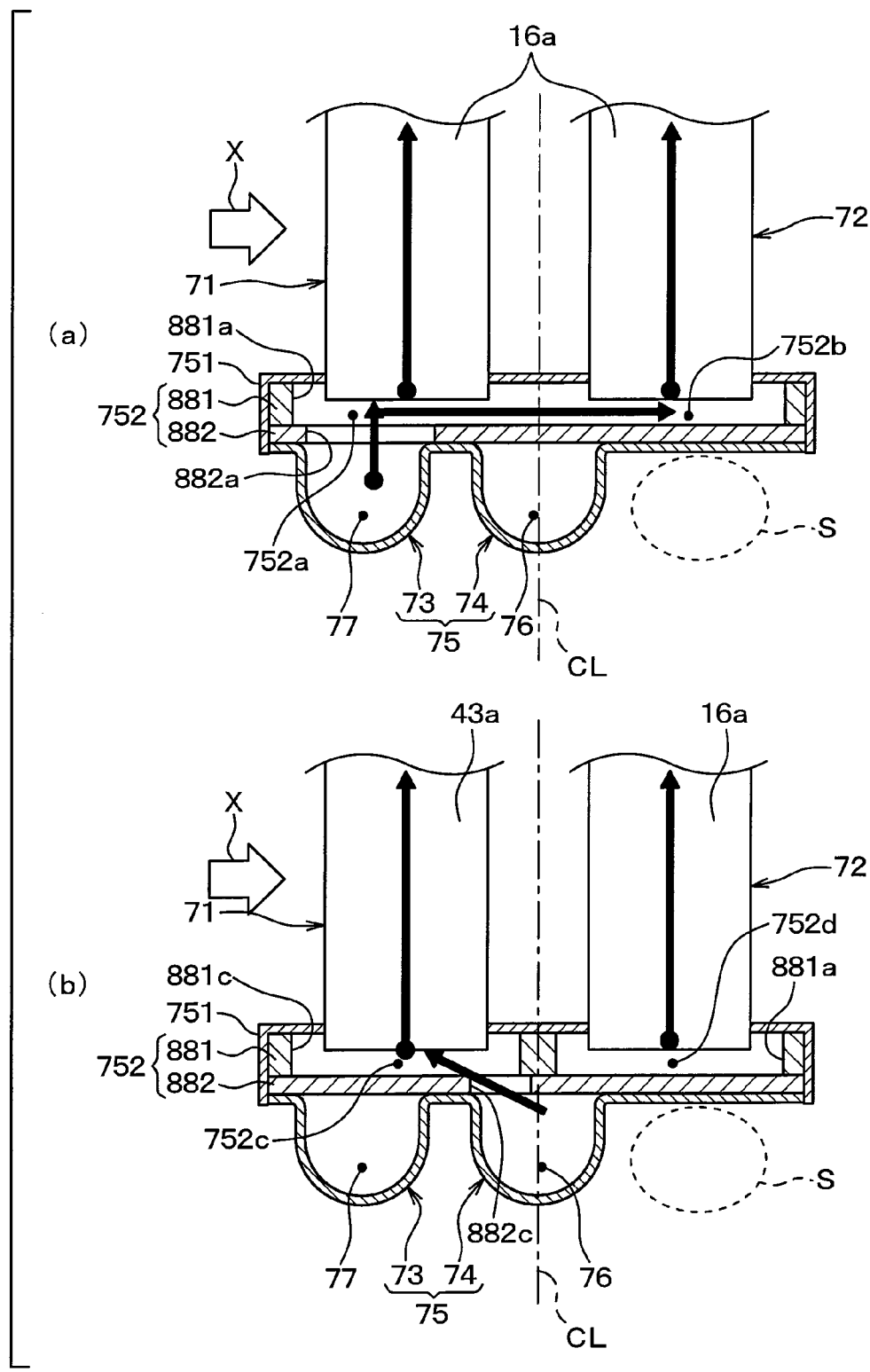
FIG. 19(a) is a cross-sectional view of a portion in which the refrigerant tubes overlap with each other in an air flow direction in a header tank of a heat exchanger according to a ninth embodiment of the present disclosure.
FIG. 19(b) is a cross-sectional view of a portion in which the refrigerant tubes overlap with the coolant tubes in the air flow direction in the header tank of the heat exchanger according to the ninth embodiment.

As illustrated in FIG. 19, the intermediate plate member 752 is configured by stacking two plate members of a first plate member 881 and a second plate member 882 on each other from a side (upper side of FIG. 19) closer to the refrigerant tubes 16a and the coolant tubes 43a toward a side (lower side of FIG. 19) closer to the coolant space 76 and the refrigerant space 77.

In FIG. 19(a), the first plate member 881 is formed with one through-hole 881a, and the second plate member 882 is formed with one through-hole 882a.

The through-hole 881a of the first plate member 881 is communicated with both the refrigerant tube 16a of the upstream heat exchange portion 71 and the refrigerant tubes 16a of the downstream heat exchange portion 72.

The through-hole 882a of the second plate member 882 is communicated with the through-hole 881a of the first plate member 881, and also communicated with the refrigerant space 77.

Therefore, the upstream refrigerant communication passage 752a and the downstream refrigerant communication passage 752b are configured by the through-hole 881a of the first plate member 881, and the through-hole 882a of the second plate member 882.

In FIG. 19(b), the first plate member 881 is formed with two through-holes 881c and 881a, and the second plate member 882 is formed with one through-hole 882c.

One through-hole 881c of the two through-holes 881c and 881a of the first plate member 881 is communicated with the coolant tubes 43a of the upstream heat exchange portion 71, and the other through-hole 881a is communicated with the refrigerant tubes 16a of the downstream heat exchange portion 72. The other through-hole 881a is identical with the above-mentioned through-hole 881a in FIG. 19(a), and as with the above-mentioned through-hole 831a in FIG. 14, a portion of the through-hole 881a on a downstream side in the flow direction X of the outside air is formed to extend in the tube stacking direction.

The through-hole 882c of the second plate member 882 is communicated with one through-hole 881c of the first plate member 881, and also communicated with the coolant space 76.

Therefore, the upstream coolant communication passage 752c is configured by the through-holes 881c and 882c of the first and second plate members 881 and 882, and the downstream refrigerant communication passage 752d is configured by the through-holes 881a of the first plate member 881, and the through-hole 882a of the second plate member 882 illustrated in FIG. 19(a).

Tenth Embodiment

Figure 20:
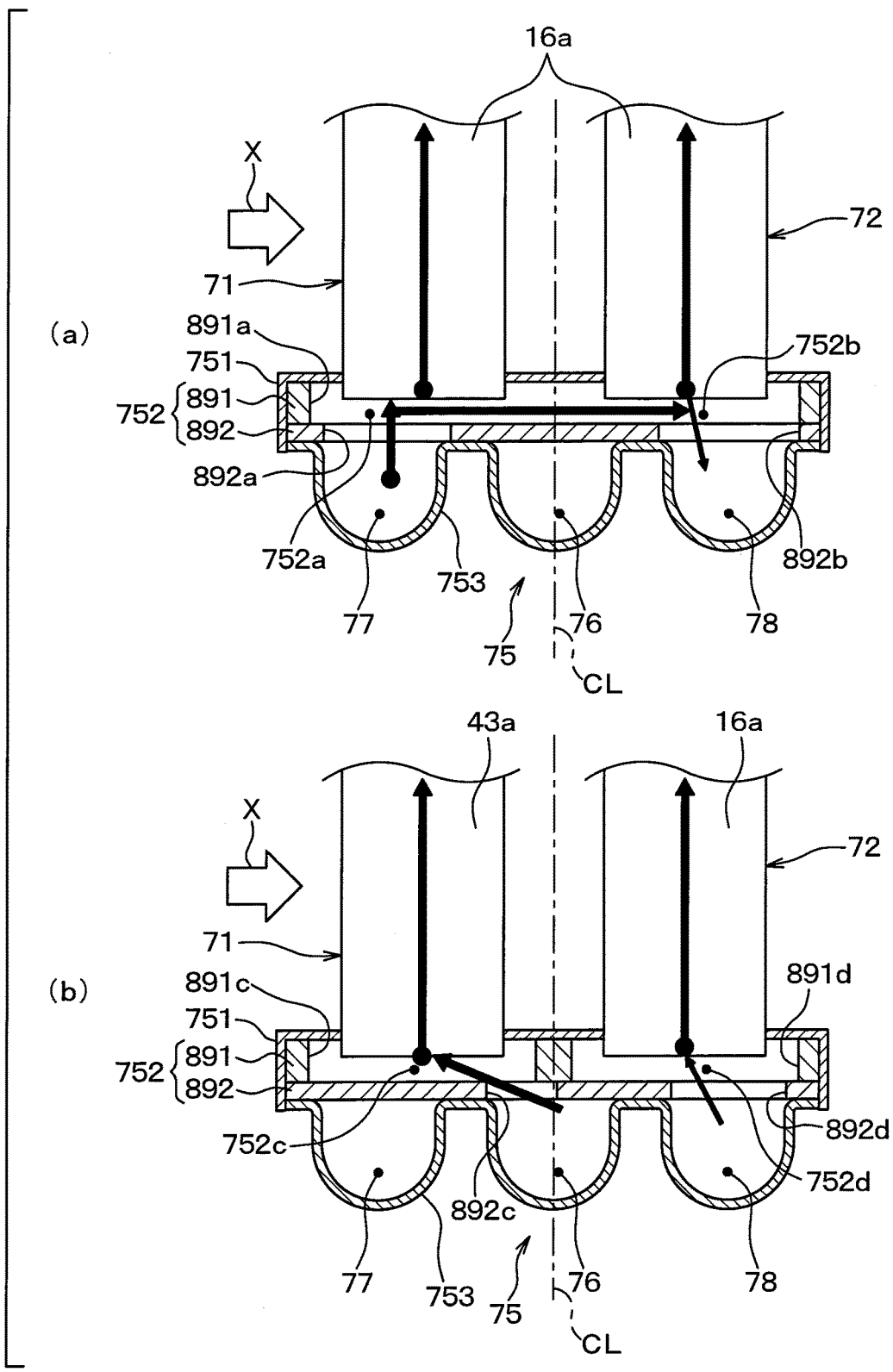
FIG. 20(a) is a cross-sectional view of a portion in which the refrigerant tubes overlap with each other in an air flow direction in a header tank of a heat exchanger according to a tenth embodiment of the present disclosure.
FIG. 20(b) is a cross-sectional view of a portion in which the refrigerant tubes overlap with the coolant tubes in the air flow direction in the header tank of the heat exchanger according to the tenth embodiment.

In a tenth embodiment, as illustrated in FIG. 20, a second refrigerant space 78 (third tank space) is formed in a portion in which the space S is formed in the above ninth embodiment.

Specifically, the tank formation member 753 is formed into a three-mountain shape when viewed from the longitudinal direction thereof, and a center portion of the respective mountains in the tank formation member 753 is joined to the intermediate plate member 752, to thereby section the first refrigerant space 77, the coolant space 76 and the second refrigerant space 78.

The first refrigerant space 77, the coolant space 76, and the second refrigerant space 78 are arranged in this order in the flow direction X of the outside air, and the coolant space 76 overlaps with the virtual line CL.

Hereinafter, a specific configuration example of the communication passages 752a to 752d according to the present embodiment will be described. FIG. 20(a) is a diagram corresponding to FIG. 19(a), and FIG. 20(b) is a diagram corresponding to FIG. 19(b).

As illustrated in FIG. 20, the intermediate plate member 752 is configured by stacking two plate members of a first plate member 891 and a second plate member 892 on each other from a side (upper side of FIG. 20) closer to the refrigerant tubes 16a and the coolant tubes 43a toward a side (lower side of FIG. 20) closer to the coolant space 76 and the refrigerant space 77.

In FIG. 20(a), the first plate member 891 is formed with one through-hole 891a, and the second plate member 892 is formed with two through-holes 892a and 892b.

The through-hole 891a of the first plate member 891 is communicated with both the refrigerant tube 16a of the upstream heat exchange portion 71 and the refrigerant tubes 16a of the downstream heat exchange portion 72.

One through-hole 882a of the two through-holes 892a and 892b of the second plate member 892 is communicated with the through-hole 891a of the first plate member 891, and also communicated with the first refrigerant space 77. Therefore, the upstream refrigerant communication passage 752a and the downstream refrigerant communication passage 752b are configured by the through-hole 891a of the first plate member 891, and one through-hole 892a of the second plate member 892.

The other through-hole 892b of the two through-holes 892a and 892b of the second plate member 892 is communicated with the through-hole 891a of the first plate member 891, and also communicated with the second refrigerant space 78. Therefore, the second refrigerant space 78 is communicated with the downstream refrigerant communication passage 752b through the other through-hole 892b of the second plate member 892.

In FIG. 20(b), the first plate member 891 is formed with two through-holes 891c and 891d, and the second plate member 892 is formed with two through-holes 892c and 892d.

One through-hole 891c of the two through-holes 891c and 891d of the first plate member 891 is communicated with the coolant tubes 43a of the upstream heat exchange portion 71, and the other through-hole 891d is communicated with the refrigerant tubes 16a of the downstream heat exchange portion 72.

One through-hole 892c of the two through-holes 892c and 892d of the second plate member 892 is communicated with one through-hole 891c of the first plate member 891, and also communicated with coolant space 76.

The other through-hole 892d of the second plate member 892 is communicated with the other through-hole 891d of the first plate member 891, and also communicated with the second refrigerant space 78.

Therefore, the upstream coolant communication passage 752c is configured by one through-holes 891c and 892c of the first and second plate members 891 and 892, and the downstream refrigerant communication passage 752d is configured by the other through-holes 891d and 892d of the first and second plate members 891 and 892, and the second refrigerant space 78.

According to the present embodiment, since a flow channel of the refrigerant from FIG. 20(a) to FIG. 20(b) is configured by the second refrigerant space 78, a flow channel area of the flow channel can be increased as compared with a case in which the flow channel is configured by the through-hole 881a of the first plate member 881 as in the ninth embodiment. Further, the pressure loss of the refrigerant in the downstream refrigerant communication passage 752d can be reduced.

Eleventh Embodiment

Figure 21:
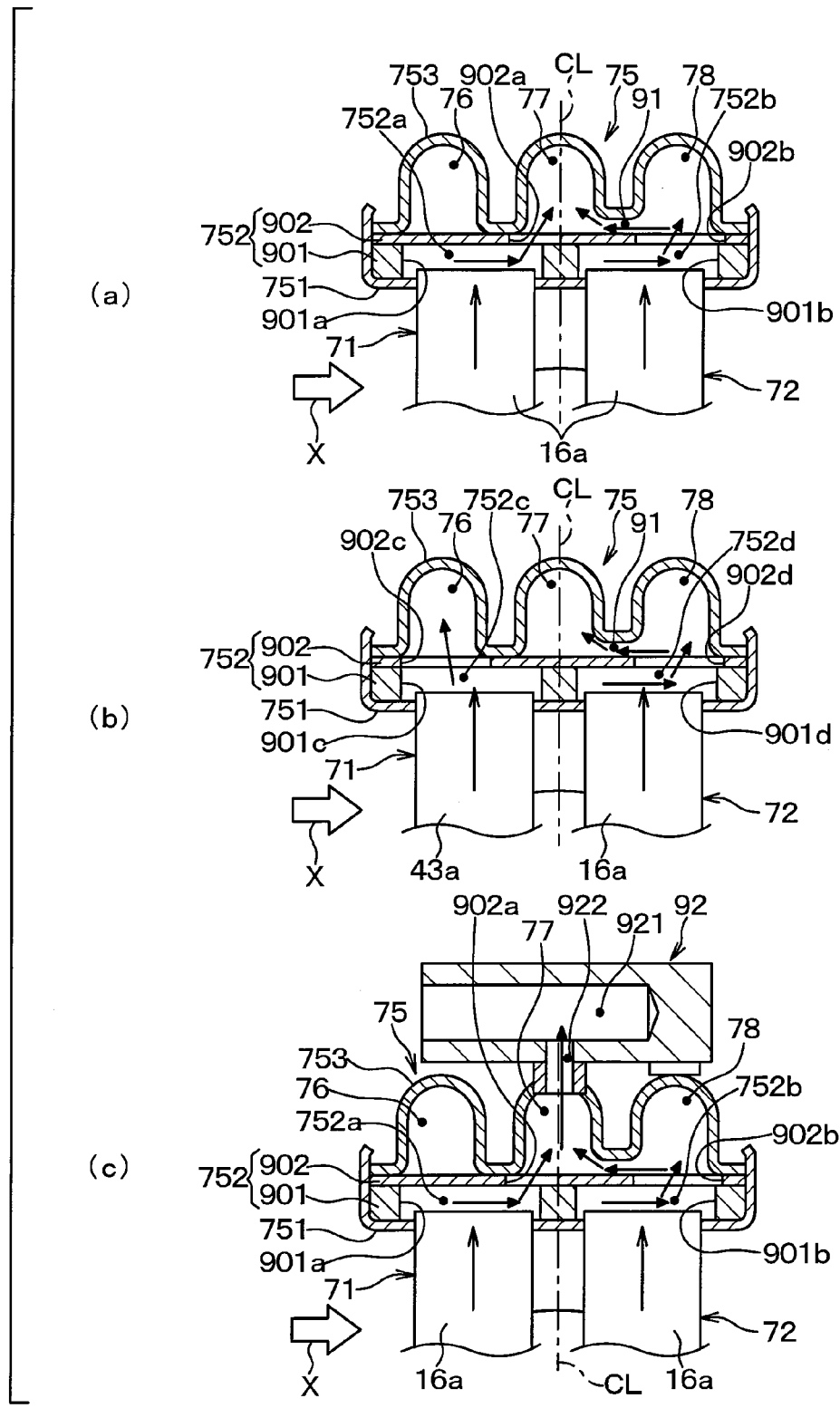
FIG. 21(a) is a cross-sectional view of a portion in which the refrigerant tubes overlap with each other in an air flow direction in a header tank of a heat exchanger according to an eleventh embodiment of the present disclosure.
FIG. 21(b) is a cross-sectional view of a portion in which the refrigerant tubes overlap with the coolant tubes in the air flow direction in the header tank of the heat exchanger according to the eleventh embodiment.
FIG. 21(c) is a cross-sectional view of a portion in which a connector is arranged in the header tank of the heat exchanger according to the eleventh embodiment.

In an eleventh embodiment, as illustrated in FIG. 21, the arrangement of the first refrigerant space 77 and the coolant space 76 in the tenth embodiment is reversed.

Specifically, the coolant space 76, the first refrigerant space 77 and the second refrigerant space 78 are arranged in this order in the flow direction X of the outside air, and the first refrigerant space 77 overlaps with the virtual line (CL).

Hereinafter, a specific configuration example of the communication passages 752a to 752d according to the present embodiment will be described. FIG. 21(a) is a diagram corresponding to FIG. 20(a), and FIG. 21(b) is a diagram corresponding to FIG. 20(b). Also, FIG. 21(c) illustrates a cross-section in which a refrigerant piping connection connector 92 is arranged.

As illustrated in FIG. 21, the intermediate plate member 752 is configured by stacking two plate members of a first plate member 901 and a second plate member 902 on each other from a side (upper side of FIG. 21) closer to the refrigerant tubes 16a and the coolant tubes 43a toward a side (lower side of FIG. 21) closer to the coolant space 76 and the refrigerant space 77.

In FIG. 21(a), the first plate member 901 is formed with two through-holes 901a and 901b, and the second plate member 902 is formed with two through-holes 902a and 902b.

One through-hole 901a of the two through-holes 901a and 901b of the first plate member 901 is communicated with the refrigerant tubes 16a of the upstream heat exchange portion 71, and the other through-hole 901a is communicated with the refrigerant tubes 16a of the downstream heat exchange portion 72.

One through-hole 902a of the two through-holes 902a and 902b of the second plate member 902 is communicated with one through-hole 901a of the first plate member 901, and also communicated with the first refrigerant space 77.

The other through-hole 902b of the two through-holes 902a and 902b of the second plate member 902 is communicated with the other through-hole 901b of the first plate member 901, and also communicated with the second refrigerant space 78.

Therefore, the upstream coolant communication passage 752a is configured by one through-hole 901a of the first plate member 901, and one through-hole 902a of the second plate member 902, and the downstream refrigerant communication passage 752b is configured by the other through-hole 901b of the first plate member 901, and the other through-hole 902b of the second plate member 902.

In this example, a hole diameter (hole area) of one through-hole 902a of the second plate member 902 is smaller than a hole diameter (hole area) of the other through-hole 902b of the second plate member 902.

In FIG. 21(b), the first plate member 901 is formed with two through-holes 901c and 901d, and the second plate member 902 is formed with two through-holes 902c and 902d.

One through-hole 901c of the two through-holes 901c and 901d of the first plate member 901 is communicated with the coolant tubes 43a of the upstream heat exchange portion 71, and the other through-hole 901d is communicated with the refrigerant tubes 16a of the downstream heat exchange portion 72.

One through-hole 902c of the two through-holes 902c and 902d of the second plate member 902 is communicated with one through-hole 901c of the first plate member 901, and also communicated with coolant space 76.

The other through-hole 902d of the second plate member 902 is communicated with the other through-hole 901d of the first plate member 901, and also communicated with the second refrigerant space 78.

Therefore, the upstream coolant communication passage 752c is configured by one through-holes 901c and 902c of the first and second plate members 901 and 902, and the downstream refrigerant communication passage 752d is configured by the other through-holes 901d and 902d of the first and second plate members 901 and 902, and the second refrigerant space 78.

As illustrated in FIGS. 21(a) and 21(b), in the tank formation member 753 of the three-mountain shape, a portion between the first refrigerant space 77 and the second refrigerant space 78 is spaced apart from the second plate member 902 (intermediate plate member 752). With this configuration, a tank interior communication passage 91 that communicates the first refrigerant space 77 with the second refrigerant space 78 is formed between the tank formation member 753 and the second plate member 902 (intermediate plate member 752).

As illustrated in FIG. 21(c), the connector 92 is fitted to an outside of the tank formation member 753. In detail, the connector 92 is arranged on an external side on an opposite side of the header tank 75 to the upstream heat exchange portion 71 and the downstream heat exchange portion 72. The connector 92 is formed with a connector communication channel 922 that communicates an internal space 921 thereof with the first refrigerant space 77.

In the present embodiment, as in the tenth embodiment, since the flow channel of the refrigerant from FIG. 21(a) to FIG. 21(b) is configured by the second refrigerant space 78, the pressure loss of the refrigerant in the downstream refrigerant communication passage 752d can be reduced.

Further, according to the present embodiment, a design of a recessed shape of a portion between the first refrigerant space 77 and the second refrigerant space 78 in the tank formation member 753 is changed to change a width of the tank interior communication passage 91, as a result of which the flow channel resistance between the refrigerant tubes 16a of the downstream heat exchange portion 72 and the refrigerant space 77 can be regulated.

Also, by changing a design of hole diameters (hole areas) of the two through-holes 902a and 902b of the second plate member 902 to change the flow channel resistances of the upstream refrigerant communication passage 752a and the downstream refrigerant communication passage 752b, the flow channel resistance between the first tubes 16a of the downstream heat exchange portion 72 and the refrigerant space 77 can be regulated.

Also, by changing a design of shapes of portions forming the first and second refrigerant spaces 77 and 78 in the tank formation member 753 to change sizes (cross-sectional areas) of the first and second refrigerant spaces 77 and 78, the flow channel resistance between the first tubes 16a of the downstream heat exchange portion 72 and the refrigerant space 77 can be regulated.

Twelfth Embodiment

Figure 22:
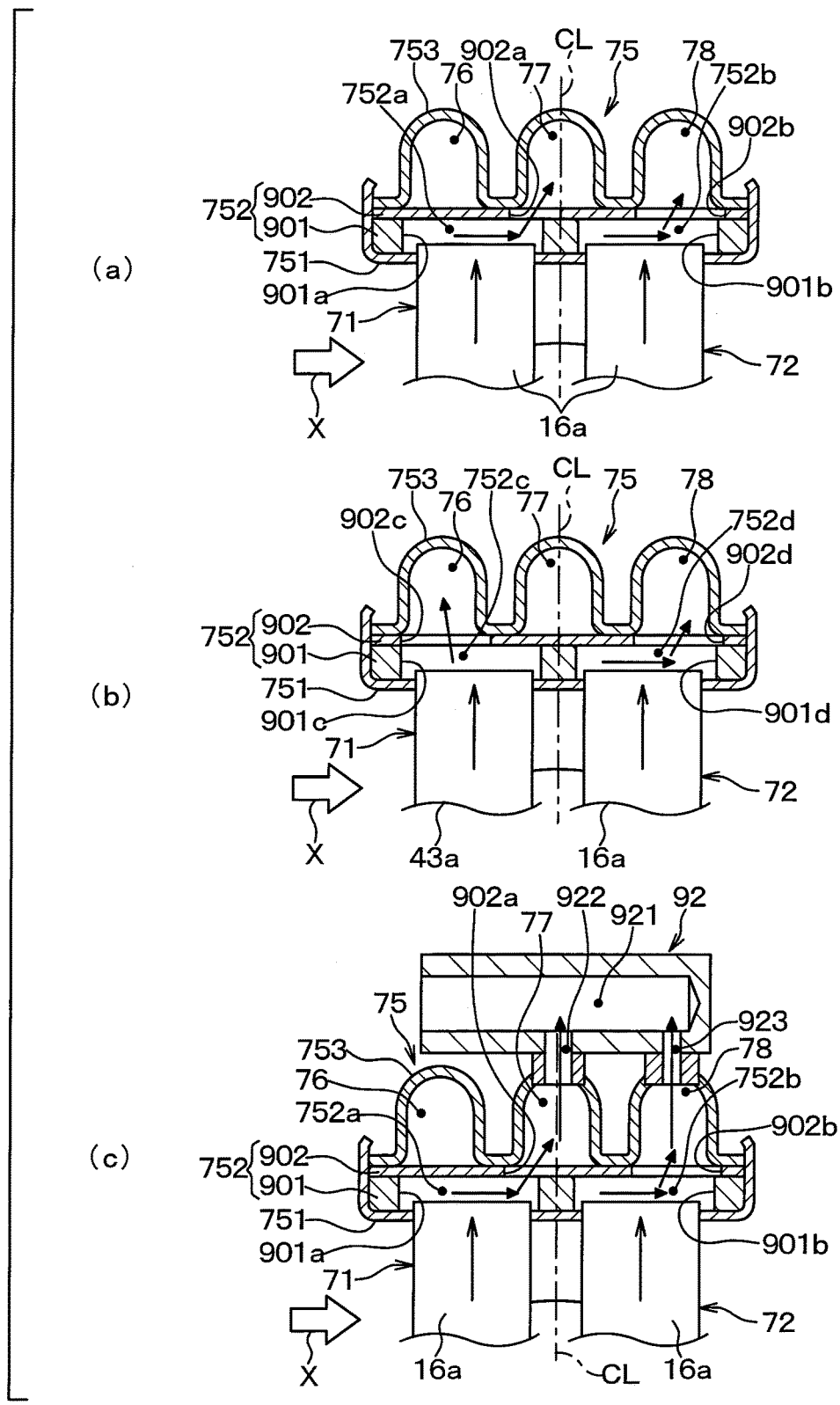
FIG. 22(a) is a cross-sectional view of a portion in which the refrigerant tubes overlap with each other in an air flow direction in a header tank of a heat exchanger according to a twelfth embodiment of the present disclosure.
FIG. 22(b) is a cross-sectional view of a portion in which the refrigerant tubes overlap with the coolant tubes in the air flow direction in the header tank of the heat exchanger according to the twelfth embodiment.
FIG. 22(c) is a cross-sectional view of a portion in which a connector is arranged in the header tank of the heat exchanger according to the twelfth embodiment.

In a twelfth embodiment, as illustrated in FIG. 22, as compared with the eleventh embodiment, the tank interior communication passage 91 is omitted, and the connector 92 is formed with a second connector communication passage 923 that communicates the internal space 921 with the second refrigerant space 78.

According to the present embodiment, ease of the flow of the refrigerant in the refrigerant tubes 16a of the upstream heat exchange portion 71 and the refrigerant tubes 16a of the downstream heat exchange portion 72 can be changed by changing the design of the hole diameters (hole areas) of the first connector communication channel 922 and the second connector communication passage 923. As a result, the distributivity of the refrigerant can be appropriately regulated.

Also, as in the eleventh embodiment, the flow channel resistance between the refrigerant tubes 16a of the downstream heat exchange portion 72 and the refrigerant space 77 can be regulated by changing the design of the hole diameter (hole area) of the two through-holes 902a and 902b of the second plate member 902, and the size (cross-sectional area) of the first and second refrigerant spaces 77 and 78.

Thirteenth Embodiment

Figure 23:
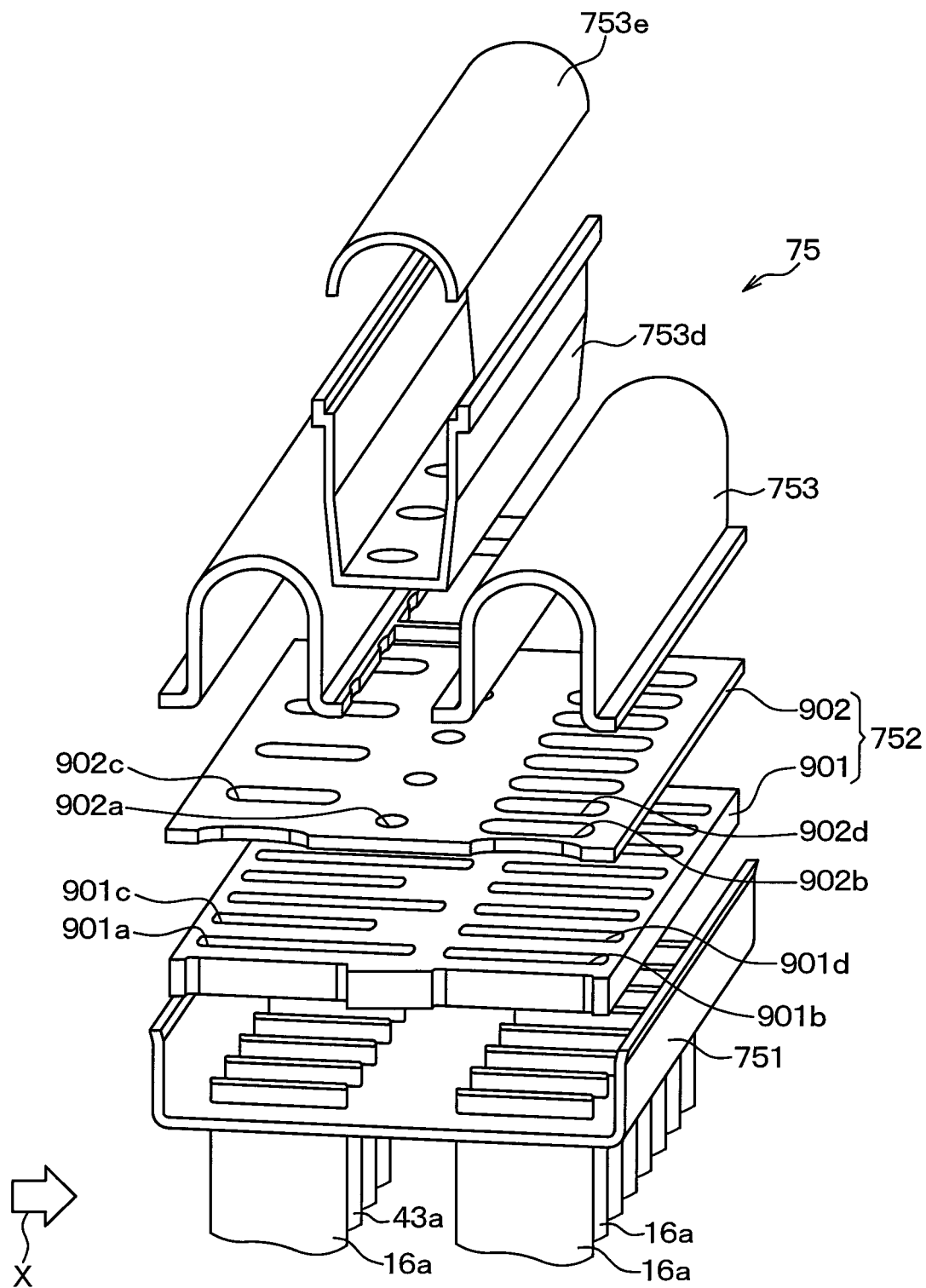
FIG. 23 is an exploded view of a header tank included in a heat exchanger according to a thirteenth embodiment of the present disclosure.
Figure 24:
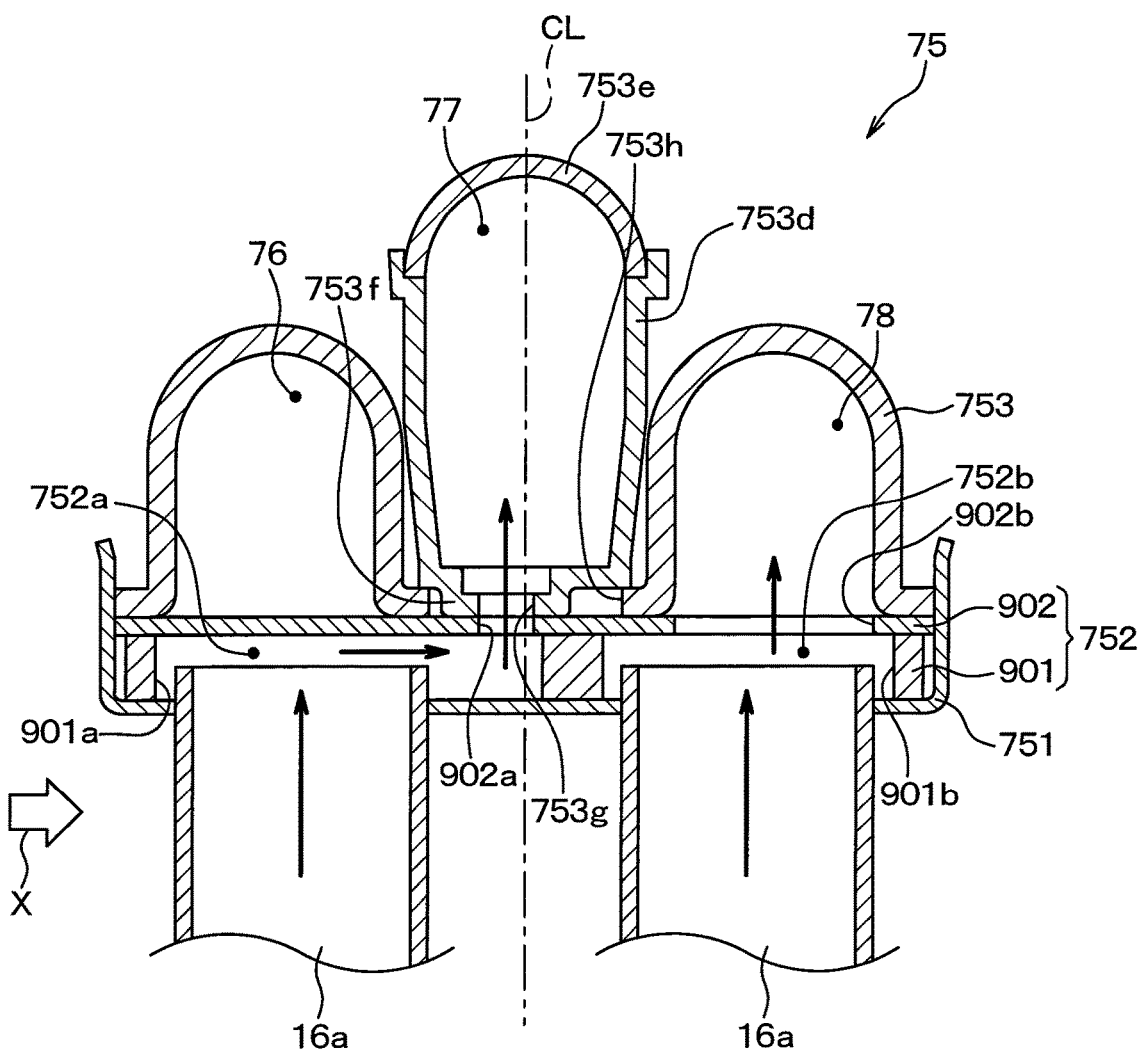
FIG. 24 is a cross-sectional view of a portion in which the refrigerant tubes overlap with each other in an air flow direction in the header tank of the heat exchanger according to the thirteenth embodiment.
Figure 25:
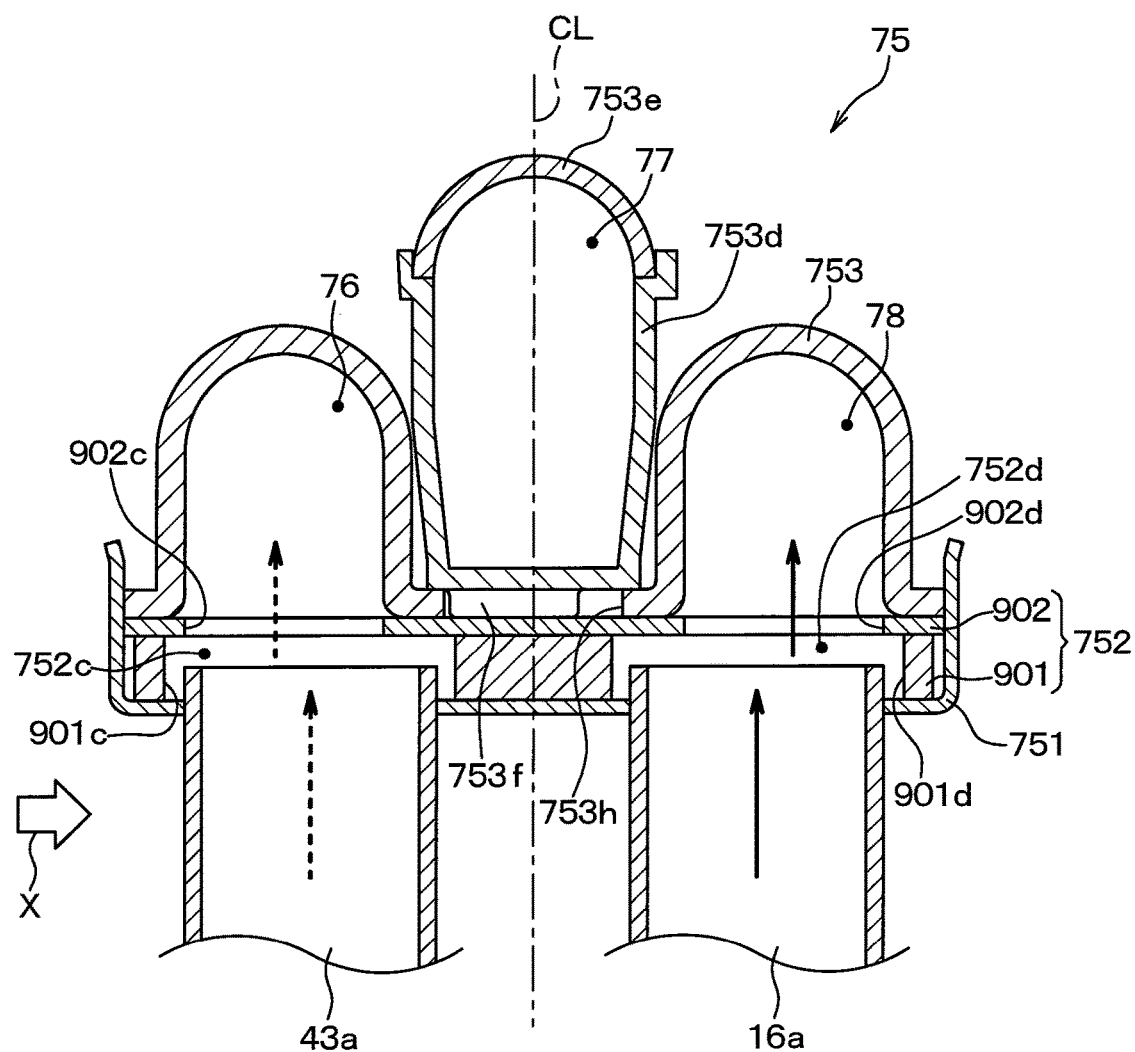
FIG. 25 is a cross-sectional view of a portion in which the refrigerant tubes overlap with the coolant tubes in the air flow direction in the header tank of the heat exchanger according to the thirteenth embodiment.

In a thirteenth embodiment, unlike the above twelfth embodiment, as illustrated in FIGS. 23 to 25, the first refrigerant space 77 is formed of tank formation members 753d and 753e different from the tank formation member 753 forming the coolant space 76 and the second refrigerant space 78. In the present embodiment, for convenience, the tank formation member 753 is called "first tank formation member 753", the tank formation member 753d is called "second tank formation member 753d", and the tank formation member 753e is called "third tank formation member 753e". In the heat exchanger 70 according to the present embodiment, FIG. 23 is an exploded perspective view of the header tank 75, FIG. 24 is a cross-sectional view corresponding to FIG. 22(a), and FIG. 25 is a cross-sectional view corresponding to FIG. 22(b).

As illustrated in FIGS. 23 to 25, the tank formation member 753 forms the coolant space 76 and the second refrigerant space 78, but does not form the first refrigerant space 77. Instead, the second tank formation member 753d and the third tank formation member 753e are disposed. The second tank formation member 753d and the third tank formation member 753e form the first refrigerant space 77 between the coolant space 76 and the second refrigerant space 78 in the flow direction X of the outside air.

Specifically, each of the second tank formation member 753d and the third tank formation member 753e has a U-shaped cross-sectional configuration. Respective recessed surface sides of the second tank formation member 753d and the third tank formation member 753e face each other, and are combined together to form the first refrigerant space 77.

Also, the second tank formation member 753d has a flow channel connection unit 753f projected toward a side facing the second plate member 902, and through-holes 753g that overlap with the through-hole 902a of the second plate member 902 are formed in the flow channel connection unit 753f. The flow channel connection unit 753f is abutted against a plate surface of the second plate member 902 facing the flow channel connection unit 753f, and joined to the second plate member 902, as a result of which the through-holes 753g of the tank formation member 753d are communicated with the through-hole 902a of the second plate member 902. The first tank formation member 753 is formed with a relief hole 753h for the purpose of avoiding an interference of the first tank formation member 753 with the flow channel connection unit 753f.

In the header tank 75 thus configured, the upstream refrigerant communication passage 752a is configured by the through-hole 901a of the first plate member 901, the through-hole 902a of the second plate member 902, and the through-holes 753g of the second tank formation member 753d. The configurations of the downstream refrigerant communication passages 752b, 752d, and the upstream coolant communication passage 752c are identical with those in the above-mentioned twelfth embodiment.

A drawing corresponding to FIG. 22(c) of the above-mentioned twelfth embodiment is omitted. For example, the connector 92 is disposed, and the first and second refrigerant spaces 77 and 78 illustrated in FIGS. 23 to 25 are communicated with each other through the connector 92.

Fourteenth Embodiment

Figure 26:
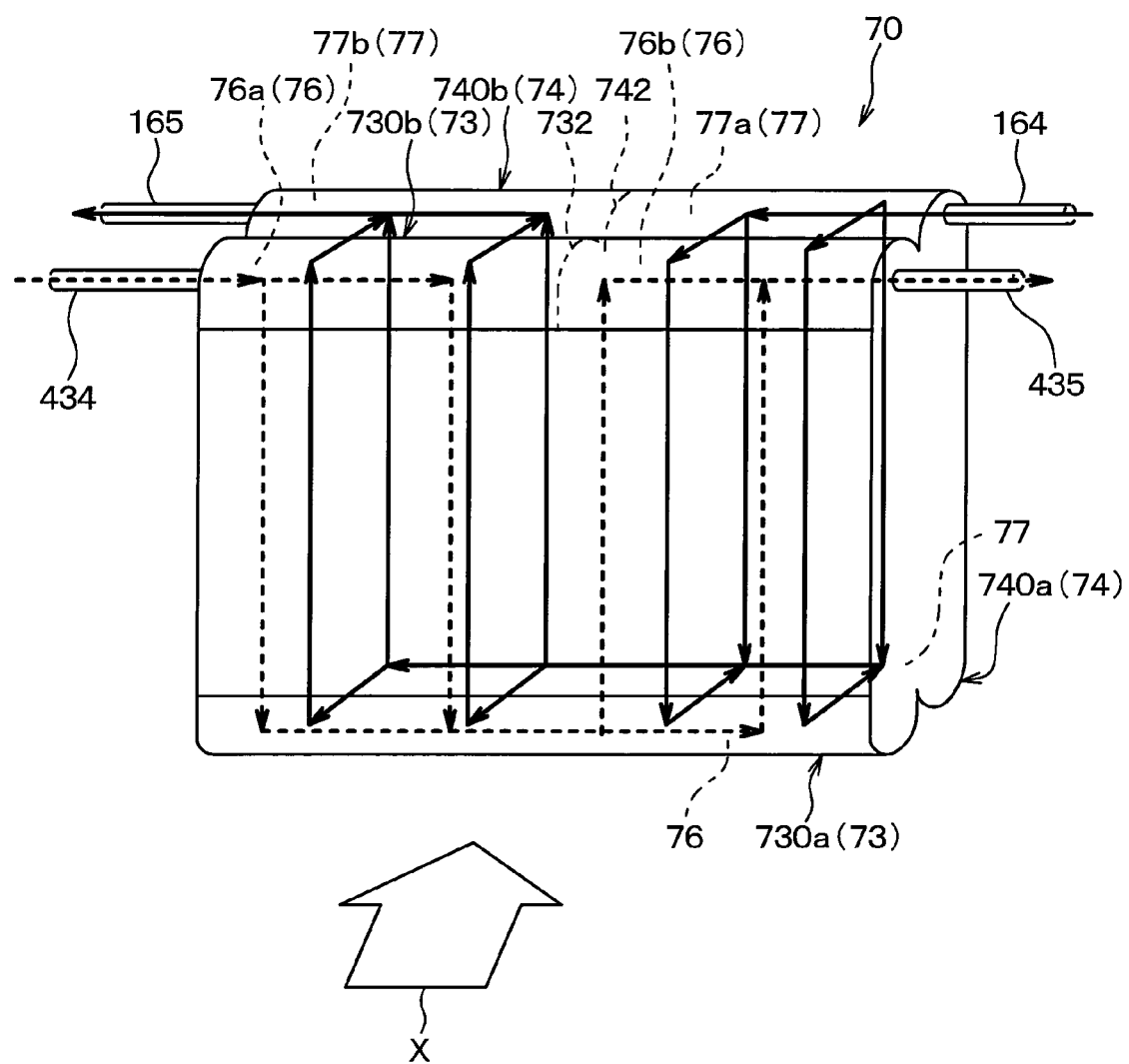
FIG. 26 is a schematic view illustrating flows of the refrigerant and the coolant in a heat exchanger according to a fourteenth embodiment according to the present disclosure.

In a fourteenth embodiment, as compared with the above first embodiment, the flow channel configuration of the heat exchanger 70 is changed. FIG. 26 is a schematic view illustrating a refrigerant flow and a coolant flow in the heat exchanger 70 according to the present embodiment.

The coolant inflow pipe 434 is connected to one end side (left side of FIG. 26) of the second upstream tank unit 730b in a longitudinal direction thereof, which is arranged on one end side (upper side of FIG. 26) of the coolant tubes 43a in a longitudinal direction thereof. The coolant outflow pipe 435 is connected to the other end side (right side of FIG. 26) of the second upstream tank unit 730b in the longitudinal direction thereof. Both end sides of the first upstream tank unit 730a in the longitudinal direction thereof are closed by closing members.

The refrigerant outflow pipe 165 is connected to one end side (left side of FIG. 26) of the second downstream tank unit 740b in a longitudinal direction thereof, which is arranged on one end side (upper side of FIG. 26) of the refrigerant tubes 16a in a longitudinal direction thereof. The refrigerant inflow pipe 164 is connected to the other end side (right side of FIG. 26) of the second downstream tank unit 740b in the longitudinal direction thereof. Both end sides of the first downstream tank unit 740a in the longitudinal direction thereof are closed by closing members.

An upstream partition member 732 that partitions the coolant space 76 into two spaces in the longitudinal direction of the second upstream tank unit 730b is arranged in the second upstream tank unit 730b.

Hereinafter, in the present embodiment, in the two coolant spaces 76 partitioned by the upstream partition member 732, a space communicated with the coolant inflow pipe 434 is called "first coolant space 76a", and a space communicated with the coolant outflow pipe 435 is called "second coolant space 76b".

On the other hand, a downstream partition member 742 that partitions the refrigerant space 77 into two spaces in the longitudinal direction of the second downstream tank unit 740b is arranged in the second downstream tank unit 740b.

Hereinafter, in the present embodiment, in the two refrigerant spaces 77 partitioned by the downstream partition member 742, a space communicated with the refrigerant inflow pipe 164 is called "first refrigerant space 77a", and a space communicated with the refrigerant outflow pipe 165 is called "second refrigerant space 77b".

Therefore, in the heat exchanger 70 according to the present embodiment, a part of the refrigerant that flows into the first refrigerant space 77a of the second downstream tank unit 740b through the refrigerant inflow pipe 164 flows into the refrigerant tubes 16a of the downstream heat exchange portion 72 through the refrigerant communication passages 752b and 752d formed in the intermediate plate member 752, and flows within the refrigerant tubes 16a from the upper side of FIG. 26 toward the lower side. Also, another part of the refrigerant that flows into the first refrigerant space 77a of the second downstream tank unit 740b flows into the refrigerant tubes 16a of the upstream heat exchange portion 71 through the upstream refrigerant communication passage 752a formed in the intermediate plate member 752, and flows within the refrigerant tubes 16a from the upper side of FIG. 26 toward the lower side.

The refrigerant that flows out of the refrigerant tubes 16a of the downstream heat exchange portion 72 is collected in the refrigerant space 77 of the first downstream tank unit 740a through the refrigerant communication passages 752b and 752d formed in the intermediate plate member 752. Also, the refrigerant that flows out of the refrigerant tubes 16a of the upstream heat exchange portion 71 is collected in the refrigerant space 77 of the first downstream tank unit 740a through the upstream refrigerant communication passage 752a formed in the intermediate plate member 752.

The refrigerant collected in the refrigerant space 77 of the first downstream tank unit 740a flows from the right side toward the left side in FIG. 26. Thereafter, a part of the refrigerant collected in the refrigerant space 77 of the first downstream tank unit 740a flows into the refrigerant tubes 16a of the downstream heat exchange portion 72 through the refrigerant communication passages 752b and 752d formed in the intermediate plate member 752, and flows within the refrigerant tubes 16a from the lower side toward the upper side in the figure. Also, another part of the refrigerant collected in the refrigerant space 77 of the first downstream tank unit 740a flows into the refrigerant tubes 16a configuring the upstream heat exchange portion 71 through the upstream refrigerant communication passage 752a formed in the intermediate plate member 752, and flows within the refrigerant tubes 16a from the lower side toward the upper side in FIG. 26.

The refrigerant that flows out of the refrigerant tubes 16a of the downstream heat exchange portion 72 is collected in the second refrigerant space 77b of the second downstream tank unit 740b through the refrigerant communication passages 752b and 752d formed in the intermediate plate member 752. Also, the refrigerant that flows out of the refrigerant tubes 16a of the upstream heat exchange portion 71 is collected in the second refrigerant space 77b of the second downstream tank unit 740b through the upstream refrigerant communication passage 752a formed in the intermediate plate member 752.

The refrigerant collected in the second refrigerant space 77b of the second downstream tank unit 740b flows from the right side toward the left side in FIG. 26, and flows out of the refrigerant outflow pipe 165.

On the other hand, in the heat exchanger 70 according to the present embodiment, the coolant that flows into the first coolant space 76a of the second upstream tank unit 730b through the coolant inflow pipe 434 flows into the coolant tubes 43a of the upstream heat exchange portion 71 through the coolant communication passage 752c formed in the intermediate plate member 752, and flows within the coolant tubes 43a from the upper side toward the lower side in FIG. 26.

The coolant that flows out of the coolant tubes 43a of the upstream heat exchange portion 71 is collected in the coolant space 76 of the first upstream tank unit 730a through the coolant communication passage 752c formed in the intermediate plate member 752. The coolant collected in the coolant space 76 of the first upstream tank unit 730a flows from the left side toward the right side in FIG. 26.

Thereafter, the coolant collected in the coolant space 76 of the first upstream tank unit 730a flows into the coolant tubes 43a of the upstream heat exchange portion 71 through the coolant communication passage 752c formed in the intermediate plate member 752, and flows within the coolant tubes 43a from the lower side toward the upper side in the figure. The coolant that flows out of the coolant tubes 43a of the upstream heat exchange portion 71 is collected in the second coolant space 76b of the second upstream tank unit 730b through the coolant communication passage 752c formed in the intermediate plate member 752.

The coolant collected in the second coolant space 76b of the second upstream tank unit 730b flows from the left side toward the right side in FIG. 26, and flows out of the coolant outflow pipe 435.

In the heat exchanger 70 according to the present embodiment in the structure of the header tank 75 described in the above-mentioned respective embodiments and respective embodiments which will be described later, the structure whose arrangement relationship of the coolant space 76 and the refrigerant space 77 in the flow direction X of the outside air is common with the present embodiment can be applied to the present embodiment. The same is applied to a structure of the header tank 75 of the respective embodiments described later with reference to FIGS. 27 to 35.

Fifteenth Embodiment

Figure 27:
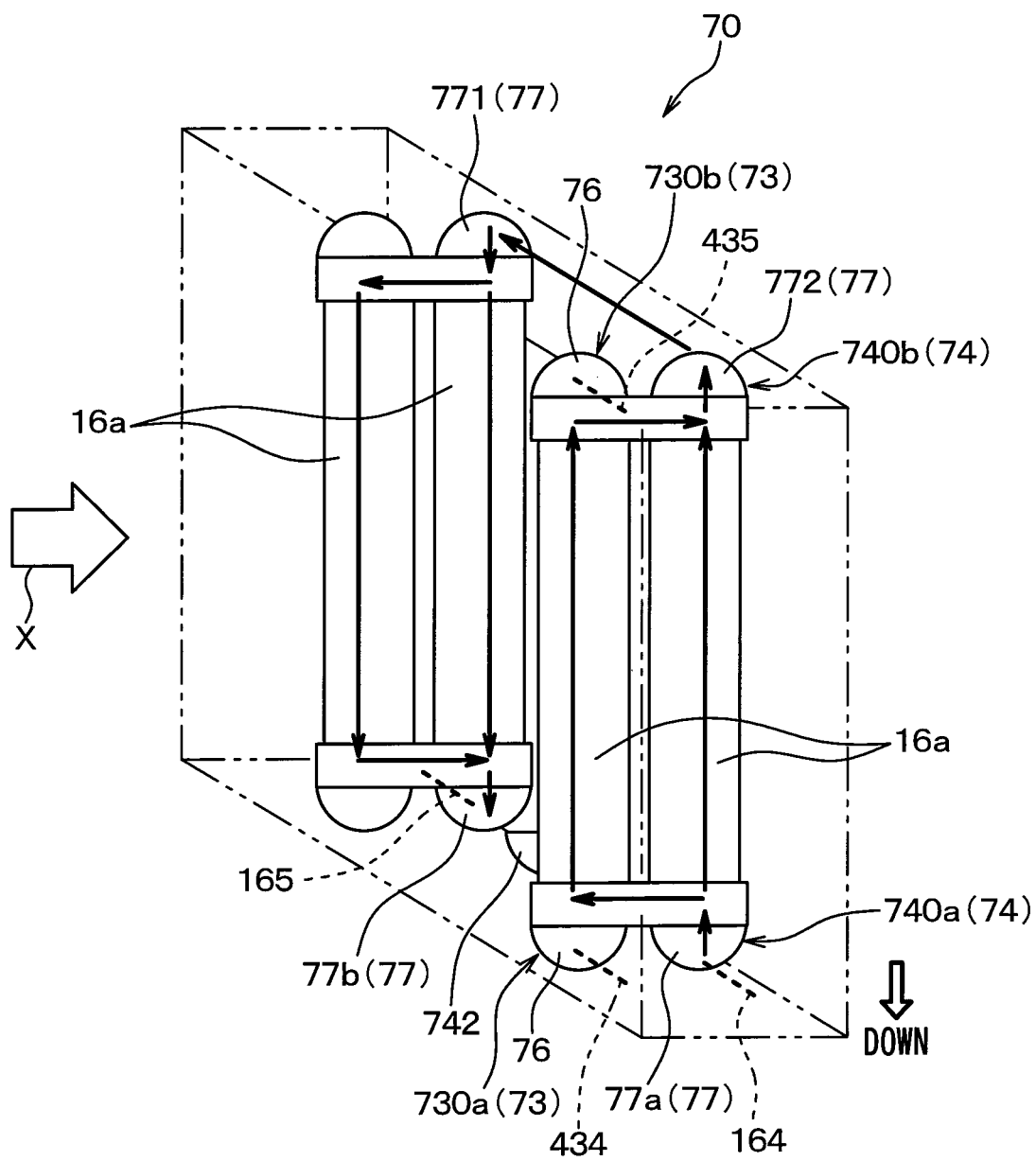
FIG. 27 is a schematic view illustrating a refrigerant flow in a heat exchanger according to a fifteenth embodiment according to the present disclosure.

A fifteenth embodiment is configured to change a flow channel configuration of the heat exchanger 70 in the above-mentioned first and fourteenth embodiments. FIG. 27 is a schematic perspective view illustrating a refrigerant flow in the heat exchanger 70 according to the present embodiment. In FIG. 27, the refrigerant flow within the heat exchanger 70 is indicated by heavy solid arrows, and the same is applied to FIGS. 28 to 35 which will be described later.

As illustrated in FIG. 27, the first upstream tank unit 730a and the first downstream tank unit 740a are arranged on a lower side of the upstream heat exchange portion 71 and the downstream heat exchange portion 72 (refer to FIG. 9, etc.) in a direction of a gravitational force. The same is applied to sixteenth to twenty-sixth embodiments which will be described later.

The downstream partition member 742 that partitions an internal space of the first downstream tank unit 740a into two spaces in the longitudinal direction thereof is arranged in the first downstream tank unit 740a. For that reason, the first refrigerant space 77a and the second refrigerant space 77b arranged in series from the other end side (right side of FIG. 27) of the first downstream tank unit 740a in the longitudinal direction thereof are formed in the first downstream tank unit 740a.

The refrigerant inflow pipe 164 is connected to the first refrigerant space 77a formed in the first downstream tank unit 740a. The refrigerant outflow pipe 165 is connected to the second refrigerant space 77b formed in the first downstream tank unit 740a. Also, both sides of the second downstream tank unit 740b in the longitudinal direction thereof are closed by the respective closing members, and the refrigerant space 77 is formed within the second downstream tank unit 740b.

The refrigerant space 77 formed in the second downstream tank unit 740b is configured to collect the refrigerant from the refrigerant tubes 16a, and also distribute the refrigerant to the refrigerant tubes 16a. Specifically, in the refrigerant space 77 of the second downstream tank unit 740b, a portion connected with the refrigerant tubes 16a which are interposed between the first refrigerant space 77a and that portion functions as the refrigerant space 772 of a refrigerant tube outlet side. At the same time, a portion connected with the refrigerant tubes 16a which are interposed between the second refrigerant space 77b and that portion functions as the refrigerant space 771 of a refrigerant tube inlet side. In short, in the second downstream tank unit 740b, the refrigerant space 771 of the refrigerant tube inlet side and the refrigerant space 772 of the refrigerant tube outlet side are integrated into one refrigerant space 77.

Also, one end side (left side of FIG. 27) of the first upstream tank unit 730a in the longitudinal direction thereof is closed by the closing member whereas the other end side (right side of FIG. 27) thereof in the longitudinal direction is connected with the coolant inflow pipe 434. Also, one end side of the second upstream tank unit 730b in the longitudinal direction thereof is closed by the closing member whereas the other end side thereof in the longitudinal direction is connected with the coolant outflow pipe 435. The coolant space 76 is internally formed in each of the first upstream tank unit 730a and the second upstream tank unit 730b.

With the above configuration, the refrigerant that flows from the refrigerant inflow pipe 164 into the heat exchanger 70 flows from the first refrigerant space 77a formed in the first downstream tank unit 740a into the multiple refrigerant tubes 16a communicated with the first refrigerant space 77a upward in the direction of the gravitational force, as indicated by the heavy solid arrows in FIG. 27. Then, the refrigerant flows from the refrigerant tubes 16a into the refrigerant space 77 formed in the second downstream tank unit 740b, and flows within the refrigerant space 77 from the other end side of the second downstream tank unit 740b in the longitudinal direction toward one end side thereof in the longitudinal direction. Further, the refrigerant flows from the refrigerant space 77 formed in the second downstream tank unit 740b into the multiple refrigerant tubes 16a communicated with the refrigerant space 77 and the second refrigerant space 77b downward in the direction of the gravitational force, and flows from the refrigerant tubes 16a into the second refrigerant space 77b.

Also, the coolant that flows from the coolant inflow pipe 434 into the heat exchanger 70 flows from the coolant space 76 formed in the first upstream tank unit 730a into the multiple coolant tubes 43a communicated with the coolant space 76 upward in the direction of the gravitational force. Then, the coolant flows from the coolant tubes 43a into the coolant space 76 formed in the second upstream tank unit 730b. For the purpose of making FIG. 27 viewable, the coolant flow is not shown, and the same is applied to FIGS. 28 to 35 which will be described later.

Sixteenth Embodiment

Figure 28:
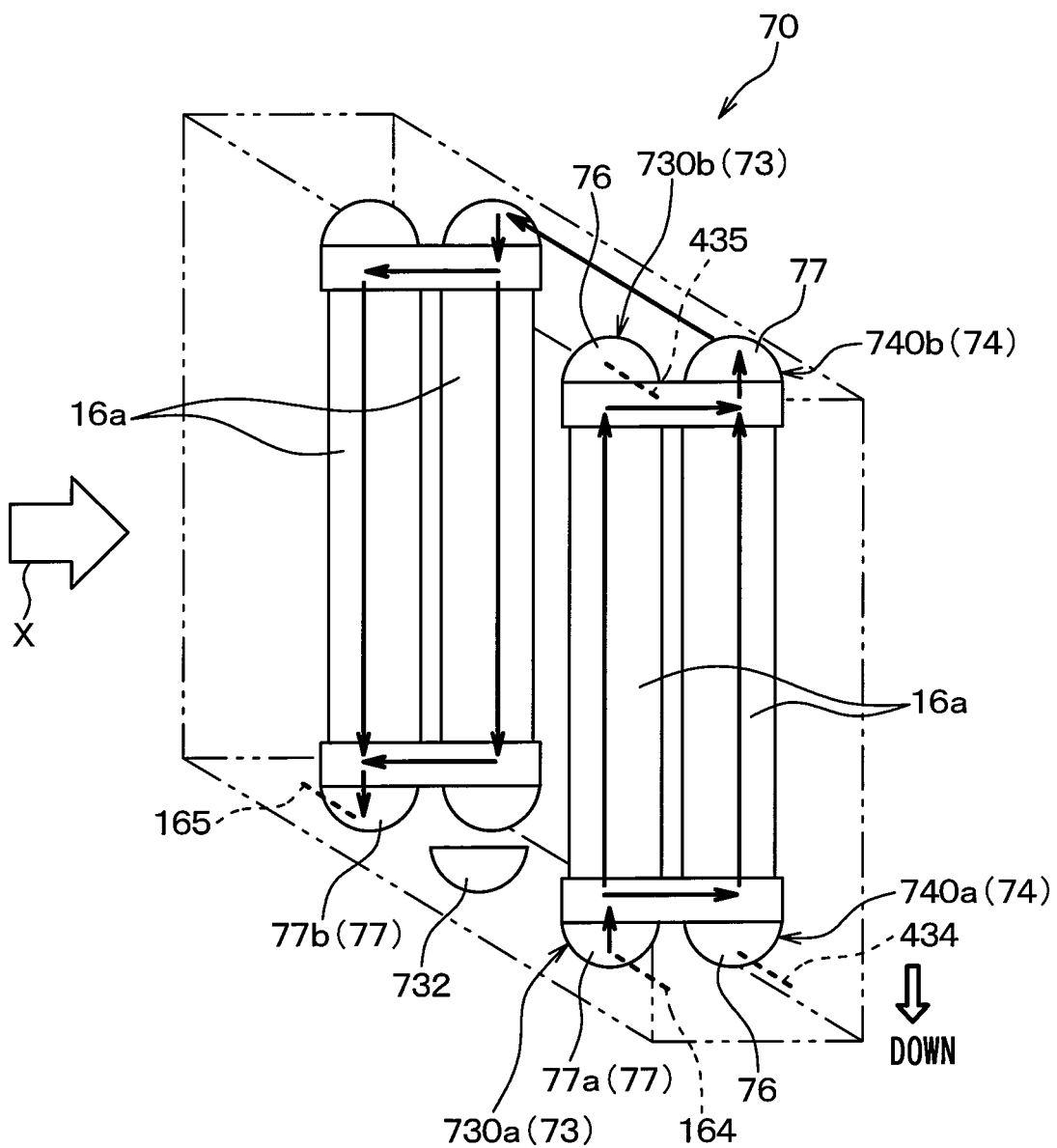
FIG. 28 is a schematic view illustrating a refrigerant flow in a heat exchanger according to a sixteenth embodiment according to the present disclosure.

A sixteenth embodiment is configured to change the flow channel configuration of the heat exchanger 70 in the above-mentioned first, fourteenth, and fifteenth embodiments. FIG. 28 is a schematic perspective view illustrating the refrigerant flow in the heat exchanger 70 according to the present embodiment.

As illustrated in FIG. 28, the upstream partition member 732 that partitions an internal space of the first upstream tank unit 730a into two spaces in the longitudinal direction thereof is arranged in the first upstream tank unit 730a. For that reason, the first refrigerant space 77a and the second refrigerant space 77b arranged in series from the other end side (right side of FIG. 28) of the first upstream tank unit 730a in the longitudinal direction thereof are formed in the first upstream tank unit 730a.

The refrigerant inflow pipe 164 is connected to the first refrigerant space 77a formed in the first upstream tank unit 730a. The refrigerant outflow pipe 165 is connected to the second refrigerant space 77b formed in the first upstream tank unit 730a. Also, both sides of the second downstream tank unit 740b in the longitudinal direction thereof are closed by the respective closing members, and the refrigerant space 77 is formed within the second downstream tank unit 740b.

Also, one end side (left side of FIG. 28) of the first downstream tank unit 740a in the longitudinal direction thereof is closed by the closing member whereas the other end side (right side of FIG. 28) thereof in the longitudinal direction is connected with the coolant inflow pipe 434. Also, one end side of the second upstream tank unit 730b in the longitudinal direction thereof is closed by the closing member whereas the other end side thereof in the longitudinal direction is connected with the coolant outflow pipe 435. The coolant space 76 is internally formed in each of the first downstream tank unit 740a and the second upstream tank unit 730b.

With the above configuration, the refrigerant that flows from the refrigerant inflow pipe 164 into the heat exchanger 70 flows from the first refrigerant space 77a formed in the first upstream tank unit 730a into the multiple refrigerant tubes 16a communicated with the first refrigerant space 77a upward in the direction of the gravitational force, as indicated by the heavy solid arrows in FIG. 28. Then, the refrigerant flows from the refrigerant tubes 16a into the refrigerant space 77 formed in the second downstream tank unit 740b, and flows within the refrigerant space 77 from the other end side of the second downstream tank unit 740b in the longitudinal direction toward one end side thereof in the longitudinal direction. Further, the refrigerant flows from the refrigerant space 77 formed in the second downstream tank unit 740b into the multiple refrigerant tubes 16a communicated with the refrigerant space 77 and the second refrigerant space 77b downward in the direction of the gravitational force, and flows from the refrigerant tubes 16a into the second refrigerant space 77b.

Also, the coolant that flows from the coolant inflow pipe 434 into the heat exchanger 70 flows from the coolant space 76 formed in the first downstream tank unit 740a into the multiple coolant tubes 43a communicated with the coolant space 76 upward in the direction of the gravitational force. Then, the coolant flows from the coolant tubes 43a into the coolant space 76 formed in the second upstream tank unit 730b.

Seventeenth Embodiment

Figure 29:
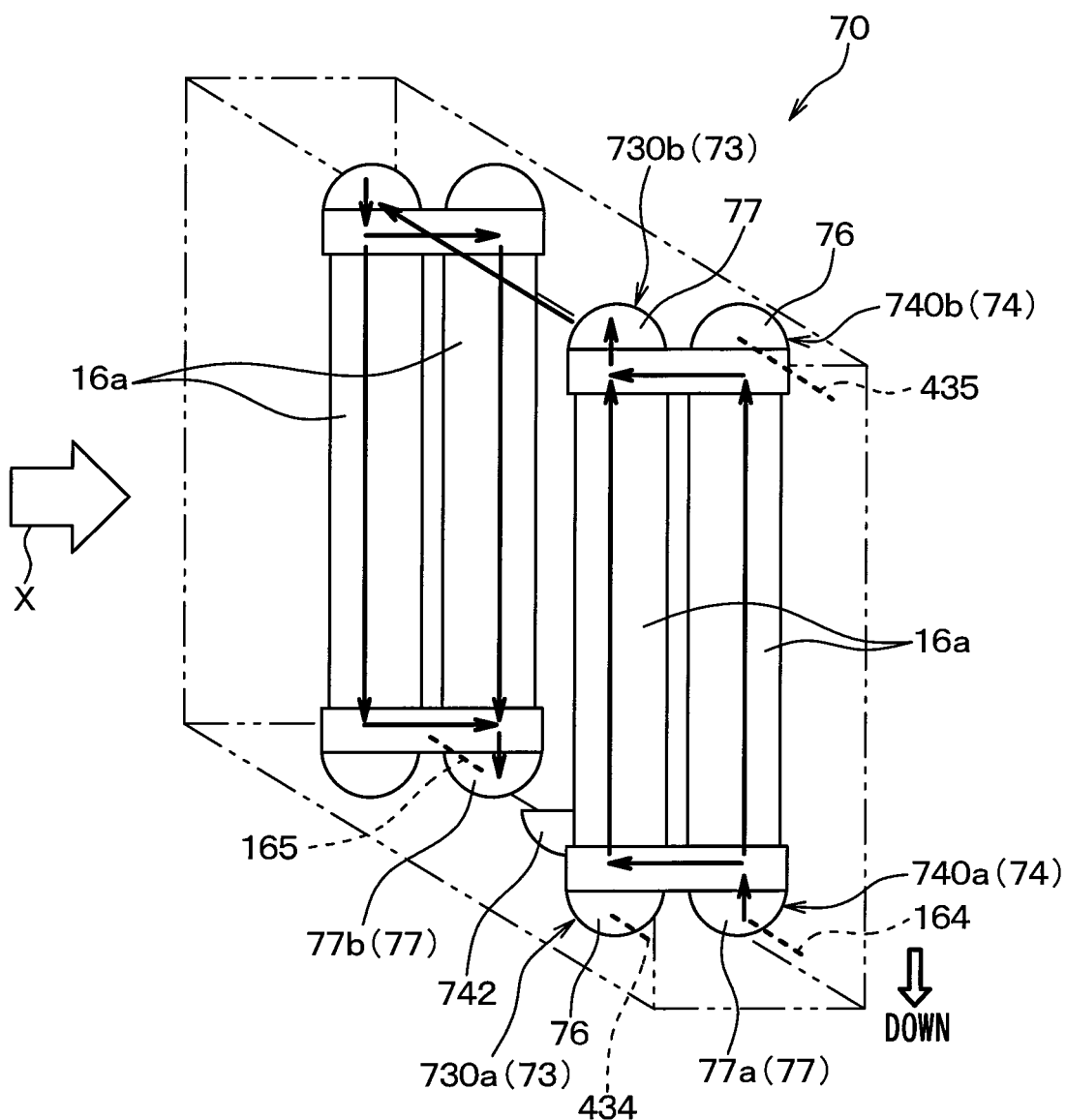
FIG. 29 is a schematic view illustrating a refrigerant flow in a heat exchanger according to a seventeenth embodiment according to the present disclosure.

A seventeenth embodiment is configured to change the flow channel configuration of the heat exchanger 70 in the above-mentioned first, and fourteenth to sixteenth embodiments. FIG. 29 is a schematic perspective view illustrating the refrigerant flow in the heat exchanger 70 according to the present embodiment.

As illustrated in FIG. 29, the downstream partition member 742 that partitions an internal space of the first downstream tank unit 740a into two spaces in the longitudinal direction thereof is arranged in the first downstream tank unit 740a. For that reason, the first refrigerant space 77a and the second refrigerant space 77b arranged in series from the other end side (right side of FIG. 29) of the first downstream tank unit 740a in the longitudinal direction thereof are formed in the first downstream tank unit 740a.

The refrigerant inflow pipe 164 is connected to the first refrigerant space 77a formed in the first downstream tank unit 740a. The refrigerant outflow pipe 165 is connected to the second refrigerant space 77b formed in the first downstream tank unit 740a. Also, both sides of the second upstream tank unit 730b in the longitudinal direction thereof are closed by the respective closing members, and the refrigerant space 77 is formed within the second upstream tank unit 730b.

Also, one end side (left side of FIG. 29) of the first upstream tank unit 730a in the longitudinal direction thereof is closed by the closing member whereas the other end side (right side of FIG. 29) thereof in the longitudinal direction is connected with the coolant inflow pipe 434. Also, one end side of the second downstream tank unit 740b in the longitudinal direction thereof is closed by the closing member whereas the other end side thereof in the longitudinal direction is connected with the coolant outflow pipe 435. The coolant space 76 is internally formed in each of the first upstream tank unit 730a and the second downstream tank unit 740b.

With the above configuration, the refrigerant that flows from the refrigerant inflow pipe 164 into the heat exchanger 70 flows from the first refrigerant space 77a formed in the first downstream tank unit 740a into the multiple refrigerant tubes 16a communicated with the first refrigerant space 77a upward in the direction of the gravitational force, as indicated by the heavy solid arrows in FIG. 29. Then, the refrigerant flows from the refrigerant tubes 16a into the refrigerant space 77 formed in the second upstream tank unit 730b, and flows within the refrigerant space 77 from the other end side of the second upstream tank unit 730b in the longitudinal direction toward one end side thereof in the longitudinal direction. Further, the refrigerant flows from the refrigerant space 77 formed in the second upstream tank unit 730b into the multiple refrigerant tubes 16a communicated with the refrigerant space 77 and the second refrigerant space 77b downward in the direction of the gravitational force, and flows from the refrigerant tubes 16a into the second refrigerant space 77b.

Also, the coolant that flows from the coolant inflow pipe 434 into the heat exchanger 70 flows from the coolant space 76 formed in the first upstream tank unit 730a into the multiple coolant tubes 43a communicated with the coolant space 76 upward in the direction of the gravitational force. Then, the coolant flows from the coolant tubes 43a into the coolant space 76 formed in the second downstream tank unit 740b.

Eighteenth Embodiment

Figure 30:
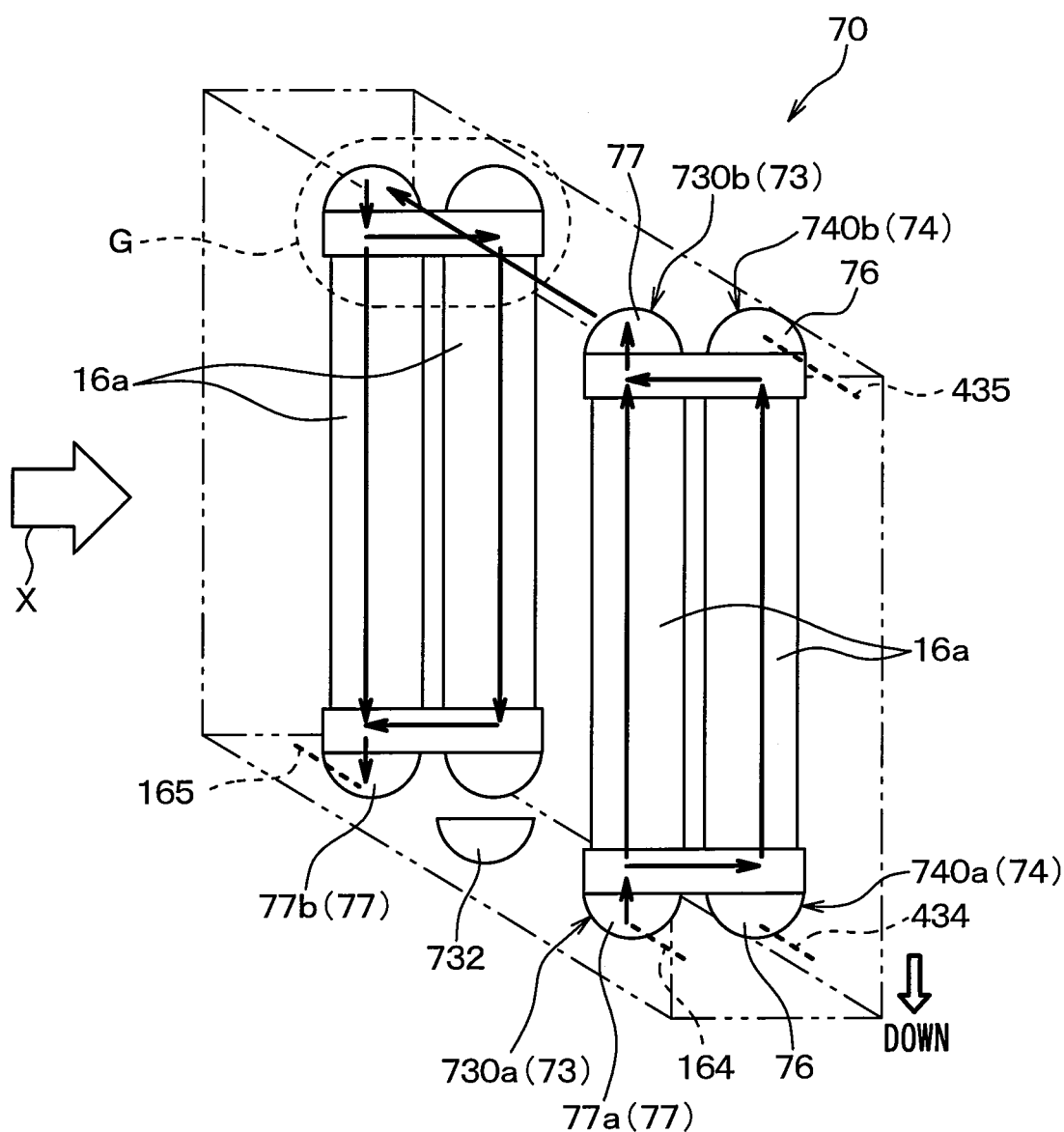
FIG. 30 is a schematic view illustrating a refrigerant flow in a heat exchanger according to an eighteenth embodiment according to the present disclosure.

An eighteenth embodiment is configured to change the flow channel configuration of the heat exchanger 70 in the above-mentioned first, and fourteenth to seventeenth embodiments. FIG. 30 is a schematic perspective view illustrating the refrigerant flow in the heat exchanger 70 according to the present embodiment.

As illustrated in FIG. 30, the upstream partition member 732 that partitions an internal space of the first upstream tank unit 730a into two spaces in the longitudinal direction thereof is arranged in the first upstream tank unit 730a. For that reason, the first refrigerant space 77a and the second refrigerant space 77b arranged in series from the other end side (right side of FIG. 30) of the first upstream tank unit 730a in the longitudinal direction thereof are formed in the first upstream tank unit 730a.

The refrigerant inflow pipe 164 is connected to the first refrigerant space 77a formed in the first upstream tank unit 730a. The refrigerant outflow pipe 165 is connected to the second refrigerant space 77b formed in the first upstream tank unit 730a. Also, both sides of the second upstream tank unit 730b in the longitudinal direction thereof are closed by the respective closing members, and the refrigerant space 77 is formed within the second upstream tank unit 730b.

Also, one end side (left side of FIG. 30) of the first downstream tank unit 740a in the longitudinal direction thereof is closed by the closing member whereas the other end side (right side of FIG. 30) thereof in the longitudinal direction is connected with the coolant inflow pipe 434. Also, one end side of the second downstream tank unit 740b in the longitudinal direction thereof is closed by the closing member whereas the other end side thereof in the longitudinal direction is connected with the coolant outflow pipe 435. The coolant space 76 is internally formed in each of the first downstream tank unit 740a and the second downstream tank unit 740b.

With the above configuration, the refrigerant that flows from the refrigerant inflow pipe 164 into the heat exchanger 70 flows from the first refrigerant space 77a formed in the first upstream tank unit 730a into the multiple refrigerant tubes 16a communicated with the first refrigerant space 77a upward in the direction of the gravitational force, as indicated by the heavy solid arrows in FIG. 30. Then, the refrigerant flows from the refrigerant tubes 16a into the refrigerant space 77 formed in the second upstream tank unit 730b, and flows within the refrigerant space 77 from the other end side of the second upstream tank unit 730b in the longitudinal direction toward one end side thereof in the longitudinal direction. Further, the refrigerant flows from the refrigerant space 77 formed in the second upstream tank unit 730b into the multiple refrigerant tubes 16a communicated with the refrigerant space 77 and the second refrigerant space 77b downward in the direction of the gravitational force, and flows from the refrigerant tubes 16a into the second refrigerant space 77b.

Also, the coolant that flows from the coolant inflow pipe 434 into the heat exchanger 70 flows from the coolant space 76 formed in the first downstream tank unit 740a into the multiple coolant tubes 43a communicated with the coolant space 76 upward in the direction of the gravitational force. Then, the coolant flows from the coolant tubes 43a into the coolant space 76 formed in the second downstream tank unit 740b.

Nineteenth Embodiment

Figure 31:
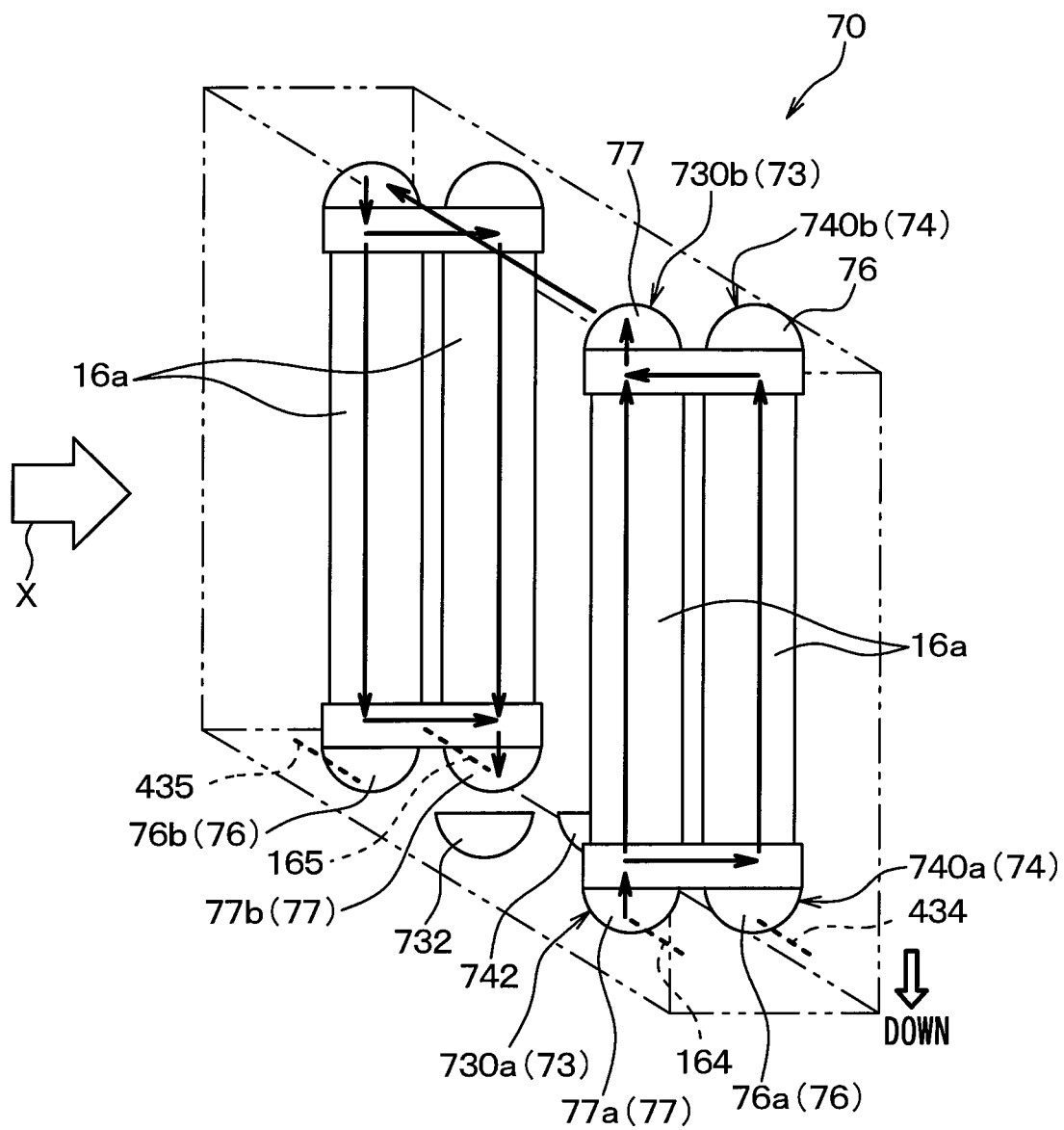
FIG. 31 is a schematic view illustrating a refrigerant flow in a heat exchanger according to a nineteenth embodiment according to the present disclosure.

A nineteenth embodiment is configured to change the flow channel configuration of the heat exchanger 70 in the above-mentioned first, and fourteenth to eighteenth embodiments. FIG. 31 is a schematic perspective view illustrating the refrigerant flow in the heat exchanger 70 according to the present embodiment.

As illustrated in FIG. 31, the upstream partition member 732 that partitions an internal space of the first upstream tank unit 730a into two spaces in the longitudinal direction thereof is arranged in the first upstream tank unit 730a. For that reason, the first refrigerant space 77a and the second coolant space 76b arranged in series from the other end side (right side of FIG. 31) of the first upstream tank unit 730a in the longitudinal direction thereof are formed in the first upstream tank unit 730a.

Also, the downstream partition member 742 that partitions an internal space of the first downstream tank unit 740a into two spaces in the longitudinal direction thereof is arranged in the first downstream tank unit 740a. For that reason, the first coolant space 76a and the second refrigerant space 77b arranged in series from the other end side of the first downstream tank unit 740a in the longitudinal direction thereof are formed in the first downstream tank unit 740a.

The refrigerant inflow pipe 164 is connected to the first refrigerant space 77a formed in the first upstream tank unit 730a. The refrigerant outflow pipe 165 is connected to the second refrigerant space 77b formed in the first downstream tank unit 740a. Also, both sides of the second upstream tank unit 730b in the longitudinal direction thereof are closed by the respective closing members, and the refrigerant space 77 is formed within the second upstream tank unit 730b.

Also, the coolant inflow pipe 434 is connected to the first coolant space 76a formed in the first downstream tank unit 740a. The coolant outflow pipe 435 is connected to the second coolant space 76b formed in the first upstream tank unit 730a. Also, both sides of the second downstream tank unit 740b in the longitudinal direction thereof are closed by the respective closing members, and the coolant space 76 is formed within the second downstream tank unit 740b.

With the above configuration, the refrigerant that flows from the refrigerant inflow pipe 164 into the heat exchanger 70 flows from the first refrigerant space 77a formed in the first upstream tank unit 730a into the multiple refrigerant tubes 16a communicated with the first refrigerant space 77a upward in the direction of the gravitational force, as indicated by the heavy solid arrows in FIG. 31. Then, the refrigerant flows from the refrigerant tubes 16a into the refrigerant space 77 formed in the second upstream tank unit 730b, and flows within the refrigerant space 77 from the other end side of the second upstream tank unit 730b in the longitudinal direction toward one end side thereof in the longitudinal direction. Further, the refrigerant flows from the refrigerant space 77 formed in the second upstream tank unit 730b into the multiple refrigerant tubes 16a communicated with the refrigerant space 77 and the second refrigerant space 77b downward in the direction of the gravitational force, and flows from the refrigerant tubes 16a into the second refrigerant space 77b.

Also, the coolant that flows from the coolant inflow pipe 434 into the heat exchanger 70 flows from the first coolant space 76a formed in the first downstream tank unit 740a into the multiple coolant tubes 43a communicated with the first coolant space 76a upward in the direction of the gravitational force. Then, the coolant flows from the coolant tubes 43a into the coolant space 76 formed in the second downstream tank unit 740b, and flows within the coolant space 76 from the other end side of the second downstream tank unit 740b in the longitudinal direction thereof toward one end side thereof in the longitudinal direction. Further, the coolant flows from the coolant space 76 formed in the second downstream tank unit 740b into the multiple coolant tubes 43a communicated with the coolant space 76 and the second coolant space 76b downward in the direction of the gravitational force, and flows from the coolant tubes 43a into the second coolant space 76b.

Twentieth Embodiment

Figure 32:
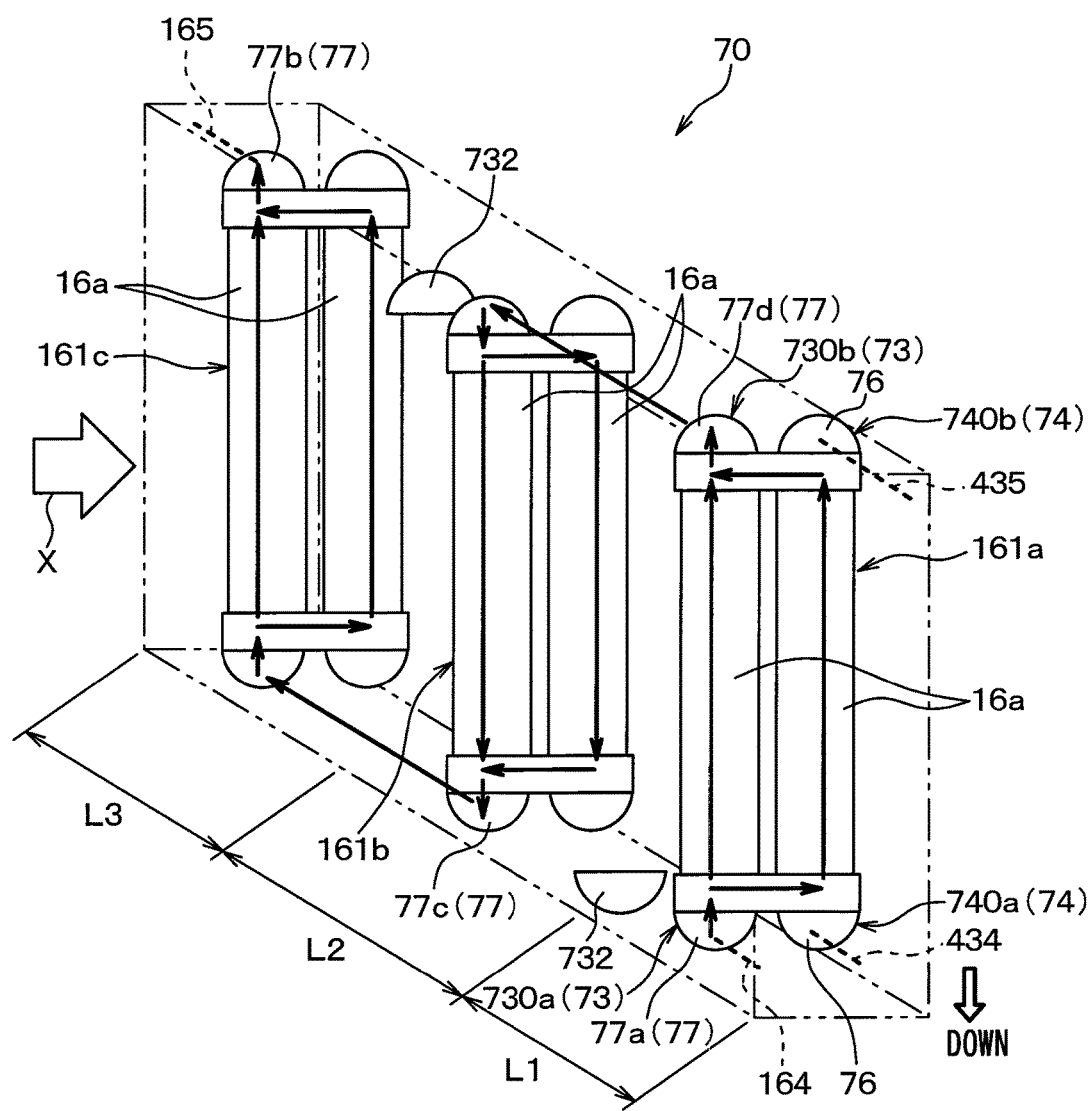
FIG. 32 is a schematic view illustrating a refrigerant flow in a heat exchanger according to a twentieth embodiment according to the present disclosure.

A twentieth embodiment is configured to change the flow channel configuration of the heat exchanger 70 in the above-mentioned first, and fourteenth to nineteenth embodiments. FIG. 32 is a schematic perspective view illustrating the refrigerant flow in the heat exchanger 70 according to the present embodiment.

As illustrated in FIG. 32, the upstream partition member 732 that partitions an internal space of the first upstream tank unit 730a into two spaces in the longitudinal direction thereof is arranged in the first upstream tank unit 730a. For that reason, the first refrigerant space 77a and a third refrigerant space 77c arranged in series from the other end side (right side of FIG. 32) of the first upstream tank unit 730a in the longitudinal direction thereof are formed in the first upstream tank unit 730a.

Also, the upstream partition member 732 that partitions an internal space of the second upstream tank unit 730b into two spaces in the longitudinal direction thereof is arranged in the second upstream tank unit 730b. For that reason, a fourth refrigerant space 77d and the second refrigerant space 77b arranged in series from the other end side of the second upstream tank unit 730b in the longitudinal direction thereof are formed in the second upstream tank unit 730b.

Also, the upstream partition member 732 installed in the second upstream tank unit 730b is arranged closer to one end side (left side of FIG. 32) of the second upstream tank unit 730b in the longitudinal direction thereof than the upstream partition member 732 installed in the first upstream tank unit 730a. For that reason, in the longitudinal direction of the second upstream tank unit 730b, that is, the stacking direction of the refrigerant tube 16a, the refrigerant tubes 16a arranged between the upstream partition member 732 installed in the second upstream tank unit 730b and the upstream partition member 732 installed in the first upstream tank unit 730a are communicated to both the third refrigerant space 77c and the fourth refrigerant space 77d.

The refrigerant inflow pipe 164 is connected to the first refrigerant space 77a formed in the first upstream tank unit 730a. The refrigerant outflow pipe 165 is connected to the second refrigerant space 77b formed in the second upstream tank unit 730b. Also, one end side of the first upstream tank unit 730a in the longitudinal direction thereof is closed by the closing member, and the other end side of the second upstream tank unit 730b in the longitudinal direction thereof is closed by the closing member.

Also, one end side of the first downstream tank unit 740a in the longitudinal direction thereof is closed by the closing member whereas the other end side thereof in the longitudinal direction is connected to the coolant inflow pipe 434. Also, one end side of the second downstream tank unit 740b in the longitudinal direction thereof is closed by the closing member whereas the other end side thereof in the longitudinal direction is connected to the coolant outflow pipe 435. The coolant space 76 is internally formed in each of the first downstream tank unit 740a and the second downstream tank unit 740b.

With the above configuration, the refrigerant that flows from the refrigerant inflow pipe 164 into the heat exchanger 70 flows from the first refrigerant space 77a formed in the first upstream tank unit 730a into the multiple refrigerant tubes 16a communicated with the first refrigerant space 77a upward in the direction of the gravitational force, as indicated by the heavy solid arrows in FIG. 32. Then, the refrigerant flows from the refrigerant tubes 16a into the fourth refrigerant space 77d formed in the second upstream tank unit 730b, and flows within the fourth refrigerant space 77d from the other end side of the second upstream tank unit 730b in the longitudinal direction toward one end side thereof in the longitudinal direction. Then, the refrigerant flows from the fourth refrigerant space 77d into the multiple refrigerant tubes 16a communicated with the fourth refrigerant space 77d and the third refrigerant space 77c downward in the direction of the gravitational force, and flows from the refrigerant tubes 16a into the third refrigerant space 77c. Then, the refrigerant flows within the third refrigerant space 77c from the other end side of the first upstream tank unit 730a in the longitudinal direction thereof toward one end side thereof in the longitudinal direction, and flows within the multiple refrigerant tubes 16a communicated with the third refrigerant space 77c and the second refrigerant space 77b upward in the direction of the gravitational force. Further, the refrigerant flows from the refrigerant tubes 16a into the second refrigerant space 77b.

Also, the coolant that flows from the coolant inflow pipe 434 into the heat exchanger 70 flows from the coolant space 76 formed in the first downstream tank unit 740a into the multiple coolant tubes 43a communicated with the coolant space 76 upward in the direction of the gravitational force. Then, the refrigerant flows from the coolant tubes 43a into the coolant space 76 formed in the second downstream tank unit 740b.

As illustrated in FIG. 32, the heat exchanger 70 is configured to have three refrigerant paths 161a, 161b, and 161c (first fluid path) having the multiple refrigerant tubes 16a interposed between the paired refrigerant spaces 77 (including 77a, 77b, 77c, and 77d) in a circulation channel of the refrigerant. Specifically, the first refrigerant path 161a is configured by the multiple refrigerant tubes 16a that is interposed between the first refrigerant space 77a and the fourth refrigerant space 77d, and connected to both the first refrigerant space 77a and the fourth refrigerant space 77d.

Also, the second refrigerant path 161b is configured by the multiple refrigerant tubes 16a that is interposed between the fourth refrigerant space 77d and the third refrigerant space 77c, and connected to both the fourth refrigerant space 77d and the third refrigerant space 77c. Also, the third refrigerant path 161c is configured by the multiple refrigerant tubes 16a that is interposed between the third refrigerant space 77c and the second refrigerant space 77b, and connected to both the third refrigerant space 77c and the second refrigerant space 77b.

Then, the first refrigerant path 161a, the second refrigerant path 161b, and the third refrigerant path 161c are coupled in series with each other through the refrigerant space 77 in the circulation channel of the refrigerant (refrigerant circulation passage), as indicated by solid arrows in FIG. 32. Further, the refrigerant flows upward in the first refrigerant path 161a, flows downward in the second refrigerant path 161b, and flows upward in the third refrigerant path 161c. In short, the first refrigerant path 161a, the second refrigerant path 161b, and the third refrigerant path 161c allow the refrigerant to flow in an opposite direction to the adjacent other refrigerant path in the refrigerant circulation channel, in the direction of the gravitational force. As is understood from FIG. 32, the adjacent other refrigerant path in the refrigerant circulation channel device means the adjacent other refrigerant path in the stacking direction of the refrigerant tubes 16a.

For example, the first refrigerant path 161a allows the refrigerant to flow in the opposite direction to the other refrigerant path adjacent to the first refrigerant path 161a, that is, the second refrigerant path 161b in the refrigerant circulation channel in the direction of the gravitational force. Also, the second refrigerant path 161b allows the refrigerant to flow in the opposite direction to the other refrigerant paths adjacent to the second refrigerant path 161b, that is, the first refrigerant path 161a and the third refrigerant path 161c in the refrigerant circulation channel in the direction of the gravitational force. Further, the third refrigerant path 161c allows the refrigerant to flow in the opposite direction to the other refrigerant path adjacent to the third refrigerant path 161c, that is, the second refrigerant path 161b in the refrigerant circulation channel in the direction of the gravitational force.

Also, as illustrated in FIG. 32, the first refrigerant path 161a and the third refrigerant path 161c are upward flow refrigerant paths (upward flow first fluid path) in which the refrigerant flows toward the upper side (upward) in the direction of the gravitational force. In the stacking direction of the refrigerant tubes 16a, a tube stack width L1 of the refrigerant tubes 16a configuring the first refrigerant path 161a is smaller than a tube stack width L2 of the refrigerant tubes 16a configuring the adjacent second refrigerant path 161b in the refrigerant circulation channel (L2>L1).

Also, a tube stack width L3 of the refrigerant tubes 16a configuring the third refrigerant path 161c is also smaller than the tube stack width L2 of the adjacent second refrigerant path 161b in the refrigerant circulation channel (L3<L2). That is, even if attention is paid to any upward flow refrigerant path of the first refrigerant path 161a and the third refrigerant path 161c, the tube stack width of the refrigerant tubes 16a in the upward flow refrigerant path is smaller than that of any refrigerant path (second refrigerant path 161b) adjacent to the upward flow refrigerant path in the refrigerant circulation channel. The tube stack widths L1, L2, and L3 become larger as the tube stacking numbers of the refrigerant tubes 16a configuring the respective refrigerant paths 161a, 161b, and 161c are larger, and those tube stacking numbers, and the tube stack widths L1, L2, L3 have a one-on-one relationship with each other.

When the respective tube stack widths L1, L2, and L3 are thus set, the flow channels of the refrigerant in the first refrigerant path 161a and the third refrigerant path 161c are narrower than the refrigerant flow channel of the second refrigerant path 161b as the tube stack widths L1 and L3 are smaller. For that reason, a flow rate of the upward flow of the refrigerant that flows upward in the direction of the gravitational force within the refrigerant tubes 16a becomes high, and the refrigerant can be swiftly moved up against, for example, the own weight of a liquid component included in the refrigerant. As a result, the refrigerant is likely to evenly flow into the respective refrigerant tubes 16a. In particular, when the heat exchanger 70 functions as, for example, a condenser, since the refrigerant within the refrigerant tubes 16a is high in pressure, and low in flow rate, this advantage is remarkable.

Twenty-First Embodiment

Figure 33:
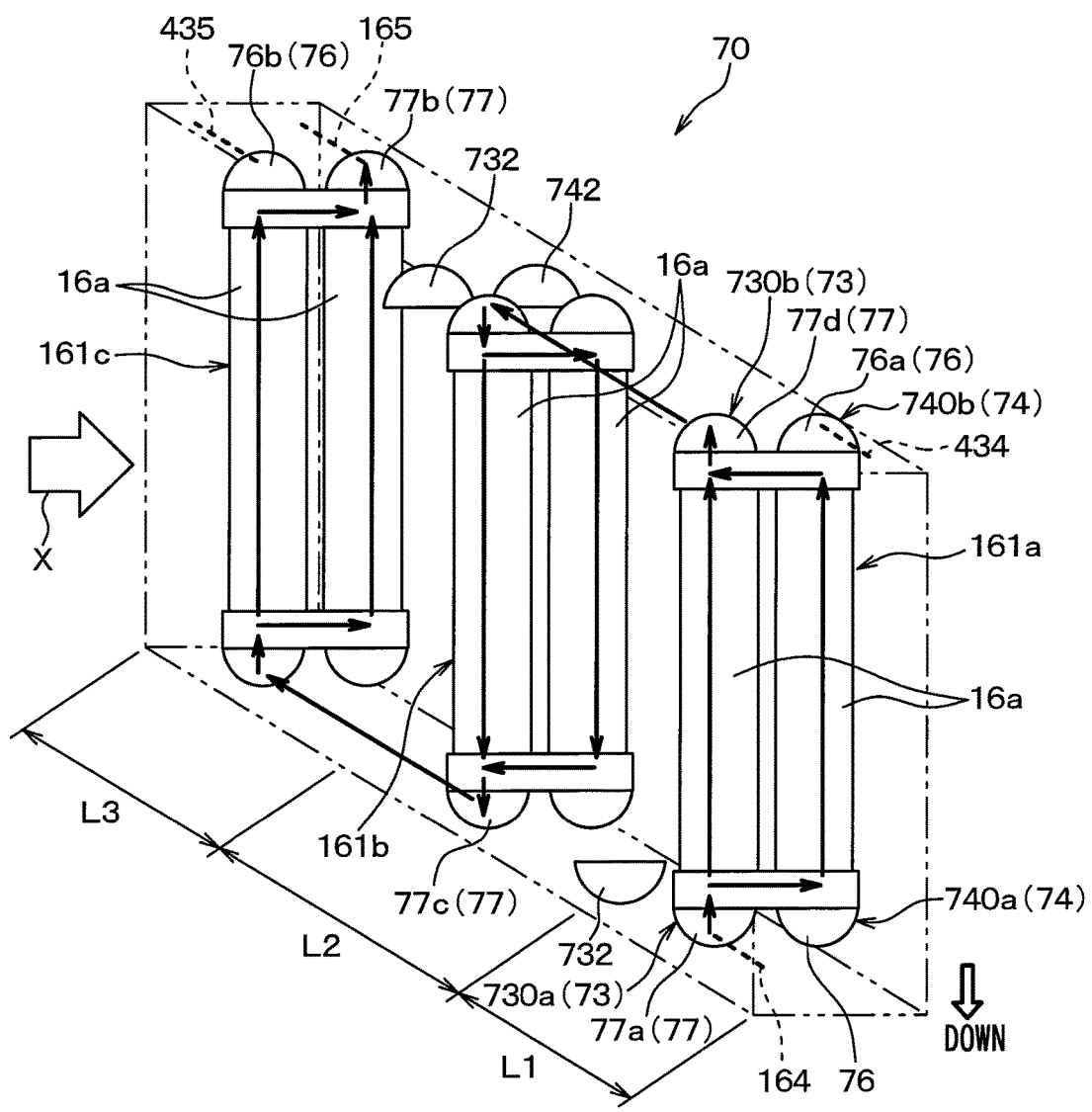
FIG. 33 is a schematic view illustrating a refrigerant flow in a heat exchanger according to a twenty-first embodiment according to the present disclosure.

A twenty-first embodiment is configured to change the flow channel configuration of the heat exchanger 70 in the above-mentioned first, and fourteenth to twentieth embodiments. FIG. 33 is a schematic perspective view illustrating the refrigerant flow in the heat exchanger 70 according to the present embodiment.

As illustrated in FIG. 33, the upstream partition member 732 that partitions an internal space of the first upstream tank unit 730a into two spaces in the longitudinal direction thereof is arranged in the first upstream tank unit 730a. For that reason, the first refrigerant space 77a and the third refrigerant space 77c arranged in series from the other end side (right side of FIG. 33) of the first upstream tank unit 730a in the longitudinal direction thereof are formed in the first upstream tank unit 730a.

Also, the upstream partition member 732 that partitions an internal space of the second upstream tank unit 730b into two spaces in the longitudinal direction thereof is arranged in the second upstream tank unit 730b. For that reason, the fourth refrigerant space 77d and the second coolant space 76b arranged in series from the other end side of the second upstream tank unit 730b in the longitudinal direction thereof are formed in the second upstream tank unit 730b.

Also, the downstream partition member 742 that partitions an internal space of the second downstream tank unit 740b into two spaces in the longitudinal direction thereof is arranged in the second downstream tank unit 740b. For that reason, the first coolant space 76a and the second refrigerant space 77b arranged in series from the other end side of the second downstream tank unit 740b in the longitudinal direction thereof are formed in the second downstream tank unit 740b. Also, the coolant space 76 is formed in the first downstream tank unit 740a.

Also, the respective upstream partition members 732 installed in the first upstream tank unit 730a and the second upstream tank unit 730b illustrated in FIG. 33 are arranged at the same position as that in FIG. 32 described above. Also, the downstream partition member 742 installed in the second downstream tank unit 740b is arranged at the same position as that of the upstream partition member 732 installed in the second upstream tank unit 730b in the stacking direction of the refrigerant tubes 16a.

The refrigerant inflow pipe 164 is connected to the first refrigerant space 77a, and the refrigerant outflow pipe 165 is connected to the second refrigerant space 77b. Also, the coolant inflow pipe 434 is connected to the first coolant space 76a, and the coolant outflow pipe 435 is connected to the second coolant space 76b. Further, one end side of the first upstream tank unit 730a in the longitudinal direction thereof, the other end side of the second upstream tank unit 730b in the longitudinal direction thereof, and both ends of the first downstream tank unit 740a in the longitudinal direction thereof are closed by the respective closing members.

With the above configuration, the refrigerant that flows from the refrigerant inflow pipe 164 into the heat exchanger 70 flows from the first refrigerant space 77a into the multiple refrigerant tubes 16a communicated with the first refrigerant space 77a upward in the direction of the gravitational force, as indicated by the heavy solid arrows in FIG. 33. Then, the refrigerant flows from the refrigerant tubes 16a into the fourth refrigerant space 77d, and flows within the fourth refrigerant space 77d from the other end side of the second upstream tank unit 730b in the longitudinal direction toward one end side thereof in the longitudinal direction. Then, the refrigerant flows from the fourth refrigerant space 77d into the multiple refrigerant tubes 16a communicated with the fourth refrigerant space 77d and the third refrigerant space 77c downward in the direction of the gravitational force, and flows from the refrigerant tubes 16a into the third refrigerant space 77c. Then, the refrigerant flows within the third refrigerant space 77c from the other end side of the first upstream tank unit 730a in the longitudinal direction thereof toward one end side thereof in the longitudinal direction, and flows within the multiple refrigerant tubes 16a communicated with the third refrigerant space 77c and the second refrigerant space 77b upward in the direction of the gravitational force. Further, the refrigerant flows from the refrigerant tubes 16a into the second refrigerant space 77b.

Also, the coolant that flows from the coolant inflow pipe 434 into the heat exchanger 70 flows from the first coolant space 76a into the multiple coolant tubes 43a communicated with the first coolant space 76a downward in the direction of the gravitational force. Then, the refrigerant flows from the coolant tubes 43a into the coolant space 76 formed in the first downstream tank unit 740a, and flows within the coolant space 76 from the other end side of the first downstream tank unit 740a in the longitudinal direction thereof toward one end side thereof in the longitudinal direction. Then, the coolant flows from the coolant space 76 formed in the first downstream tank unit 740a into the multiple coolant tubes 43a communicated with the coolant space 76 and the second coolant space 76b upward in the direction of the gravitational force, and flows from the coolant tubes 43a into the second coolant space 76b.

The heat exchanger 70 in FIG. 33 is configured to have the first refrigerant path 161a, the second refrigerant path 161b, and the third refrigerant path 161c as in FIG. 32 described above. For example, the first refrigerant path 161a and the third refrigerant path 161c are upward flow refrigerant paths. Then, the tube stack width L1 of the first refrigerant path 161a is smaller than the tube stack width L2 of the adjacent second refrigerant path 161b (L2>L1), and the tube stack width L3 of the third refrigerant path 161c is also smaller than the tube stack width L2 of the second refrigerant path 161b (L3<L2). Therefore, even in the present embodiment, the same advantages as those in the above-mentioned twentieth embodiment are obtained.

Twenty-Second Embodiment

Figure 34:
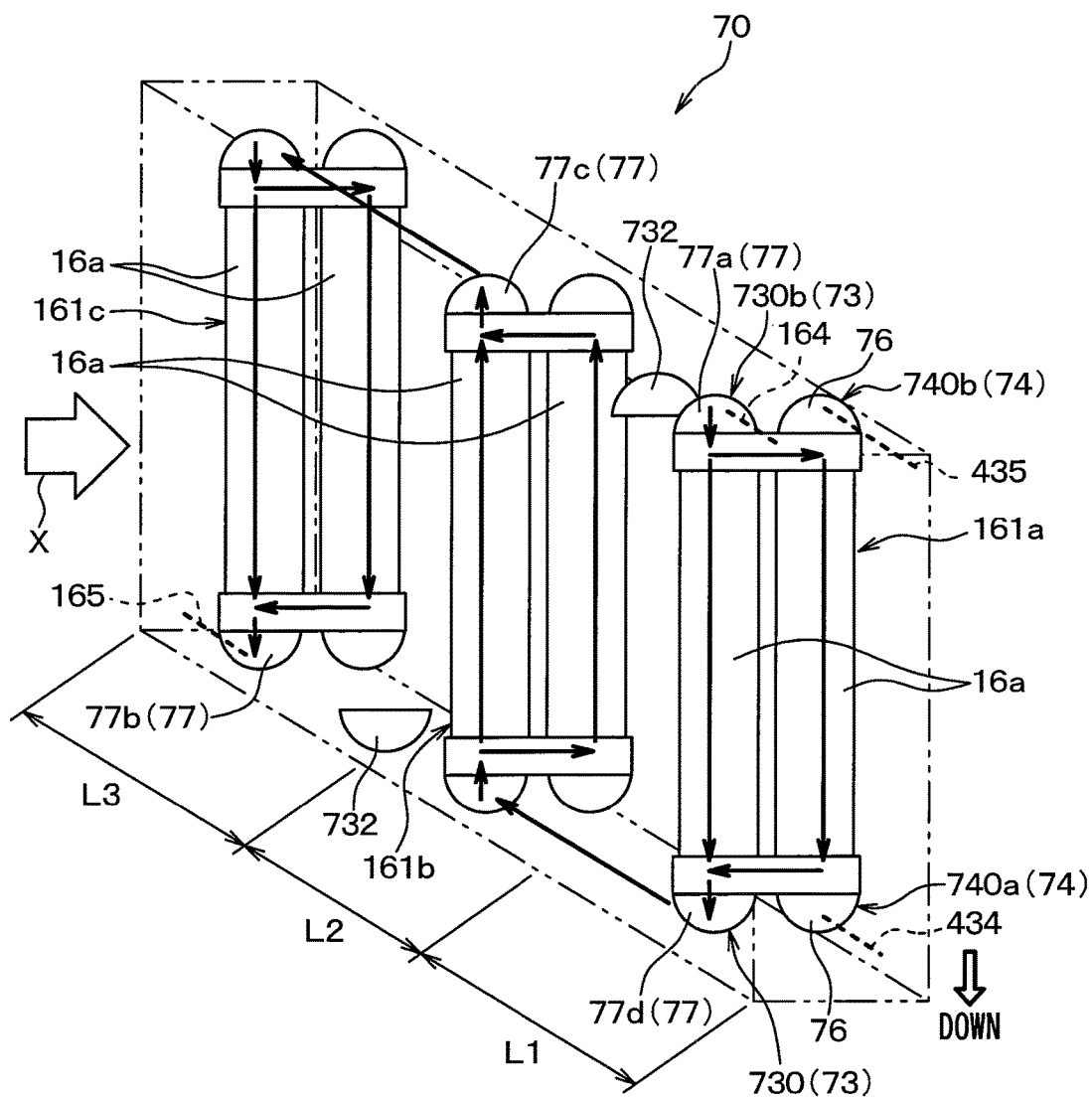
FIG. 34 is a schematic view illustrating a refrigerant flow in a heat exchanger according to a twenty-second embodiment according to the present disclosure.

A twenty-second embodiment is configured to change the flow channel configuration of the heat exchanger 70 in the above-mentioned first, and fourteenth to twenty-first embodiments. FIG. 34 is a schematic perspective view illustrating the refrigerant flow in the heat exchanger 70 according to the present embodiment.

As illustrated in FIG. 34, the upstream partition member 732 that partitions an internal space of the second upstream tank unit 730b into two spaces in the longitudinal direction thereof is arranged in the second upstream tank unit 730b. For that reason, the first refrigerant space 77a and the third refrigerant space 77c arranged in series from the other end side (right side of FIG. 34) of the second upstream tank unit 730b in the longitudinal direction thereof are formed in the second upstream tank unit 730b.

Also, the upstream partition member 732 that partitions an internal space of the first upstream tank unit 730a into two spaces in the longitudinal direction thereof is arranged in the first upstream tank unit 730a. For that reason, the fourth refrigerant space 77d and the second coolant space 76b arranged in series from the other end side of the first upstream tank unit 730a in the longitudinal direction thereof are formed in the first upstream tank unit 730a.

Also, the coolant space 76 is formed in each of the first downstream tank unit 740a and the second downstream tank unit 740b.

Also, the upstream partition member 732 installed in the second upstream tank unit 730b is arranged closer to the other end side (right side of FIG. 32) of the second upstream tank unit 730b in the longitudinal direction thereof than the upstream partition member 732 installed in the first upstream tank unit 730a.

The refrigerant inflow pipe 164 is connected to the first refrigerant space 77a, and the refrigerant outflow pipe 165 is connected to the second refrigerant space 77b. Also, the coolant inflow pipe 434 is connected to the coolant space 76 formed in the first downstream tank unit 740a. The coolant outflow pipe 435 is connected to the coolant space 76 formed in the second downstream tank unit 740b. Also, the other end side of the first upstream tank unit 730a in the longitudinal direction thereof, one end side of the second upstream tank unit 730b in the longitudinal direction, one end side of the first downstream tank unit 740a in the longitudinal direction, and one end side of the second downstream tank unit 740b in the longitudinal direction are closed by the respective closing members.

With the above configuration, the refrigerant that flows from the refrigerant inflow pipe 164 into the heat exchanger 70 flows from the first refrigerant space 77a into the multiple refrigerant tubes 16a communicated with the first refrigerant space 77a downward in the direction of the gravitational force, as indicated by the heavy solid arrows in FIG. 34. Then, the refrigerant flows from the refrigerant tubes 16a into the fourth refrigerant space 77d, and flows within the fourth refrigerant space 77d from the other end side of the first upstream tank unit 730a in the longitudinal direction toward one end side thereof in the longitudinal direction. Then, the refrigerant flows from the fourth refrigerant space 77d into the multiple refrigerant tubes 16a communicated with the fourth refrigerant space 77d and the third refrigerant space 77c upward in the direction of the gravitational force, and flows from the refrigerant tubes 16a into the third refrigerant space 77c. Then, the refrigerant flows within the third refrigerant space 77c from the other end side of the second upstream tank unit 730b in the longitudinal direction thereof toward one end side thereof in the longitudinal direction, and flows within the multiple refrigerant tubes 16a communicated with the third refrigerant space 77c and the second refrigerant space 77b downward in the direction of the gravitational force. Further, the refrigerant flows from the refrigerant tubes 16a into the second refrigerant space 77b.

Also, the coolant that flows from the coolant inflow pipe 434 into the heat exchanger 70 flows from the coolant space 76 formed in the first downstream tank unit 740a into the multiple coolant tubes 43a communicated with the coolant space 76 upward in the direction of the gravitational force. Then, the coolant flows from the coolant tubes 43a into the coolant space 76 formed in the second downstream tank unit 740b.

The heat exchanger 70 in FIG. 34 is configured to have the first refrigerant path 161a, the second refrigerant path 161b, and the third refrigerant path 161c as in FIG. 32 described above. However, the flow directions of the refrigerant in those refrigerant paths 161a, 161b, and 161c, and the respective tube stack widths L1, L2, and L3 are different from each other.

Specifically, in the heat exchanger 70 of FIG. 34, the second refrigerant path 161b is the upward flow refrigerant path whereas the first refrigerant path 161a and the third refrigerant path 161c do not correspond to the upward flow refrigerant path. Also, the tube stack width L2 of the second refrigerant path 161b is smaller than each of the tube stack width L1 of the first refrigerant path 161a and the tube stack width L3 of the third refrigerant path 161c (L1>L2, L3>L2). That is, in the tube stack width of the refrigerant tubes 16a, the second refrigerant path 161b, which is the upward flow refrigerant path, is smaller than any refrigerant paths (first refrigerant path 161a and third refrigerant path 161c) adjacent to the second refrigerant path 161b in the refrigerant circulation channel. Therefore, also in the present embodiment, the same advantages as those in the above-mentioned twentieth embodiment are obtained.

Twenty-Third Embodiment

Figure 35:
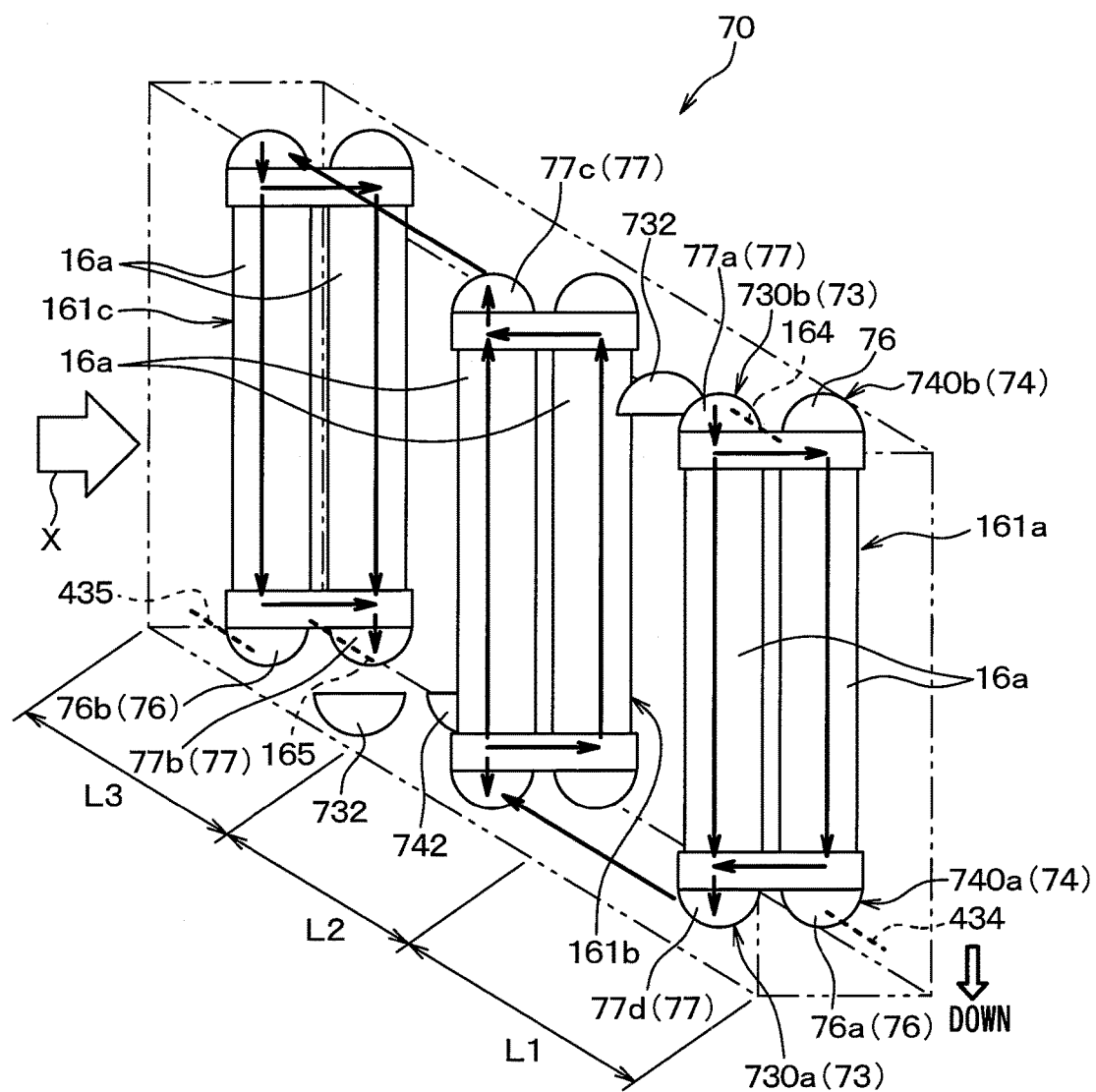
FIG. 35 is a schematic view illustrating a refrigerant flow in a heat exchanger according to a twenty-third embodiment according to the present disclosure.

A twenty-third embodiment is configured to change the flow channel configuration of the heat exchanger 70 in the above-mentioned first, and fourteenth to twenty-second embodiments. FIG. 35 is a schematic perspective view illustrating the refrigerant flow in the heat exchanger 70 according to the present embodiment.

As illustrated in FIG. 35, the upstream partition member 732 that partitions an internal space of the second upstream tank unit 730b into two spaces in the longitudinal direction thereof is arranged in the second upstream tank unit 730b. For that reason, the first refrigerant space 77a and the third refrigerant space 77c arranged in series from the other end side (right side of FIG. 35) of the second upstream tank unit 730b in the longitudinal direction thereof are formed in the second upstream tank unit 730b.

Also, the upstream partition member 732 that partitions an internal space of the first upstream tank unit 730a into two spaces in the longitudinal direction thereof is arranged in the first upstream tank unit 730a. For that reason, the fourth refrigerant space 77d and the second coolant space 76b arranged in series from the other end side of the first upstream tank unit 730a in the longitudinal direction thereof are formed in the first upstream tank unit 730a.

Also, the downstream partition member 742 that partitions an internal space of the first downstream tank unit 740a into two spaces in the longitudinal direction thereof is arranged in the first downstream tank unit 740a. For that reason, the first coolant space 76a and the second refrigerant space 77b arranged in series from the other end side of the first downstream tank unit 740a in the longitudinal direction thereof are formed in the first downstream tank unit 740*a*. Also, the coolant space 76 is formed in the second downstream tank unit 740*b*.

Also, the respective upstream partition members 732 installed in the first upstream tank unit 730*a* and the second upstream tank unit 730*b* illustrated in FIG. 35 are arranged at the same position as that in FIG. 34 described above. Also, the downstream partition member 742 installed in the first downstream tank unit 740*a* is arranged at the same position as that of the upstream partition member 732 installed in the first upstream tank unit 730*a* in the stacking direction of the refrigerant tubes 16*a*.

The refrigerant inflow pipe 164 is connected to the first refrigerant space 77*a*, and the refrigerant outflow pipe 165 is connected to the second refrigerant space 77*b*. Also, the coolant inflow pipe 434 is connected to the first coolant space 76*a*, and the coolant outflow pipe 435 is connected to the second coolant space 76*b*. Further, the other end side of the first upstream tank unit 730*a* in the longitudinal direction thereof, one end side of the second upstream tank unit 730*b* in the longitudinal direction thereof, and both ends of the second downstream tank unit 740*b* in the longitudinal direction thereof are closed by the respective closing members.

With the above configuration, the refrigerant that flows from the refrigerant inflow pipe 164 into the heat exchanger 70 flows from the first refrigerant space 77*a* into the multiple refrigerant tubes 16*a* communicated with the first refrigerant space 77*a* downward in the direction of the gravitational force, as indicated by the heavy solid arrows in FIG. 35. Then, the refrigerant flows from the refrigerant tubes 16*a* into the fourth refrigerant space 77*d*, and flows within the fourth refrigerant space 77*d* from the other end side of the first upstream tank unit 730*a* in the longitudinal direction toward one end side thereof in the longitudinal direction. Then, the refrigerant flows from the fourth refrigerant space 77*d* into the multiple refrigerant tubes 16*a* communicated with the fourth refrigerant space 77*d* and the third refrigerant space 77*c* upward in the direction of the gravitational force, and flows from the refrigerant tubes 16*a* into the third refrigerant space 77*c*. Then, the refrigerant flows within the third refrigerant space 77*c* from the other end side of the second upstream tank unit 730*b* in the longitudinal direction thereof toward one end side thereof in the longitudinal direction, and flows within the multiple refrigerant tubes 16*a* communicated with the third refrigerant space 77*c* and the second refrigerant space 77*b* downward in the direction of the gravitational force. Further, the refrigerant flows from the refrigerant tubes 16*a* into the second refrigerant space 77*b*.

Also, the coolant that flows from the coolant inflow pipe 434 into the heat exchanger 70 flows from the first coolant space 76*a* into the multiple coolant tubes 43*a* communicated with the first coolant space 76*a* upward in the direction of the gravitational force. Then, the refrigerant flows from the coolant tubes 43*a* into the coolant space 76 formed in the second downstream tank unit 740*b*, and flows within the coolant space 76 from the other end side of the second downstream tank unit 740*b* in the longitudinal direction thereof toward one end side thereof in the longitudinal direction. Then, the coolant flows from the coolant space 76 formed in the second downstream tank unit 740*b* into the multiple coolant tubes 43*a* communicated with the coolant space 76 and the second coolant space 76*b* downward in the direction of the gravitational force, and flows from the coolant tubes 43*a* into the second coolant space 76*b*.

The heat exchanger 70 in FIG. 35 is configured to have the first refrigerant path 161*a*, the second refrigerant path 161*b*, and the third refrigerant path 161*c* as in FIG. 34 described above. For example, the second refrigerant path 161*b* is an upward flow refrigerant path. Then, the tube stack width L2 of the second refrigerant path 161*b* is smaller than the tube stack width L1 of the first refrigerant path 161*a* (L1>L2), and also smaller than the tube stack width L3 of the third refrigerant path 161*c* (L3>L2). Therefore, even in the present embodiment, the same advantages as those in the above-mentioned twentieth embodiment are obtained.

Twenty-Fourth Embodiment

Figure 36:
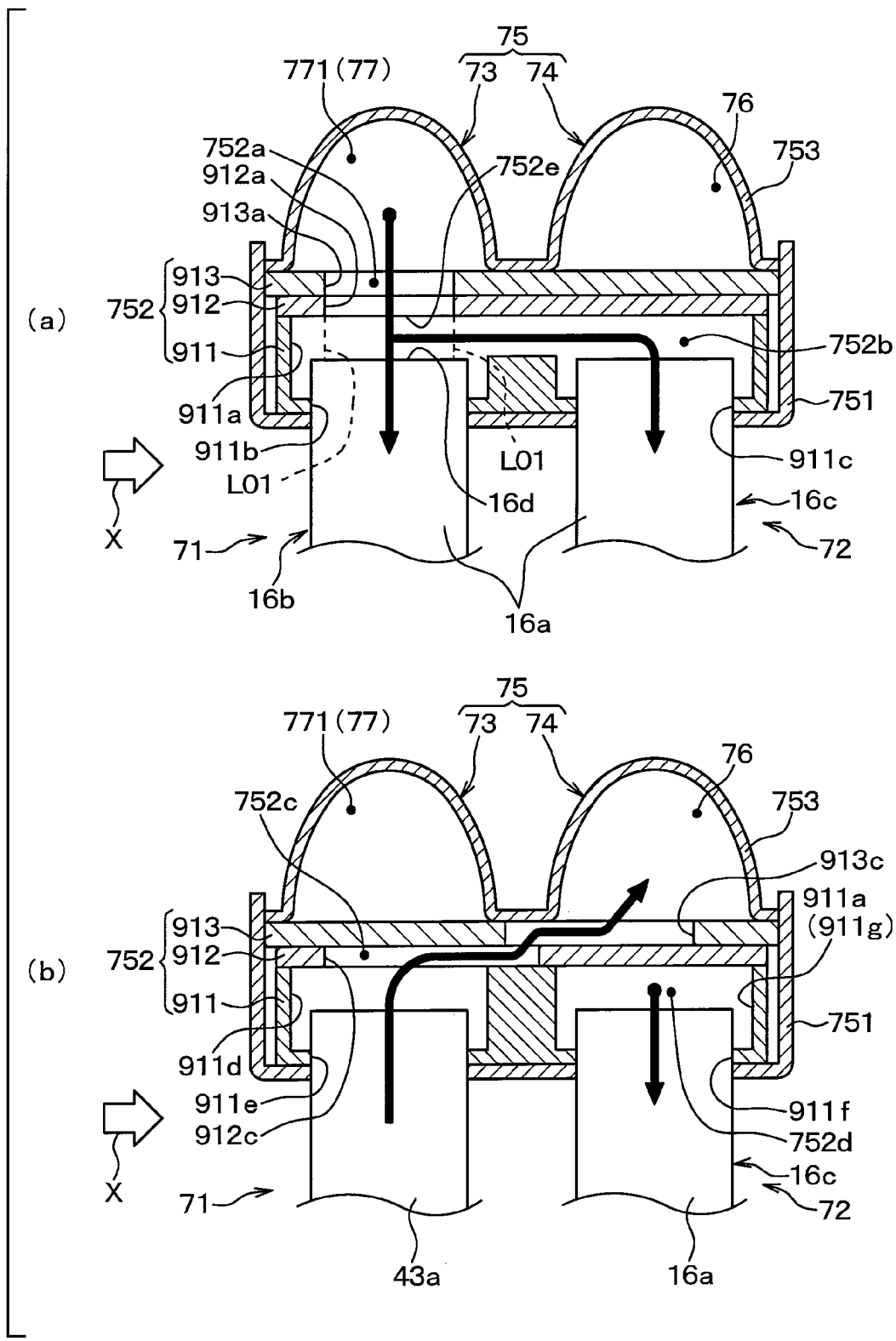
FIG. 36(a) is a cross-sectional view of a portion in which the refrigerant tubes overlap with each other in an air flow direction in a header tank of a heat exchanger according to a twenty-fourth embodiment of the present disclosure.
FIG. 36(b) is a cross-sectional view of a portion in which the refrigerant tubes overlap with the coolant tubes in the air flow direction in the header tank of the heat exchanger according to the twenty-fourth embodiment.

In the present embodiment, the second upstream tank unit 730*b* and the second downstream tank unit 740*b* in FIG. 30 of the above-mentioned eighteenth embodiment are configured as illustrated in FIG. 36. For example, FIG. 36 illustrates a tank cross-sectional view of a portion G in FIG. 30. FIG. 36(*a*) is a cross-sectional view corresponding to FIG. 13(*a*), and FIG. 36(*b*) is a cross-sectional view corresponding to FIG. 13(*b*). FIGS. 36(*a*) and 36(*b*) turn upside down with respect to FIGS. 13(*a*) and 13(*b*), respectively.

As illustrated in FIG. 36, the intermediate plate member 752 is configured to stack a first plate member 911, a second plate member 912, and a third plate member 913 on each other in the plate thickness direction in order from a side closer (lower side in FIG. 36) to the upstream heat exchange portion 71 and the downstream heat exchange portion 72, and join those plate members to each other.

As illustrated in FIG. 36(*a*), a refrigerant circulation unit 911*a* that is a recessed hole which is concaved from a side of the second plate member 912 in the plate thickness direction is formed to extend across the refrigerant tubes 16*a* in both the upstream heat exchange portion 71 and the downstream heat exchange portion 72 is formed in the first plate member 911.

Two through-holes 911*b* and 911*c* are formed in a bottom surface of a refrigerant circulation unit 911*a* so as to be aligned in the flow direction X of the outside air. The refrigerant tubes 16*a* of the upstream heat exchange portion 71 penetrates through one through-hole 911*b*, and leading ends of the refrigerant tubes 16*a* are protruded into the refrigerant circulation unit 911*a*. Also, the refrigerant tubes 16*a* of the downstream heat exchange portion 72 penetrate through the other through-hole 911*c*, and the leading ends of the refrigerant tubes 16*a* are protruded into the refrigerant circulation unit 911*a*. With this configuration, the refrigerant circulation unit 911*a* is communicated with both the refrigerant tubes 16*a* of the upstream heat exchange portion 71 and the refrigerant tubes 16*a* of the downstream heat exchange portion 72.

A through-hole 912*a* is formed in the second plate member 912, and the through-hole 912*a* is communicated with the refrigerant circulation unit 911*a*. Also, a through-hole 913*a* is formed in the third plate member 913, and the through-hole 913*a* is communicated with the through-hole 912*a* of the second plate member 912, and also communicated with the refrigerant space 77. The refrigerant space 77 illustrated in FIG. 36 is the refrigerant space 771 on the refrigerant tube inlet side which is connected to an inlet side of the refrigerant tubes 16*a* for distributing the refrigerant.

In this way, the upstream refrigerant communication passage 752*a* is configured by the through-hole 912*a* of the second plate member 912 and the through-hole 913*a* of the third plate member 913. The downstream refrigerant communication passage 752*b* is configured by the refrigerant circulation unit 911*a* of the first plate member 911, the through-hole 912a of the second plate member 912, and the through-hole 913a of the third plate member 913.

As illustrated in FIG. 36(b), a coolant circulation unit 911d that is a recessed hole which is concaved from a side of the second plate member 912 in the plate thickness direction, and the refrigerant circulation unit 911a are formed in the first plate member 911 so as to be aligned from the upstream side in the flow direction X of the outside air. A through-hole 911e is formed in a bottom surface of the coolant circulation unit 911d, and a through-hole 911f is formed in the bottom surface of the refrigerant circulation unit 911a.

The coolant tubes 43a of the upstream heat exchange portion 71 penetrates through one through-hole 911e, and leading ends of the coolant tubes 43a are protruded into the coolant circulation unit 911d. With this configuration, the coolant circulation unit 911d is communicated with the coolant tubes 43a of the upstream heat exchange portion 71. Also, the refrigerant tubes 16a of the downstream heat exchange portion 72 penetrate through the through-hole 911f, and the leading ends of the refrigerant tubes 16a are protruded into the refrigerant circulation unit 911a. With this configuration, the refrigerant circulation unit 911a is communicated with the refrigerant tubes 16a of the downstream heat exchange portion 72.

A through-hole 912c is formed in the second plate member 912, and the through-hole 912c is communicated with the coolant circulation unit 911d without being communicated with the refrigerant circulation unit 911a. Also, a through-hole 913c is formed in the third plate member 913, and the through-hole 913c is communicated with the through-hole 912c of the second plate member 912. Further, the through-hole 913c of the third plate member 913 is communicated with the coolant space 76 without being communicated with the refrigerant space 77.

Figure 37:
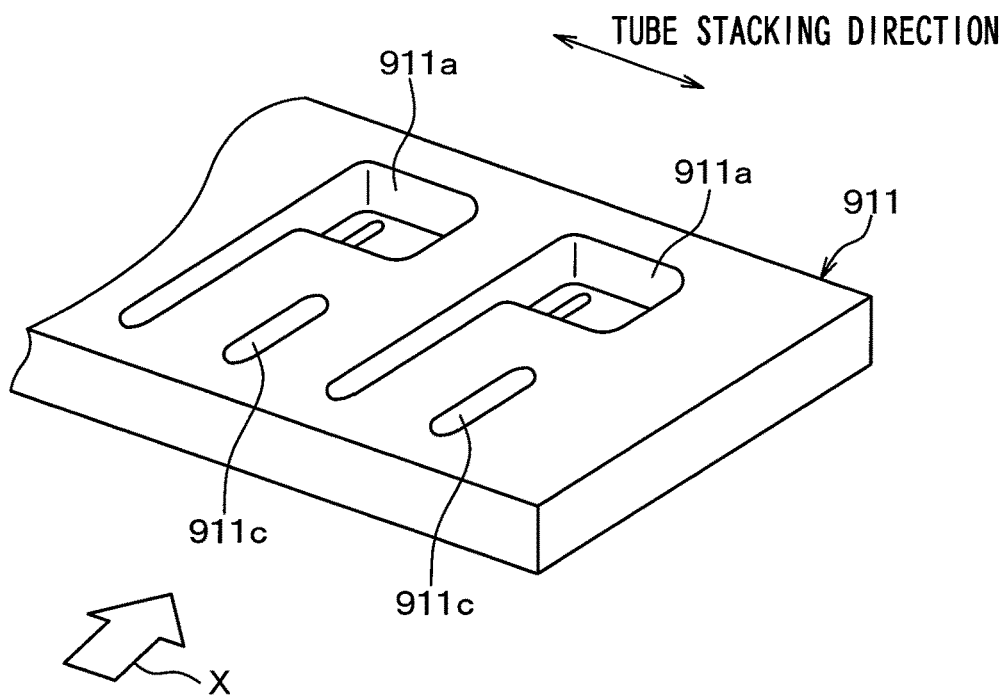
FIG. 37 is a perspective view of a first plate member in the heat exchanger according to the twenty-fourth embodiment.

The refrigerant circulation unit 911a illustrated in FIG. 36(b) is identical with the above-mentioned refrigerant circulation unit 911a illustrated in FIG. 36(a), and a portion thereof on a downstream side in the flow direction X of the outside air is formed to extend in the tube stacking direction as illustrated in FIG. 37.

In this way, the upstream coolant communication passage 752c is configured by the through-hole 912c of the second plate member 912, and the through-hole 913c of the third plate member 913. The downstream refrigerant communication passage 752d is configured by the refrigerant circulation unit 911a of the first plate member 911, the through-hole 912a of the second plate member 912, and the through-hole 913a of the third plate member 913. That is, the refrigerant flow channel (upstream refrigerant communication passage 752a) between the refrigerant space 771 on the refrigerant tube inlet side and the upstream refrigerant tube group 16b, and the refrigerant flow channels (downstream refrigerant communication passages 752b and 752d) between the refrigerant space 771 on the refrigerant tube inlet side and the downstream refrigerant tube group 16c are disposed in parallel.

As illustrated in FIG. 36(a), the refrigerant space 771 on the refrigerant tube inlet side is arranged closer, in the flow direction X of the outside air, to the upstream refrigerant tube group 16b (higher pressure loss refrigerant tube group) side than the downstream refrigerant tube group 16c (lower pressure loss refrigerant tube group). In short, the refrigerant space 771 on the refrigerant tube inlet side is formed within the upstream tank unit 73. For that reason, the flow channel resistance between the refrigerant space 771 on the refrigerant tube inlet side and the upstream refrigerant tube group 16b is smaller than the flow channel resistance between the refrigerant space 771 on the refrigerant tube inlet side and the downstream refrigerant tube group 16c mainly due to a difference in the length of the refrigerant flow channel. This is because the flow channel resistance of the refrigerant flow channel becomes larger as the flow channel length of the refrigerant flow channel is longer.

As indicated by two dashed lines L01 in FIG. 36(a), an opening portion 752e of the upstream refrigerant communication passage 752a which communicates the refrigerant space 771 on the refrigerant tube inlet side and the upstream refrigerant tube group 16b with each other is opened toward the refrigerant tubes 16a included in the upstream refrigerant tube group 16b. Further, the opening portion 752e of the upstream refrigerant communication passage 752a overlaps with an opening end surface 16d in a direction perpendicular to the opening end surface 16d of the refrigerant tubes 16a. That is, the upstream refrigerant communication passage 752a is opened to face the opening end surface 16d of the refrigerant tubes 16a. With this configuration, the refrigerant can be allowed to swiftly flow into the upstream refrigerant tube group 16b which is disposed at the high pressure loss side with the use of a dynamic pressure of the refrigerant that flows in the refrigerant space 771 on the refrigerant tube inlet side. For that reason, for example, the refrigerant can be prevented from disproportionately largely flowing into the downstream refrigerant tube group 16c.

Figure 38:
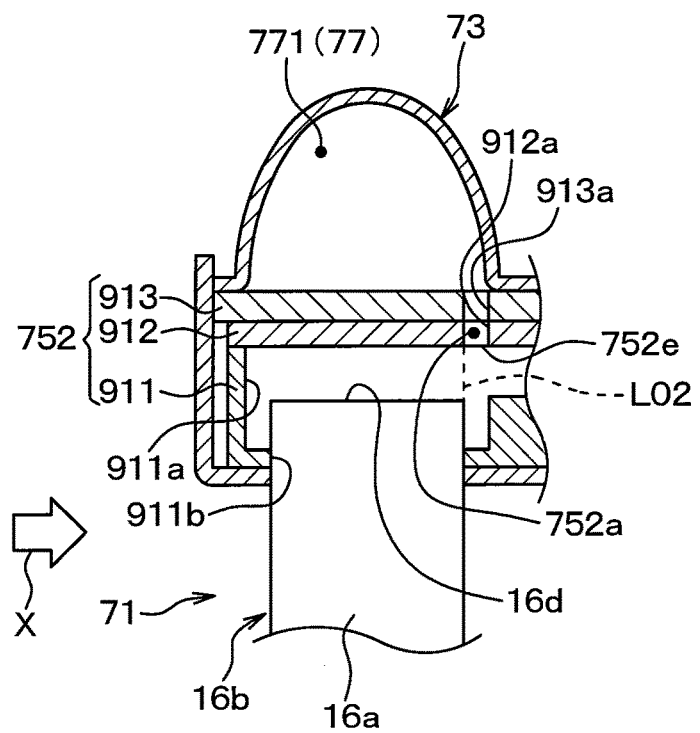
FIG. 38 is a cross-sectional view of an upstream tank unit in a heat exchanger of a comparative example.

If the through-hole 912a of the second plate member 912 and the through-hole 913a of the third plate member 913 are formed, for example, as illustrated in FIG. 38, the opening portion 752e of the upstream refrigerant communication passage 752a does not overlap with the opening end surface 16d in the direction perpendicular to the opening end surface 16d of the refrigerant tubes 16a as indicated by dashed lines L02 in FIG. 38.

As illustrated in FIG. 30, since the heat exchanger 70 is arranged so that a longitudinal direction of the refrigerant tubes 16a and the coolant tubes 43a is oriented vertically, the refrigerant flowing within the refrigerant tubes 16a has a flow rate component in the direction of the gravitational force. Also, since the refrigerant flowing in the refrigerant tubes 16a interposed between the refrigerant space 771 and the first refrigerant space 77a formed in the first upstream tank unit 730a flows into the refrigerant space 771 on the refrigerant tube inlet side illustrated in FIG. 36, the refrigerant that has conducted heat exchange with the outside air (third fluid) by the upstream and downstream heat exchange portions 71 and 72 at least once is introduced into the refrigerant space 771.

In this example, even if the heat exchanger 70 functions as any one of the evaporator and the condenser, if the refrigerant conducts the heat exchange with the outside air by the upstream and downstream heat exchange portions 71 and 72 once, the refrigerant is put into a state having two phases of gas and liquid. In the refrigerant of such gas-liquid two phases, since the liquid component included in the refrigerant is likely to be more affected by the gravitational force than the gas, most of the refrigerant is likely to flow into the refrigerant tubes 16a coupled to the upstream side in the flow direction of the refrigerant within the refrigerant space 771 on the refrigerant tube inlet side.

From the above viewpoint, according to the present embodiment, the refrigerant space 771 on the refrigerant tube inlet side illustrated in FIG. 36 is not arranged on the downstream refrigerant tube group 16c but on the upstream refrigerant tube group 16b. Therefore, as compared with a case where it is assumed that the refrigerant space 771 on the refrigerant tube inlet side is placed on the downstream refrigerant tube group 16c into which the refrigerant is relatively likely to flow, the refrigerant is prevented from disproportionately largely flowing into the refrigerant tubes 16a on the upstream side in the refrigerant flow within the refrigerant space 771. As a result, the refrigerant can be supplied evenly to the multiple refrigerant tubes 16a connected to the refrigerant space 771 on the refrigerant tube inlet side.

Twenty-Fifth Embodiment

Figure 39:
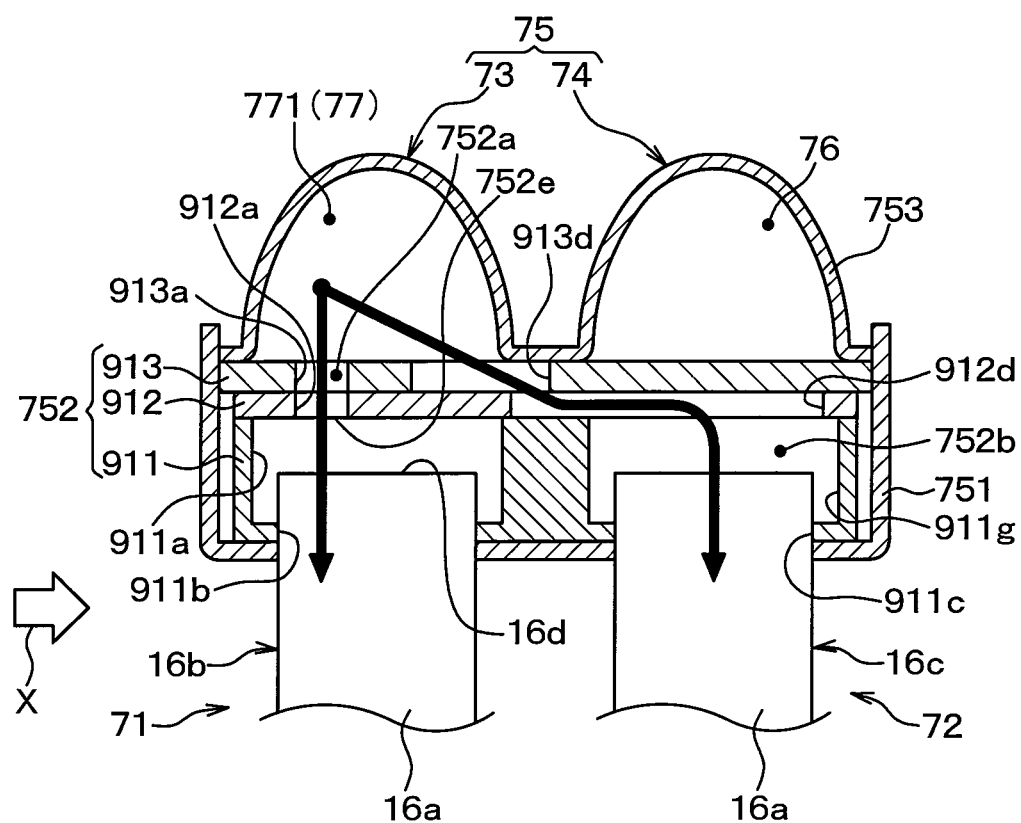
FIG. 39 is a cross-sectional view of a portion in which the refrigerant tubes overlap with each other in an air flow direction in a header tank of a heat exchanger according to a twenty-fifth embodiment of the present disclosure.

In the present embodiment, the second upstream tank unit 730b and the second downstream tank unit 740b according to the above-mentioned twenty-fourth embodiment are configured as illustrated in FIG. 39 instead of FIG. 36(a). In the present embodiment, a cross-sectional view corresponding to FIG. 36(b) is identical with that in the twenty-fourth embodiment, and therefore will be omitted. The refrigerant circulation unit 911a illustrated in FIG. 36(b) is substituted with a refrigerant circulation unit 911g with reference to FIG. 36(b).

As illustrated in FIG. 39, the intermediate plate member 752 is configured to stack the first plate member 911, the second plate member 912, and the third plate member 913 on each other in the plate thickness direction in order from a side closer (lower side in FIG. 39) to the upstream heat exchange portion 71 and the downstream heat exchange portion 72, and join those plate members to each other.

The refrigerant circulation units 911a and 911g that are recessed holes which are concaved from a side of the second plate member 912 in the plate thickness direction is formed in the first plate member 911 to be aligned in the flow direction X of the outside air. The through-hole 911b is formed in the bottom surface of one refrigerant circulation unit 911a, and the through-hole 911c is formed in the bottom surface of the other refrigerant circulation unit 911g.

The refrigerant tubes 16a of the upstream heat exchange portion 71 penetrates through one through-hole 911b communicated with one refrigerant circulation unit 911a, and leading ends of the refrigerant tubes 16a are protruded into the refrigerant circulation unit 911a. Also, the refrigerant tubes 16a of the downstream heat exchange portion 72 penetrate through the other through-hole 911c communicated with the other refrigerant circulation unit 911g, and the leading ends of the refrigerant tubes 16a are protruded into the refrigerant circulation unit 911g. With this configuration, one refrigerant circulation unit 911a is communicated with the refrigerant tubes 16a of the upstream heat exchange portion 71, and the other refrigerant circulation unit 911g is communicated with the refrigerant tubes 16a of the downstream heat exchange portion 72.

Two through-holes 912a and 912d are formed in the second plate member 912, one through-hole 912a is communicated with one refrigerant circulation unit 911a, and the other through-hole 912d is communicated with the other refrigerant circulation unit 911g. Also, two through-holes 913a and 913d are formed in the third plate member 913, and one through-hole 913a is communicated with one through-hole 912a of the second plate member 912, and also communicated with the refrigerant space 77. Also, the other through-hole 913d of the third plate member 913 is communicated with the other through-hole 912d of the second plate member 912, and also communicated with the refrigerant space 77. None of two through-holes 913a and 913d of the third plate member 913 is communicated with the coolant space 76.

In this way, the upstream refrigerant communication passage 752a is configured by the through-hole 912a of the second plate member 912 and the through-hole 913a of the third plate member 913. The downstream refrigerant communication passage 752b is configured by the coolant circulation unit 911d of the first plate member 911, the through-hole 912d of the second plate member 912, and the through-hole 913d of the third plate member 913.

The refrigerant circulation unit 911g illustrated in FIG. 36(b) is identical with the above-mentioned refrigerant circulation unit 911g illustrated in FIG. 39, and the refrigerant circulation unit 911g is formed to extend in the tube stacking direction as in the above-mentioned twenty-fourth embodiment. Therefore, the downstream refrigerant communication passage 752d in FIG. 36(b) is configured by the refrigerant circulation unit 911g of the first plate member 911, the through-hole 912d of the second plate member 912, and the through-hole 913d of the third plate member 913.

Also, in the present embodiment, as in the above-mentioned twenty-fourth embodiment, the flow channel resistance between the refrigerant space 771 on the refrigerant tube inlet side and the upstream refrigerant tube group 16b is smaller than the flow channel resistance between the refrigerant space 771 on the refrigerant tube inlet side and the downstream refrigerant tube group 16c mainly due to a difference in the length of the refrigerant flow channel.

Also, since the flow channel resistance of the refrigerant flow channel becomes larger as the flow channel length is longer, and becomes smaller as the opening area of the flow channel is larger, for example, in FIG. 39, the flow channel length and the opening area are regulated and determined so that the flow channel resistances of the upstream refrigerant communication passage 752a, and the downstream refrigerant communication passages 752b, 752d can be set to be increased or decreased. Therefore, in FIG. 39, the flow channel resistance between the refrigerant space 771 on the refrigerant tube inlet side and the upstream refrigerant tube group 16b is smaller than the flow channel resistance between the refrigerant space 771 on the refrigerant tube inlet side and the downstream refrigerant tube group 16c also due to the opening area (flow channel cross-sectional area) of the refrigerant flow channel. Also, in the present embodiment, the same advantages as those in the above-mentioned twenty-fourth embodiment are obtained.

Twenty-Sixth Embodiment

Figure 40:
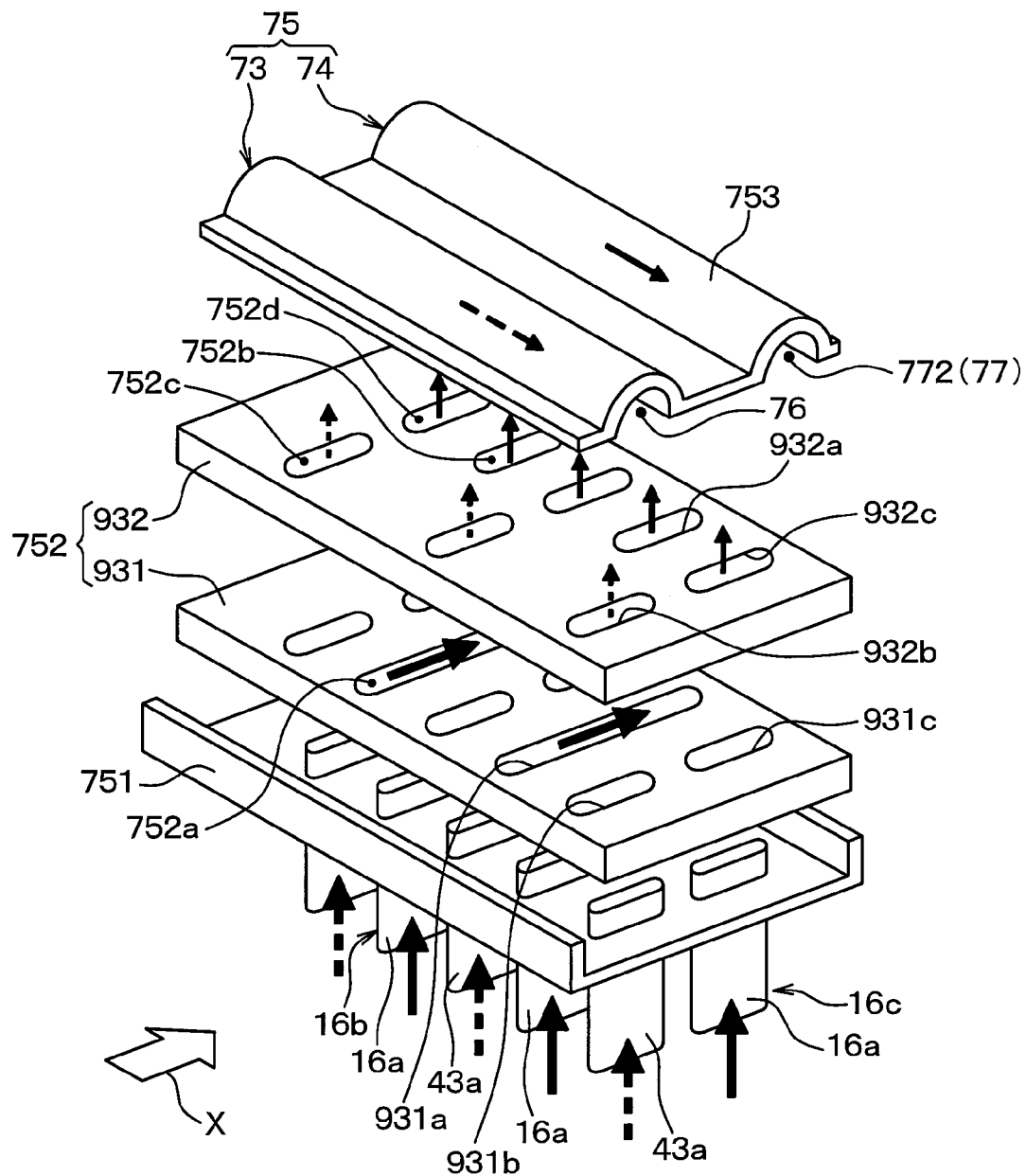
FIG. 40 is an exploded view of a header tank included in a heat exchanger according to a twenty-sixth embodiment of the present disclosure.

In the present embodiment, the configuration of the header tank 75 arranged on one end side (lower side in FIG. 5) of the refrigerant tubes 16a in the longitudinal direction thereof is identical with that in the above-mentioned first embodiment. That is, the configuration of the header tank 75 is illustrated in FIG. 9. However, the header tank 75 arranged on the other end side (upper side of FIG. 5) of the refrigerant tubes 16a in the longitudinal direction thereof is configured as illustrated in FIG. 40. In FIG. 40, the flow of refrigerant is indicated by heavy solid arrows, and the flow of coolant is indicated by heavy dashed arrows.

As illustrated in FIG. 40, the intermediate plate member 752 is configured to stack the first plate member 931 and the second plate member 932 on each other in the plate thickness direction in order from a side closer (lower side in FIG. 40) to the upstream heat exchange portion 71 and the downstream heat exchange portion 72, and join those plate members to each other.

In a portion within the header tank 75 in which the respective refrigerant tubes 16a overlap with each other in the upstream heat exchange portion 71 and the downstream heat exchange portion 72 when viewed from the flow direction X of the outside air, a through-hole 931a is formed in a first plate member 931. The through-hole 931a is formed to extend across portions corresponding to the refrigerant tubes 16a in both the upstream heat exchange portion 71 and the downstream heat exchange portion 72 in the first plate member 931. The through-hole 931a is communicated with the refrigerant tubes 16a in both the upstream heat exchange portion 71 and the downstream heat exchange portion 72.

A through-hole 932a is formed in a second plate member 932, and the through-hole 912a is communicated with the through-hole 931a of the first plate member 931. Further, the through-hole 932a of the second plate member 932 is communicated with the refrigerant space 77 without being communicated with the coolant space 76.

In this way, the upstream refrigerant communication passage 752a and the downstream refrigerant communication passage 752b are configured by the through-hole 931a of the first plate member 931, and the through-hole 932a of the second plate member 932.

In a portion within the header tank 75 in which the coolant tubes 43a of the upstream heat exchange portion 71 and the refrigerant tubes 16a of the downstream heat exchange portion 72 overlap with each other when viewed from the flow direction X of the outside air, two through-holes 931b and 931c are formed in the first plate member 931 so as to be aligned from the upstream side in the flow direction X of the outside air. One through-hole 931b is communicated with the coolant tubes 43a of the upstream heat exchange portion 71, and the other through-hole 931c is communicated with the refrigerant tubes 16a of the downstream heat exchange portion 72.

Two through-holes 932b and 932c are formed in the second plate member 932 so as to be aligned from the upstream side in the flow direction X of the outside air. One through-hole 932b is communicated with one through-hole 931b of the first plate member 931, and also communicated with the coolant space 76, but is not communicated with the refrigerant space 77. Also, the other through-hole 932c is communicated with the other through-hole 931c of the first plate member 931, and also communicated with the refrigerant space 77, but is not communicated with the coolant space 76.

In this way, the upstream coolant communication passage 752c is configured by the through-hole 931b of the first plate member 931 and the through-hole 932b of the second plate member 932. The downstream refrigerant communication passage 752d is configured by the through-hole 931c of the first plate member 931 and the through-hole 932c of the second plate member 932.

According to the present embodiment, the refrigerant space 77 illustrated in FIG. 40 is the refrigerant space 772 on the refrigerant tube outlet side which is connected to the outlet side of the refrigerant tubes 16a for collecting the refrigerant. The refrigerant space 772 on the refrigerant tube outlet side is arranged on a side closer to the downstream refrigerant tube group 16c than the upstream refrigerant tube group 16b in the flow direction X of the outside air. Specifically, the refrigerant space 772 on the refrigerant tube outlet side is formed in the second downstream tank unit 740b. Therefore, the header tank 75 is configured so that the refrigerant is likely to flow into the refrigerant space 772 on the refrigerant tube outlet side from the downstream refrigerant tube group 16c into which the refrigerant is likely to flow as compared with the upstream refrigerant tube group 16b which is disposed at the higher pressure loss.

For example, since the stacking number of refrigerant tubes 16a in the downstream refrigerant tube group 16c is larger than that in the upstream refrigerant tube group 16b, the flow channel cross-sectional area from the downstream refrigerant tube group 16c to the refrigerant space 772 on the refrigerant tube outlet side is likely to increase as a whole. With the increase in the flow channel area as a whole, the header tank 75 can be configured so that the refrigerant is likely to flow into the refrigerant space 772 on the refrigerant tube outlet side.

If the header tank 75 is thus configured, the pressure loss of the refrigerant can be reduced as the overall heat exchanger 70, and the heat exchange performance of the heat exchanger 70 can be improved. In particular, when the heat exchanger 70 functions as an evaporator, the advantages are great.

Twenty-Seventh Embodiment

Figure 41:
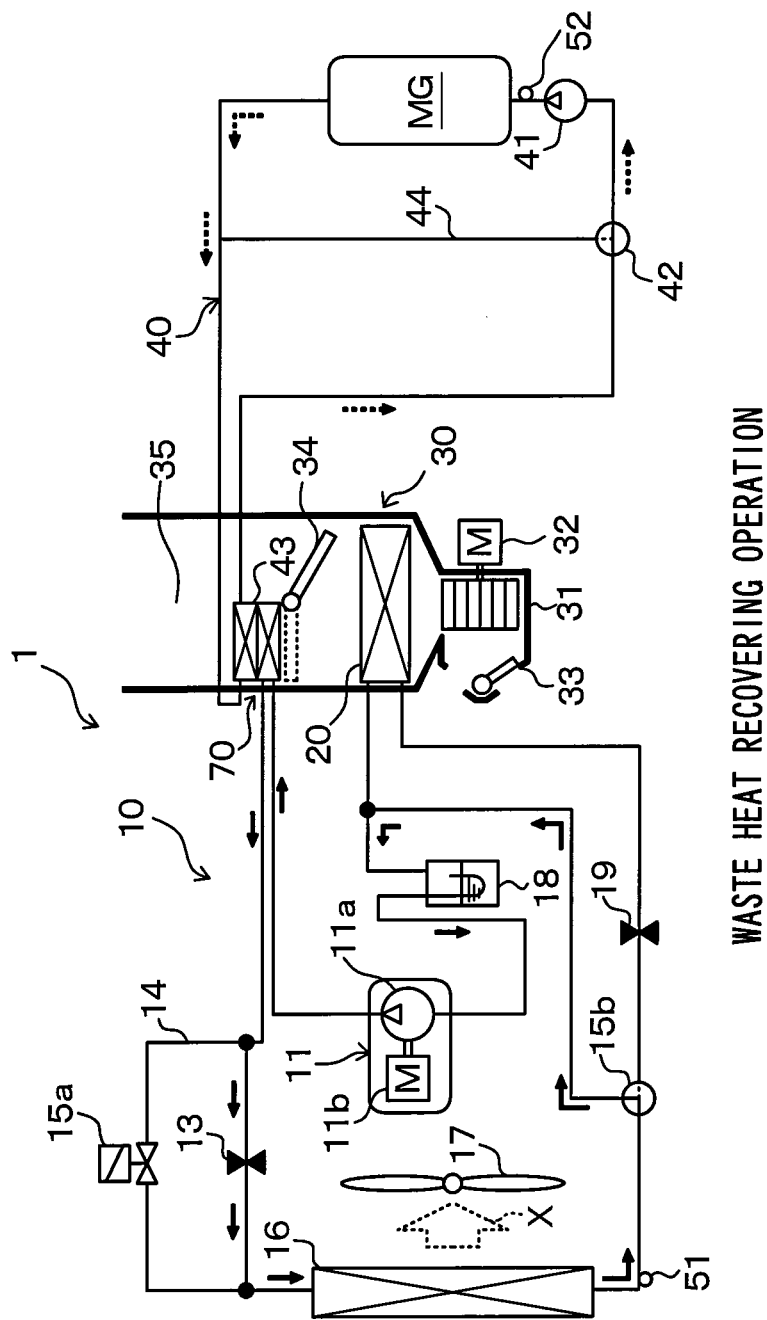
FIG. 41 is a schematic view illustrating waste heat recovering operation in a vehicle air conditioner according to a twenty-seventh embodiment of the present disclosure.

In the present embodiment, an example in which the configuration of the heat pump cycle 10 in the first embodiment is changed will be described as illustrated in an overall configuration diagram of FIG. 41. FIG. 41 is an overall configuration diagram illustrating a refrigerant flow channel in waste heat recovering operation according to the present embodiment, in which the flow of refrigerant in the heat pump cycle 10 is indicated by solid arrows, and the flow of coolant in the coolant circulation circuit 40 is indicated by dashed arrows.

Specifically, in the present embodiment, the vehicle interior condenser 12 according to the first embodiment is omitted, and the combined heat exchanger 70 according to the first embodiment is arranged within the casing 31 of the vehicle interior air conditioning unit 30. In the heat exchanger 70, the vehicle exterior heat exchange unit 16 according to the first embodiment functions as the vehicle interior condenser 12. Hereinafter, a portion of the heat exchanger 70 which functions as the vehicle interior condenser 12 is represented by a vehicle interior condensing unit.

On the other hand, the vehicle exterior heat exchange unit 16 is configured as a single heat exchanger that conducts heat exchange between the refrigerant internally flowing and the outside air blown by the air blowing fan 17. The other configurations are identical with those in the first embodiment. Also, in the present embodiment, the defrosting operation is not executed, but the other actuations are identical with those in the first embodiment.

Therefore, in the waste heat recovering operation according to the present embodiment, a vehicle interior blowing air is subjected to heat exchange with the compressor 11 discharge refrigerant by the vehicle interior condensing unit of the heat exchanger 70, and the vehicle interior blowing air heated by the vehicle interior condensing unit is subjected to heat exchange with the coolant by the radiator unit 43 of the heat exchanger 70 so as to be heated.

Further, according to the configuration of the heat pump cycle 10 according to the present embodiment, since the coolant can be subjected to the heat exchange with the vehicle interior blowing air, even if the actuation of the heat pump cycle 10 (specifically, compressor 11) is stopped, heating within the vehicle interior can be realized. Also, even if the temperature of the compressor 11 discharge refrigerant is low, and the heating capability of the heat pump cycle 10 is low, the heating in the vehicle interior can be realized.

In the heat exchanger 70, when the temperature of the coolant in the radiator unit 43 becomes higher, the condensation (liquefaction) of the refrigerant in the refrigerant tubes 16*a* of the vehicle interior condensing unit is damaged, and the refrigerant flows while being kept in the gas phase state. As a result, the pressure loss of the refrigerant becomes larger, and a phenomenon that the distribution of the refrigerant to the refrigerant tubes 16*a* of the upstream heat exchange portion 71 and the refrigerant tubes 16*a* of the downstream heat exchange portion 72 is likely to be uneven may occur.

Under the circumstances, with the application of the heat exchanger 70 according to the first embodiment to the heat pump cycle 10 according to the present embodiment, the distributivity of the refrigerant can be appropriately regulated by removing an influence of the difference in the pressure loss between the refrigerant tubes 16*a* of the upstream heat exchange portion 71 and the refrigerant tubes 16*a* of the downstream heat exchange portion 72.

It is needless to say that the heat exchanger 70 according to the second to twenty-sixth embodiment may be applied to the heat pump cycle 10 according to the present embodiment.

The present disclosure is not limited to the above embodiments, but can be variously modified, for example, as follows.

(1) In the above embodiments, an example in which the above-mentioned upstream number ratio is made smaller than the downstream number ratio has been described. However, the present invention is not limited to this configuration, but the upstream number ratio may be made larger than the downstream number ratio.

Also, the upstream number ratio may be identical with the downstream number ratio. That is, the upstream heat exchange portion 71 and the downstream heat exchange portion 72 may be configured so that both a portion in which the respective refrigerant tubes 16*a* overlap with each other in the flow direction X of the outside air and a portion in which the refrigerant tubes 16*a* overlap with the coolant tubes 43*a* in the flow direction X of the outside air are present.

(2) In the above-mentioned embodiments, the example in which the refrigerant tubes 16*a* and the coolant tubes 43*a* are alternately arranged one by one in the the upstream heat exchange portion 71 has been described. However, the arrangement of the refrigerant tubes 16*a* and the coolant tubes 43*a* is not limited to this configuration.

For example, in the upstream heat exchange portion 71, the coolant tubes 43*a* may be arranged every two refrigerant tubes 16*a*. That is, in the upstream heat exchange portion 71, two refrigerant tubes 16*a* may be arranged between the adjacent coolant tubes 43*a*.

According to this configuration, the upstream number ratio that is the number ratio of refrigerant tubes 16*a* in the upstream heat exchange portion 71 to the total numbers of refrigerant tubes 16*a* and coolant tubes 43*a* configuring the upstream heat exchange portion 71 can be increased. Therefore, in the upstream heat exchange portion 71, the heat exchange quantity between the refrigerant and the outside air can be more surely ensured.

(3) In the above-mentioned first embodiment, the example in which the refrigerant of the heat pump cycle 10 is employed as the first fluid, the coolant of the coolant circulation circuit 40 is employed as the second fluid, and the outside air blown by the air blowing fan 17 is employed as the third fluid has been described. However, the first to third fluids are not limited to this example. For example, as in the twenty-seventh embodiment, the vehicle interior blowing air may be employed as the third fluid.

For example, the first fluid may be a high pressure refrigerant of the heat pump cycle 10, or a low pressure refrigerant.

For example, the second fluid may be made of the coolant for cooling an electric equipment such as an inverter that supplies an electric power to an engine, the travel electric motor MG. Also, a cooling oil may be employed as the second fluid, and the second heat exchange unit may function as an oil cooler, or a thermal storage agent or a cold storage agent may be employed as the second fluid.

Further, when the heat pump cycle 10 employing the heat exchanger 70 of the present disclosure is applied to a stationary air conditioner, a cold storage warehouse, or a cooling heating device for a vending machine, a coolant for cooling an engine, an electric motor, and other electric equipments as a drive source of a compressor in the heat pump cycle 10 may be employed as the second fluid.

Further, in the above-mentioned embodiment, the example in which the heat exchanger 70 of the present disclosure is applied to the heat pump cycle (refrigeration cycle) has been described. However, the application of the heat exchanger 70 according to the present disclosure is not limited to this example. That is, the heat exchanger 70 can be extensively applied to devices for conducting the heat exchange among three types of fluids.

For example, the heat exchanger can be applied as a heat exchanger applied to a vehicle cooling system. A first fluid may be a heat medium that absorbs the quantity of heat provided in a first in-vehicle device associated with heat generation during actuation, a second fluid may be a heat medium that absorbs the quantity of heat provided in a second in-vehicle device associated with heat generation during actuation, and a third fluid may be air.

More specifically, when the heat exchanger is applied to a hybrid vehicle, a first in-vehicle device may be an engine EG, the first fluid may be the coolant of the engine EG, a second in-vehicle device may be a travel electric motor, and the second fluid may be the coolant of the travel electric motor.

Since the respective amounts of heat generation in those in-vehicle devices are changed according to the travel state (travel load) of the vehicle, a temperature of the coolant of the engine EG and a temperature of the coolant of the travel electric motor are also changed according to the travel state of the vehicle. Therefore, according to this example, the heat quantity generated in the in-vehicle device large in the amount of heat generation can not only be radiated to the air, but also to the in-vehicle device side small in the amount of heat generation.

The three types of fluids not only mean fluids different in physicality or components, but also mean fluids identical in the physicality or components, but different in temperature, or a state of the fluid such as a gas-phase or a liquid-phase. Therefore, the first to third fluids according to the present disclosure are not limited to the fluids different the physicality or components from each other.

(4) In the above-mentioned embodiment, the example in which the electric three-way valve 42 is employed as a circuit switching device for switching the cooling medium circuit of the coolant circulation circuit 40 has been described. However, the circuit switching device is not limited to this example. For example, a thermostat valve may be employed. The thermostat valve is a cooling medium temperature responsive value configured by a mechanical mechanism that opens or closes a cooling medium passage by displacing a valve body through a thermowax (temperature sensitive member) that is changed in volume according to a temperature. Therefore, with the application of the thermostat valve, the coolant temperature sensor 52 can be omitted.

(5) In the above-mentioned embodiment, the example in which the normal fluorocarbon refrigerant is employed as the refrigerant has been described. However, the kind of refrigerant is not limited to this example. A natural refrigerant such as carbon dioxide, or a carbon hydrogen-based refrigerant may be employed. The heat pump cycle 10 may configure a supercritical refrigeration cycle in which the compressor 11 discharge refrigerant becomes equal to or higher than a critical pressure of the refrigerant.

(6) The flow channel configuration of the heat exchanger 70 is not limited to the configurations illustrated in FIGS. 6 and 26 to 35, but the flow channel configuration of the heat exchanger 70 can be variously changed.

For example, the flow channel configuration of a U-turn type that U-turns the refrigerant flow, an S-turn type that U-turns the refrigerant flow twice, and a total path type that does not U-turn the refrigerant flow can be applied in the tube group on one side in the tube stacking direction and the tube group on the other side. Likewise, the flow channel configuration such as the U-turn type, the S-turn type, or the total path type can be applied to the coolant flow.

Also, the flow channel configuration such as a parallel flow type in which the refrigerant flow direction and the coolant flow direction are identical with each other, or an opposite flow type in which the refrigerant flow direction and the coolant flow direction are opposite to each other can be applied. For example, the flow of refrigerant in the refrigerant tubes 16a is U-turned from the downstream side in the flow direction X of the outside air to the upstream side in the flow direction X of the outside air, and the flow of coolant in the coolant tubes 43a is U-turned from the upstream side in the flow direction X of the outside air to the downstream side in the flow direction X of the outside air so that the flows of the refrigerant flowing in the adjacent refrigerant tubes 16a, and the coolant flowing in the coolant tubes 43a may be opposite to the flow direction X of the outside air (opposite flow) when macroscopically viewed.

(7) In the above-mentioned embodiments, the reason that a difference in the pressure loss occurs between the refrigerant tubes 16a of the upstream heat exchange portion 71 and the refrigerant tubes 16a of the downstream heat exchange portion 72 is because the state of the refrigerant flowing in the refrigerant tubes 16a of the upstream heat exchange portion 71 is different from the state of the refrigerant flowing in the refrigerant tubes 16a of the downstream heat exchange portion 72. Also, the difference in the pressure loss may occur due to a difference in structure (shape, overall length, or flow channel area. In other words, flow channel resistance) of the refrigerant tubes 16a of the upstream heat exchange portion 71 and the refrigerant tubes 16a of the downstream heat exchange portion 72.

Figure 42:
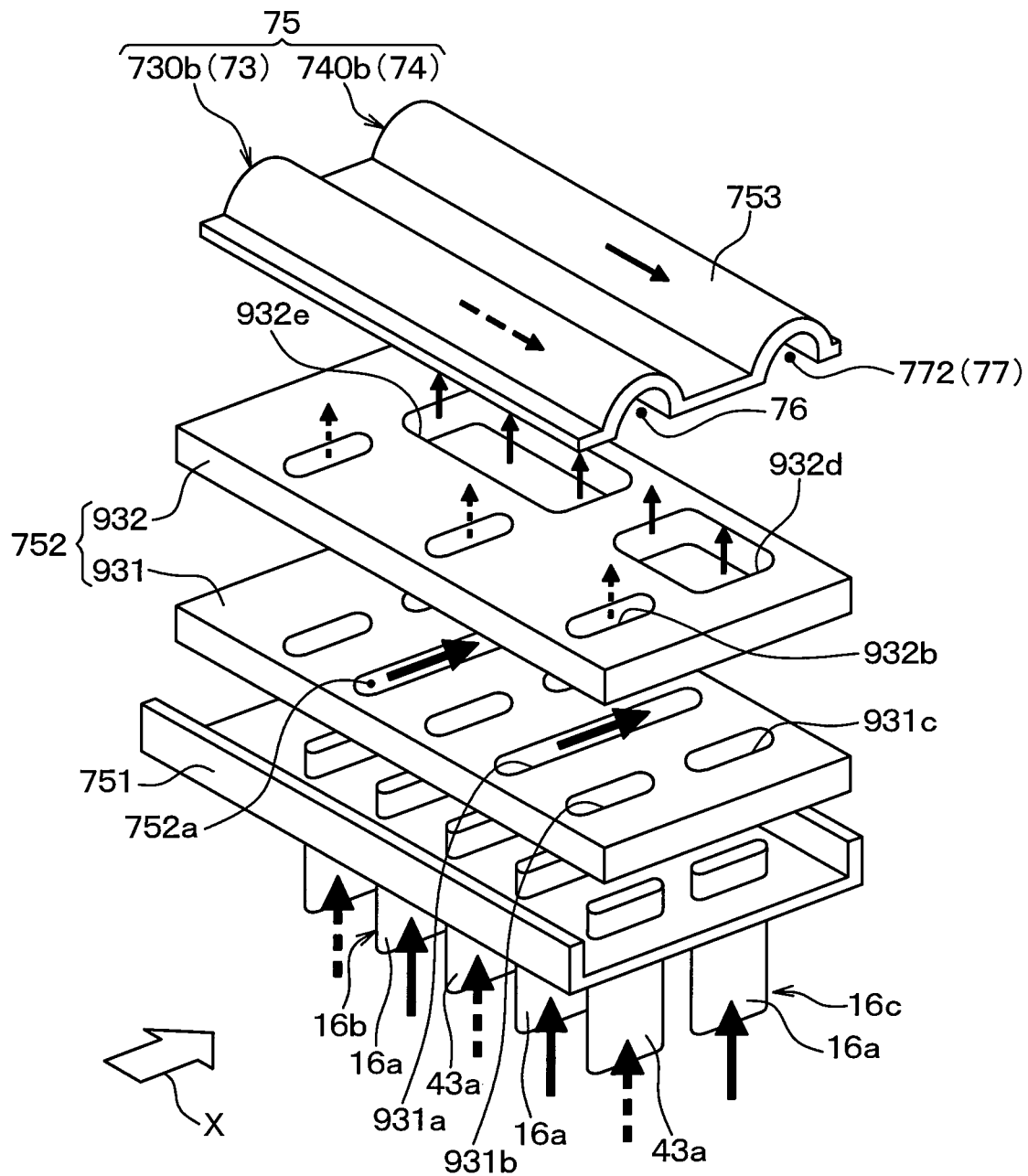
FIG. 42 is an exploded view of a header tank included in a heat exchanger according to a modified example.

(8) In FIG. 40 of the above-mentioned twenty-sixth embodiment, the two through-holes 932a and 932c communicated with the refrigerant space 77 are formed independently of the second plate member 932. Alternatively, the through-holes 932a and 932c may be replaced with a large through-hole in which multiple through-holes 932a and 932c are connected to each other. For example, the through-holes 932a and 932c of the second plate member 932 in FIG. 40 may be replaced with through-holes 932d and 932e including the multiple through-holes 932a and 932c, respectively, as illustrated in FIG. 42.

(9) In FIG. 36 of the above-mentioned twenty-fourth embodiment, the overall opening portion 752e of the upstream refrigerant communication passage 752a overlaps with the opening end surface 16d in a direction perpendicular to the opening end surface 16d of the refrigerant tubes 16a. However, at least a part of the intermediate plate member 752 may overlap with the opening end surface 16d.

(10) In FIGS. 32 to 35 of the above-mentioned embodiment, the heat exchanger 70 has three refrigerant paths 161a, 161b, and 161c. However, the number of refrigerant paths may be four or more without any problem.

(11) In the above embodiments, both a first relationship that the flow channel resistance of the upstream refrigerant communication passage 752a is smaller than the flow channel resistance of the downstream refrigerant communication passage 752b and a second relationship that the flow channel resistance between the upstream refrigerant tube group 16b and one refrigerant space 77 is smaller than the flow channel resistance between the downstream refrigerant tube group 16c and the one refrigerant space 77 are satisfied. However, one of the first and second relationships of those flow channel resistances may be satisfied, but the other relationship may not be satisfied without any problem.

The present disclosure is not limited to the above-mentioned embodiments, and can be appropriately changed. Also, the respective embodiments are not unrelated to each other, and can be appropriately combined together unless the combination is clearly impossible. Further, needless to say, in the respective embodiments, constituent elements of the embodiments are not always essential unless the constituent elements are clearly specified to be particularly essential, or unless the constituent elements are obviously considered essential on a theoretical basis. In addition, in the respective embodiments, when the number including count, figure, amount and range, etc. of the constituent elements of the embodiments is mentioned, the number of constituent elements is not limited to a specific number unless the number is clearly specified to be particularly essential, or unless the number is definitely limited to the specific number in principle. Further, when shapes and positional relationships, etc. of the constituent elements, etc. are mentioned in the respective embodiments, the shapes and the positional relationships, etc. are not limited to specific shapes or positional relationship, etc. unless the shapes and the positional relationship is clearly specified to be particularly essential, or unless the shapes and the positional relationship is definitely limited to the specific shapes and positional relationship, etc. in principle.

The invention claimed is:

1. A heat exchanger, comprising:
a heat exchange portion in which first tubes through which a first fluid flows and second tubes through which a second fluid flows are stacked, the heat exchange portion performing heat exchange among the first fluid, the second fluid and a third fluid;
a tank portion including:
an inlet side first tank space is connected to a first inlet pipe and communicates with the first tubes to distribute the first fluid to the first tubes, an outlet side first tank space is connected to a first outlet pipe and communicates with the first tubes to collect the first fluid from the first tubes, and
an inlet side second tank space is connected to a second inlet pipe and communicates with the second tubes to distribute the second fluid to the second tubes, an outlet side second tank space is connected to a second outlet pipe and communicates with the second tubes to collect the second fluid from the second tubes;

a third fluid passage formed between adjacent tubes of the first tubes and the second tubes, the third fluid flowing through the third fluid passage; and an outer fin arranged in the third fluid passage, the outer fin facilitating heat exchange between the first fluid and the third fluid and heat exchange between the second fluid and the third fluid and enabling heat transfer between the first fluid flowing in the first tubes and the second fluid flowing in the second tubes, wherein the heat exchange portion includes an upstream heat exchange portion, and a downstream heat exchange portion arranged downstream of the upstream heat exchange portion in a flow direction of the third fluid, the first tubes are arranged in both the upstream heat exchange portion and the downstream heat exchange portion, the second tubes are arranged in at least one of the upstream heat exchange portion or the downstream heat exchange portion, one of the first tubes of the upstream heat exchange portion overlaps with one of the first tubes of the downstream heat exchange portion in the flow direction of the third fluid, and another of the first tubes of the downstream heat exchange portion overlaps with one of the second tubes of the upstream heat exchange portion in the flow direction of the third fluid, the tank portion includes a plate member arranged to close the inlet side first tank space, the outlet side first tank space, the inlet side second tank space and the outlet side second tank space from a side of the first and second tubes, the plate member is provided with a first fluid communication passage as a through-hole through which the inlet side first tank space and the outlet side first tank space communicates with the first tubes, and a second fluid communication passage as a through-hole through which the inlet side second tank space and the outlet side second tank space communicates with the second tubes, the first tubes in the upstream heat exchange portion configures an upstream first tube group, and the first tubes in the downstream heat exchange portion configures a downstream first tube group, either the upstream first tube group or the downstream first tube group, whichever is larger in pressure loss of the first fluid, configures a higher pressure loss first tube group, either the upstream first tube group or the downstream first tube group, whichever is smaller in pressure loss of the first fluid, configures a lower pressure loss first tube group, and a flow channel resistance between the higher pressure loss first tube group and the inlet side first tank space is smaller than a flow channel resistance between the lower pressure loss first tube group and the inlet side first tank space.

2. The heat exchanger according to claim 1, wherein the inlet side first tank space is arranged to be nearer to the higher pressure loss first tube group than to the lower pressure loss first tube group in the flow direction of the third fluid, and the inlet side first tank space communicates with the higher pressure loss first tube group through a communication passage in the first fluid communication passage, and at least a part of an opening portion of the communication passage is opened toward the first tubes and is disposed to overlap with an opening end surface of the first tubes in a direction perpendicular to the opening end surface.

3. The heat exchanger according to claim 2, wherein the first tubes are arranged so that the first fluid flowing within the first tubes has a flow rate component in a direction of a gravitational force, the first fluid is a refrigerant, the first fluid which has been subjected to heat exchange with the third fluid at least once in the heat exchange portion is introduced into the inlet side first tank space, and the inlet side first tank space is located on the higher pressure loss first tube group.

4. The heat exchanger according to claim 2, being used as an evaporator that evaporates the first fluid, wherein the outlet side first tank space is arranged to be nearer to the lower pressure loss first tube group side than to the higher pressure loss first tube group side in the flow direction of the third fluid.

5. The heat exchanger according to claim 1, wherein the number of the first tubes included in the higher pressure loss first tube group is smaller than that in the lower pressure loss first tube group.

6. The heat exchanger according to claim 1, wherein the higher pressure loss first tube group configures the upstream first tube group, and the lower pressure loss first tube group configures the downstream first tube group.

7. The heat exchanger according to claim 1, wherein the heat exchange portion has three or more first fluid paths, and each of the first fluid paths has one or more of the first tubes interposed between the inlet side first tank space and the outlet side first tank space, the first fluid paths are coupled to each other in series in a flow pathway of the first fluid, and each of the first fluid paths allows the first fluid to flow therein oppositely in the direction of the gravitational force to adjacent another of the first fluid paths in the flow pathway, the first fluid paths include an upward flow first fluid path in which the first fluid flows upward in the direction of the gravitational force, and the upward flow first fluid path is smaller in stack width of the first tubes of the first fluid paths in the stacking direction of the first tubes than any other adjacent first fluid path in the flow pathway of the first fluid.

8. The heat exchanger according to claim 1, wherein the first fluid and the second fluid are heat media flowing in different fluid circulation circuits.

9. The heat exchanger according to claim 1, being used as an evaporator that evaporates a refrigerant in a vapor compression refrigerant cycle, wherein the first fluid is the refrigerant of the refrigerant cycle, the second fluid is a heat medium which absorbs the quantity of heat that an external heat source possesses, and the third fluid is air.

10. The heat exchanger according to claim 1, being used as a condenser that condenses a refrigerant in a vapor compression refrigerant cycle, wherein the first fluid is the refrigerant of the refrigerant cycle, the second fluid is a heat medium which absorbs the quantity of heat that an external heat source possesses, and the third fluid is air.

11. The heat exchanger according to claim 1, being used for a vehicle cooling system, wherein
- the first fluid is a heat medium which absorbs the quantity of heat that a first in-vehicle device associated with a heat generation during actuation possesses,
- the second fluid is a heat medium which absorbs the quantity of heat that a second in-vehicle device associated with a heat generation during actuation possesses, and
- the third fluid is air.

12. The heat exchanger according to claim 1 being used as an evaporator that evaporates the first fluid, wherein
- the number of second tubes included in the upstream heat exchange portion is larger than that in the downstream heat exchange portion, and
- the second fluid having a higher temperature than that of the first fluid flows within the second tubes and the second tank space, thereby defrosting.

13. A heat exchanger, comprising:
- a heat exchange portion in which first tubes through which a first fluid flows and second tubes through which a second fluid flows are stacked on each other, the heat exchange portion performing heat exchange among the first fluid, the second fluid and a third fluid;
- a tank portion including:
  - an inlet side first tank space is connected to a first inlet pipe and communicates with the first tubes to distribute the first fluid to the first tubes, an outlet side first tank space is connected to a first outlet pipe and communicates with the first tubes to collect the first fluid from the first tubes, and
  - an inlet side second tank space is connected to a second inlet pipe and communicates with the second tubes to distribute the second fluid to the second tubes, an outlet side second tank space is connected to a second outlet pipe and communicates with the second tubes to collect the second fluid from the second tubes;
- a third fluid passage formed between adjacent tubes of the first tubes and the second tubes, the third fluid flowing through the third fluid passage; and
- an outer fin arranged in the third fluid passage, the outer fin facilitating heat exchange between the first fluid and the third fluid and heat exchange between the second fluid and the third fluid and enabling heat transfer between the first fluid flowing in the first tubes and the second fluid flowing in the second tubes, wherein
- the heat exchange portion includes an upstream heat exchange portion; and a downstream heat exchange portion arranged downstream of the upstream heat exchange portion in a flow direction of the third fluid,
- the first tubes are arranged in both the upstream heat exchange portion and the downstream heat exchange portion,
- the second tubes are arranged in at least one of the upstream heat exchange portion or the downstream heat exchange portion,
- one of the first tubes of the upstream heat exchange portion overlaps with one of the first tubes of the downstream heat exchange portion in the flow direction of the third fluid, and another of the first tubes of the downstream heat exchange portion overlaps with one of the second tubes of the upstream heat exchange portion in the flow direction of the third fluid,
- the tank portion includes a plate member arranged to close the inlet side first tank space, the outlet side first tank space, the inlet side second tank space and the outlet side second tank space from a side of the first and second tubes,
- the plate member is provided with a first fluid communication passage as a through-hole through which the inlet side first tank space and the outlet side first tank space communicates with the first tubes, and a second fluid communication passage as a through-hole through which the inlet side second tank space and the outlet side second tank space communicates with the second tubes,
- either the first tubes of the upstream heat exchange portion or the first tubes of the downstream heat exchange portion, whichever are larger in a pressure loss of the first fluid, configure higher pressure loss first tubes, and the other first tubes smaller in the pressure loss of the first fluids configure lower pressure loss first tubes, and
- a flow channel resistance between the higher pressure loss first tube group and the inlet side first tank space is smaller than a flow channel resistance between the lower pressure loss first tube group and the inlet side first tank space.

14. The heat exchanger according to claim 13, wherein
a ratio of the number of the first tubes to a total number of the first tubes and the second tubes in the upstream heat exchange portion is different from a ratio of the number of the first tubes to a total number of the first tubes and the second tubes in the downstream heat exchange portion.

15. The heat exchanger according to claim 13, wherein
- the inlet side first tank space, the outlet side first tank space, the inlet side second tank space and the outlet side second tank space are provided to extend in a stacking direction of the first tubes and the second tubes, and arranged in the flow direction of the third fluid,
- the inlet side first tank space and the outlet side first tank space are arranged to be nearer to the lower pressure loss tubes than to the higher pressure loss first tubes in the flow direction of the third fluid,
- the inlet side second tank space and the outlet side second tank space are arranged to be nearer to the higher pressure first tubes than to the lower pressure loss first tubes in the flow direction of the third fluid,
- the plate member is provided with a higher pressure loss communication passage as the first fluid communication passage through which the higher pressure loss first tubes communicate with the inlet side first tank space and the outlet side first tank space, and a lower pressure loss communication passage as the first fluid communication passage through which the lower pressure loss first tubes communicate with the inlet side first tank space and the outlet side first tank space, and
- a flow channel resistance of the higher pressure loss communication passage is smaller than a flow channel resistance of the lower pressure loss communication passage, so that the flow channel resistance between the higher pressure loss first tubes and the first tank space is smaller than the flow channel resistance between the lower pressure loss first tubes and the first tank space.

16. The heat exchanger according to claim 15, wherein
the plate member is provided with a through-hole configuring the higher pressure loss communication passage, and a through-hole configuring the lower pressure loss communication passage, and a hole area of the through-hole configuring the higher pressure loss communication passage is larger than a hole area of the through-hole configuring the lower pressure loss communication passage, so that the flow channel resistance of the higher pressure loss communication passage is smaller than the flow channel resistance of the lower pressure loss communication passage.

17. The heat exchanger according to claim 13, wherein the inlet side first tank space, the outlet side first tank space, the inlet side second tank space and the outlet side second tank space are provided to extend in a stacking direction of the first tubes and the second tubes, and arranged in the flow direction of the third fluid, the inlet side first tank space and the outlet side first tank space are arranged to be nearer to the higher pressure loss first tubes than to the lower pressure loss first tubes in the flow direction of the third fluid, and the inlet side second tank space and the outlet side second tank space are arranged to be nearer to the lower pressure loss first tubes than to the higher pressure loss first tubes in the flow direction of the third fluid, so that the flow channel resistance between the higher pressure loss first tubes and the first tank space is smaller than the flow channel resistance between the lower pressure loss first tubes and the first tank space.

18. A heat exchanger comprising:

a heat exchange portion (71, 72) in which first tubes (16*a*) through which a first fluid flows and second tubes (43*a*) through which a second fluid flows are stacked on each other, the heat exchange portion performing heat exchange between the first fluid, the second fluid and a third fluid;

a tank portion including:

an inlet side first tank space is connected to a first inlet pipe and communicates with the first tubes to distribute the first fluid to the first tubes, an outlet side first tank space is connected to a first outlet pipe and communicates with the first tubes to collect the first fluid from the first tubes, and an inlet side second tank space is connected to a second inlet pipe and communicates with the second tubes to distribute the second fluid to the second tubes, an outlet side second tank space is connected to a second outlet pipe and communicates with the second tubes to collect the second fluid from the second tubes;

a third fluid passage formed between adjacent tubes of the first tubes and the second tubes, the third fluid flowing through the third fluid passage; and an outer fin arranged in the third fluid passage, the outer fin facilitating heat exchange between the first fluid and the third fluid and heat exchange between the second fluid and the third fluid and enabling heat transfer between the first fluid flowing in the first tubes and the second fluid flowing in the second tubes, wherein the heat exchange portion includes an upstream heat exchange portion, and a downstream heat exchange portion arranged downstream of the upstream heat exchange portion in a flow direction of the third fluid, the first tubes are arranged in both the upstream heat exchange portion and the downstream heat exchange portion, the second tubes are arranged in at least one of the upstream heat exchange portion or the downstream heat exchange portion, one of the first tubes of the upstream heat exchange portion overlaps with one of the first tubes of the downstream heat exchange portion in the flow direction of the third fluid, and another of the first tubes of the downstream heat exchange portion overlaps with one of the second tubes of the upstream heat exchange portion in the flow direction of the third fluid, the inlet side first tank space, the outlet side first tank space, the inlet side second tank space and the outlet side second tank space are provided to extend in a stacking direction of the first tubes and the second tubes, and arranged in the flow direction of the third fluid, the inlet side first tank space and the outlet side first tank space are is arranged so that a position thereof in the flow direction of the third fluid matches a position overlapping with a virtual line which is at the same distance from the first tubes of the upstream heat exchange portion and from the first tubes of the downstream heat exchange portion, and a ratio of the number of the first tubes of the upstream heat exchange portion to a total number of the first tubes and the second tubes in the upstream heat exchange portion is different from a ratio of the number of the first tubes of the downstream heat exchange portion to a total number of the first tubes and the second tubes in the downstream heat exchange portion.

19. The heat exchanger according to claim 18, wherein the first tubes in the upstream heat exchange portion configures an upstream first tube group, and the first tubes in the downstream heat exchange portion configures a downstream first tube group, either the upstream first tube group or the downstream first tube group, whichever is larger in a pressure loss of the first fluid, configures a higher pressure loss first tube group, either the upstream first tube group or the downstream first tube group, whichever is smaller in a pressure loss of the first fluid, configures a lower pressure loss first tube group, the net side first tank space is arranged to be nearer to the higher pressure loss first tube group than to the lower pressure loss first tube group in the flow direction of the third fluid, the inlet side first tank space communicates with the higher pressure loss first tube group through a communication passage, and at least a part of an opening portion of the communication passage is opened toward the first tubes and is disposed to overlap with an opening end surface of the first tubes in a direction perpendicular to the opening end surface, the first tubes are arranged so that the first fluid flowing within the first tubes has a flow rate component in a direction of a gravitational force, the first fluid is a refrigerant, the first fluid which has been subjected to heat exchange with the third fluid at least once in the third fluid passage is introduced into the inlet side first tank space, and the net side first tank space is located on the higher pressure loss first tube group.

20. The heat exchanger according to claim 18, wherein the tank portion further includes a third tank space extending in a stacking direction of the second tubes, the outlet side first tank space, the outlet side second tank space and the third tank space are arranged in the flow direction of the third fluid, and the tank portion includes therein a tank interior communication passage through which the outlet side first tank space communicates with the third tank space.

21. The heat exchanger according to claim 20, further comprising
a refrigerant piping connection connector outside the tank portion and on an opposite side of the tank portion to the first tubes and the second tubes, wherein
the refrigerant piping connection connector is provided with a connector communication passage through which an internal space of the refrigerant piping connection connector communicates with the outlet side first tank space.

22. The heat exchanger according to claim 18, wherein
the tank portion further includes a third tank space extending in a stacking direction of the second tubes,
the outlet side first tank space, the outlet side second tank space and the third tank space are arranged in the flow direction of the third fluid,
the heat exchanger further comprises a refrigerant piping connection connector outside the tank portion and on an opposite side of the tank portion to the first tubes and the second tubes, and
the refrigerant piping connection connector is provided with a first connector communication passage through which an internal space of the connector communicates with the outlet side first tank space, and a second connector communication passage through which the internal space communicates with the third tank space.

* * * * *